US010551618B2

(12) United States Patent
Takahashi

(10) Patent No.: US 10,551,618 B2
(45) Date of Patent: Feb. 4, 2020

(54) VEHICLE DISPLAY DEVICE

(71) Applicant: Yazaki Corporation, Tokyo (JP)

(72) Inventor: Nobuyuki Takahashi, Susono (JP)

(73) Assignee: Yazaki Corporation, Tokyo (JP)

( * ) Notice: Subject to any disclaimer, the term of this patent is extended or adjusted under 35 U.S.C. 154(b) by 121 days.

(21) Appl. No.: 15/347,087

(22) Filed: Nov. 9, 2016

(65) Prior Publication Data

US 2017/0059864 A1    Mar. 2, 2017

Related U.S. Application Data

(63) Continuation of application No. PCT/JP2015/064298, filed on May 19, 2015.

(30) Foreign Application Priority Data

Jun. 12, 2014  (JP) .................................. 2014-121225
Jun. 12, 2014  (JP) .................................. 2014-121226
(Continued)

(51) Int. Cl.
   *G02B 27/01*   (2006.01)
   *B60K 35/00*   (2006.01)
   *B60K 37/00*   (2006.01)

(52) U.S. Cl.
   CPC .......... *G02B 27/0101* (2013.01); *B60K 35/00* (2013.01); *B60K 37/00* (2013.01);
   (Continued)

(58) Field of Classification Search
   CPC ................ G02B 27/01; G02B 27/0101; G02B 27/0172; G02B 27/0103; G02B 27/017;
   (Continued)

(56) References Cited

U.S. PATENT DOCUMENTS 6,542,305 B2 *  4/2003  Nakamura ......... G02B 27/0101
                                                        359/630
6,989,934 B2 *  1/2006  Aoki ..................... B60K 35/00
                                                          345/7
(Continued)

FOREIGN PATENT DOCUMENTS

JP       1986-176028 U    11/1986
JP        09-159986 A      6/1997
(Continued)

OTHER PUBLICATIONS

English translation of JP 2014 084071, machine translated on Aug. 5, 2018.*
(Continued)

*Primary Examiner* — Jie Lei
(74) *Attorney, Agent, or Firm* — Locke Lord LLP

(57) ABSTRACT

Provided is a vehicle display device that can improve visibility without providing a feeling of strangeness to a passenger. A vehicle display device includes a display unit provided in an inner side of an instrument panel and which projects a display image, a transparent cover that transmits the display image projected from the display unit toward a windshield, and a bezel body including an opening portion that allows the display image transmitted through the transparent cover to pass through and having an outer edge portion continuing into the windshield, and the degrees of brightness of respective reflected images of the instrument panel, the transparent cover, and the bezel body, the respective reflected images being reflected in the windshield, are made uniform, and therefore dark visual recognition of any of the reflected images is suppressed, and the feeling of strangeness provided to the passenger is relieved.

6 Claims, 50 Drawing Sheets

(30) Foreign Application Priority Data

| Jun. 12, 2014 | (JP) | ................................. | 2014-121227 |
| Jun. 12, 2014 | (JP) | ................................. | 2014-121233 |
| Jun. 12, 2014 | (JP) | ................................. | 2014-121234 |
| Jul. 23, 2014 | (JP) | ................................. | 2014-149634 |
| Jul. 23, 2014 | (JP) | ................................. | 2014-149635 |
| Jul. 23, 2014 | (JP) | ................................. | 2014-149636 |

(52) U.S. Cl.
CPC ...... *B60K 2370/155* (2019.05); *B60K 2370/1529* (2019.05); *B60K 2370/184* (2019.05); *B60K 2370/27* (2019.05); *B60K 2370/334* (2019.05); *B60K 2370/349* (2019.05); *B60K 2370/70* (2019.05); *G02B 2027/0118* (2013.01)

(58) Field of Classification Search
CPC ............ G02B 2027/0118; B60K 35/00; B60K 2350/92; B60K 2350/1072; B60K 2350/1068; B60K 2350/2052; B60K 2350/2069; B60K 2350/2095; B60K 37/00; B60K 2370/27; B60K 2370/70; B60K 2370/155; B60K 2370/184; B60K 2370/349; B60K 2370/334; B60K 2370/1529; G09G 3/003; B60R 1/00
USPC ....... 359/13, 630, 631; 345/7–9; 353/13, 28; 348/115, 118
See application file for complete search history.

(56) References Cited

U.S. PATENT DOCUMENTS

| 7,298,557 | B2 * | 11/2007 | Dobschal ........... G02B 27/0101 |
| | | | 345/7 |
| 8,950,868 | B2 | 2/2015 | Aoki et al. |
| 2014/0253821 | A1 | 9/2014 | Takatoh et al. |

FOREIGN PATENT DOCUMENTS

| JP | 2000-142176 A | 5/2000 |
| JP | 2007-148092 A | 6/2007 |
| JP | 201064708 A | 3/2010 |
| JP | 2010-179918 A | 8/2010 |
| JP | 201281781 A | 4/2012 |
| JP | 2013-086691 A | 5/2013 |
| JP | 2014-084071 A | 5/2014 |
| WO | 2011/074679 A1 | 6/2011 |

OTHER PUBLICATIONS

International Search Report dated Jul. 28, 2015, issued for PCT/JP2015/064298.
Office Action dated Jan. 16, 2018, issued for the Japanese patent application No. 2014-121233 and English translation thereof.
Office Action dated May 15, 2018, issued for the Japanese patent application No. 2014-149634 and English translation thereof.
Office Action dated May 15, 2018, issued for the Japanese patent application No. 2014-149635 and English translation thereof.
Office Action dated Jun. 15, 2018 issued for corresponding Japanese Patent Application No. 2014-121233.

* cited by examiner

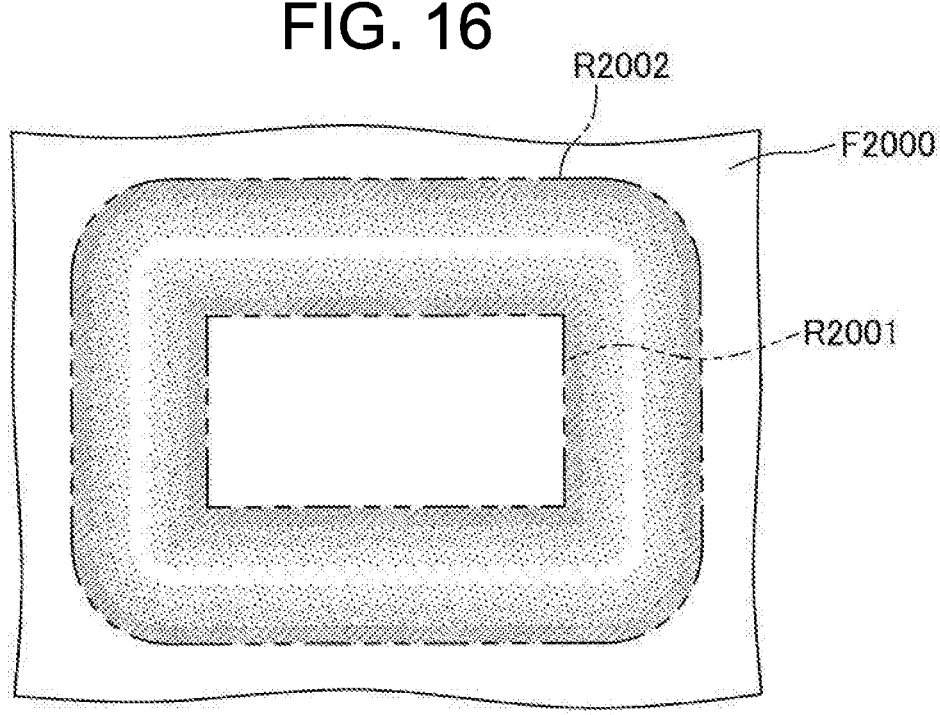
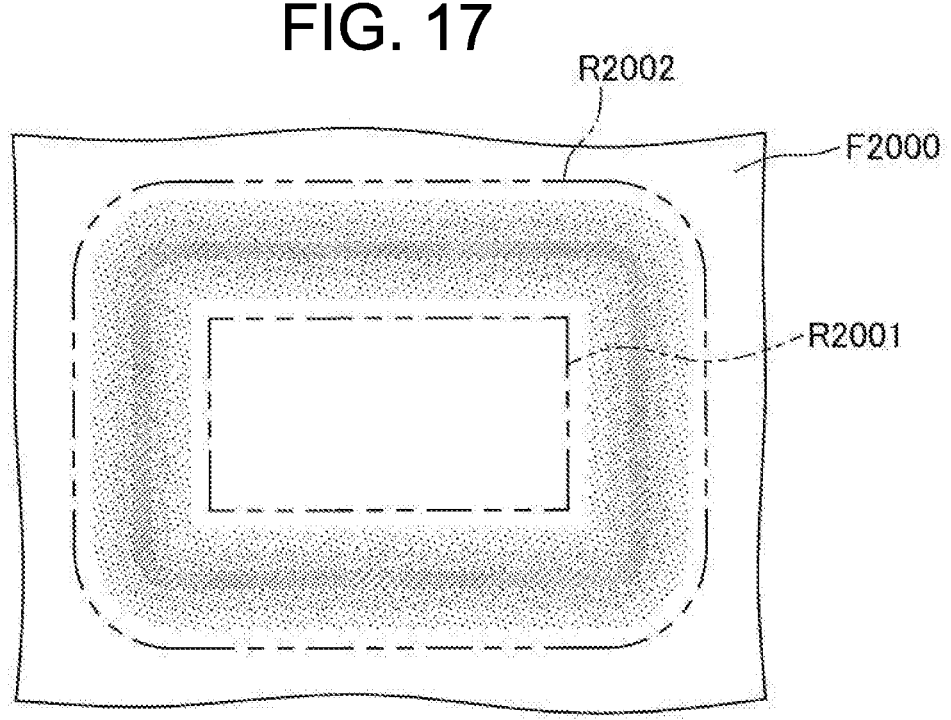

VEHICLE DISPLAY DEVICE

TECHNICAL FIELD

The present invention relates to a vehicle display device provided in an instrument panel, projects a display image on a windshield, and causes a passenger to visually recognize a virtual image of the display image reflected on the windshield.

BACKGROUND ART

Conventionally, as a vehicle display device, a head-up display (HUD) device has been proposed, which projects a display image from a projector provided inside an instrument panel, on a windshield, reflects the projected display image on the windshield, and causes a passenger to visually recognize a reflected image thereof as a virtual image (for example, see Patent Literature 1). In the vehicle display device described in Patent Literature 1, a transparent cover that transmits the display image is provided on an opening portion of the instrument panel, and dust and the like do not enter inside the device with the transparent cover.

CITATION LIT

Patent Literature

Patent Literature 1: JP 2007-148092 A

SUMMARY OF INVENTION

Technical Problem

By the way, in the conventional vehicle display device described in Patent Literature 1, there is a case in which light from outside such as sunlight is reflected on the transparent cover depending on an angle of the transparent cover, and the reflected light thereof directly or is reflected on a windshield and then arrives at a viewpoint of the passenger. To prevent this, a configuration to incline the transparent cover with a front part low so that a vehicle front side of the transparent cover becomes lower than a vehicle rear side, to change the angle of the reflected light, and to block the light from outside with a frame unit (bezel) provided around the transparent cover (especially, on the vehicle front side) can be considered.

However, if the frame unit is provided around the transparent cover and the light from outside is blocked, a reflected image of the transparent cover or the frame unit reflected in the windshield is visually recognized darker than a reflected image of the peripheral instrument panel reflected in the windshield, and may provide the passenger with a feeling of strangeness. Especially, in a display device that projects a display image on the windshield, while a reflected image (virtual image) of the display image is formed and focused on a farther front position for the passenger than to the windshield, a reflected image of the transparent cover or the frame unit is formed on a relatively close position from the passenger. Therefore, a parallax is caused between the reflected images, and there is an inconvenience of an easy decrease in visibility.

An objective of the present invention is to provide a vehicle display device that can improve visibility without providing a feeling of strangeness to a passenger.

Solution to Problem

To solve the problem, a vehicle display device of the present invention according to first aspect is a vehicle display device provided in an instrument panel, adapted to project a display image on a windshield, and adapted to cause a passenger to visually recognize a virtual image of the display image reflected on the windshield, the vehicle display device including a projection unit provided in an inner side of the instrument panel and adapted to project the display image, a transmission unit adapted to transmit the display image projected from the projection unit toward the windshield, and a frame unit having an opening portion that allows the display image transmitted through the transmission unit to pass through and an outer edge portion continuous to the instrument panel, wherein degrees of brightness of respective reflected images of the instrument panel, the transmission unit, and the frame unit, the respective reflected images being reflected on the windshield, are made uniform.

According to the vehicle display device of the present invention, the degrees of brightness of the reflected image of the instrument panel, the reflected image of the transmission unit, and the reflected image of the frame unit, the reflected images being reflected in the windshield, are made uniform. Therefore, dark visual recognition of any of the reflected images is suppressed, and the feeling of strangeness provided to the passenger is relieved. Here, as the state in which the degrees of brightness of the respective reflected images of the instrument panel, the transmission unit, and the frame unit, the respective reflected images being reflected in the windshield, are made uniform, a contrast ratio of the degree of brightness of the brightest reflected image and the degree of brightness of the darkest reflected image, of the reflected images of the instrument panel, the transmission unit, and the frame unit, is favorably 1.3 or less. Further, if the contrast ratio (the degree of brightness of the bright reflected image/the degree of brightness of the dark reflected image) is 1.3 or less, the feeling of strangeness is not provided to the passenger in visually recognizing the virtual image of the display image, and favorable visibility can be obtained. From a perspective of improvement of the visibility, the contrast ratio is favorably 1.2 or less. Further, if the contrast ratio is 1.0, the respective reflected images have the same degree of brightness, and any of the reflected images is not visually recognized in a floating manner, and it is obvious that bringing the contrast ratio close to 1.0, which is ideal in terms of the visibility, is more favorable.

The vehicle display device according to a second aspect is the vehicle display device according to the first aspect, wherein the frame unit includes a frame surface portion having a descending slope from an outer edge portion at a side of the instrument panel side toward an end edge of the opening portion, and, in the outer edge portion, an angle made by the frame surface portion and a surface of the instrument panel is 30° or less.

According to such a configuration, the frame unit includes the frame surface portion having a descending slope toward the inner opening portion, and the angle made by the frame surface portion and the instrument panel surface is 30° or less in the outer edge portion. Therefore, the contrast of the position of the outer edge portion in the reflected image reflected in the windshield can be suppressed. Therefore, even if there is a difference in the degree of brightness between the reflected image of the instrument panel and the reflected image of the frame unit, the difference can be made unnoticeable, and the feeling of strangeness provided to the passenger can be relieved. Note that the contrast can be suppressed as long as the angle made by the frame surface portion and the instrument panel surface in the outer edge portion is 30° or less. However, the angle is favorably 20° or less from a perspective of a decrease in the contrast.

The vehicle display device according to a third aspect is the vehicle display device according to the second aspect, wherein the frame surface portion is formed in an upward convex curved shape in which the descending slope gradually becomes larger as going from the outer edge portion toward the end edge of the opening portion.

According to such a configuration, the frame surface portion is formed in an upward convex curved shape, and its slope on the outer edge portion side is gently formed. Therefore, the frame surface portion can smoothly continue to the instrument panel in a boundary portion, the depth on the opening portion side can be secured, and the degree of freedom in setting of an installation height of the transmission unit can be enhanced. Further, the frame surface portion is formed in a curved shape. Therefore, change of the degree of brightness in the reflected image of the frame unit reflected in the windshield can be made gentle, and the feeling of strangeness provided to the passenger can be further relieved.

Further, the descending slope in an upward convex curved shape is provided in the frame surface portion on the vehicle front side with respect to the transmission unit. Therefore, light from outside entering through the windshield can be blocked by the frame unit, and the light from outside is reflected on the transmission unit and can be prevented from reaching a viewpoint of the passenger. Further, the frame surface portion on the vehicle front side, which has received the light from outside, becomes bright, and thus if a positional relationship between the frame surface portion and an eye point of the passenger is optically continuous through reflection on the transmission unit and the windshield, the reflected image of the transmission unit can be visually recognized in a relatively bright manner by indirect light from the bright frame surface portion, and variation of the contrast ratio can be suppressed.

The vehicle display device according to a fourth aspect is the vehicle display device according to any one of the first to third aspects, wherein the frame unit is formed of a semi-transparent material that transits light, and emission unit that emits light is provided on a back side of the frame unit.

According to such a configuration, emission unit is provided on the back surface of the frame unit formed of a semi-transparent material, and the light emitted from the emission unit is transmitted to the surface side of the frame unit, so that the surface of the frame unit can be made bright, and the reflected image of the frame unit reflected in the windshield being darker than the reflected image of the instrument panel can be suppressed, and the contrast ratio can be brought close to 1.0. Note that the transmittance of the frame unit formed of a semi-transparent material is favorably about 20%, and by use of the frame unit having such transmittance, the light from the emission unit is transmitted, and the inside of the frame unit can be prevented from being seen through from the passenger.

The vehicle display device according to a fifth aspect is the vehicle display device according to any one of the first to fourth aspects, wherein surface treatment that makes degrees of glossiness of mutual surfaces of the frame unit and the instrument panel equivalent is provided on at least one of the frame unit and the instrument panel.

According to such a configuration, the surface treatment is provided on the frame unit or the instrument panel, and the degrees of glossiness of the mutual surfaces are made equivalent. Therefore, the light from outside is reflected on the frame unit and the instrument panel, and appearance of the reflected images reflected in the windshield can be close to each other, and the feeling of strangeness is less likely to be provided to the passenger. Here, as means to make the degrees of glossiness of the surfaces equivalent, in a case where emboss processing is applied to the surface of the instrument panel, similar emboss processing is favorably applied in the surface treatment provided to the frame unit. Further, means to provide finer unevenness than unevenness of the emboss, to the surface of the instrument panel, on which the reflected image is more likely to become a relatively bright reflected image, and to disperse the light by the finer unevenness to reduce the glossiness, thereby to make the degree of glossiness of the instrument panel equivalent to that of the frame unit, may be employed.

Advantageous Effects of Invention

According to the vehicle display device of the present invention, dark visual recognition of any reflected image, of the reflected image of the instrument panel, the reflected image of the transmission unit, and the reflected image of the frame unit, the reflected images being reflected in the windshield, can be suppressed. Therefore, the feeling of strangeness is not provided to the passenger, and the parallax due to the dark reflected image can be decreased, whereby the visibility of the reflected image (virtual image) of the display image can be improved.

Hereinafter, FIGS. 1 to 6 are diagrams to be referenced for a first invention, FIGS. 7 to 22 are diagrams to be referenced for a second invention, FIGS. 23 to 33 are diagrams to be referenced for a third invention, FIGS. 34 to 41 are diagrams to be referenced for a fourth invention, FIGS. 42 to 47 are diagrams to be referenced for a fifth invention, FIGS. 48 to 58 are diagrams to be referenced for a sixth invention, FIGS. 59 to 73 are diagrams to be referenced for a seventh invention, and FIGS. 74 to 79 are diagrams to be referenced for an eighth invention.

BRIEF DESCRIPTION OF DRAWINGS

FIG. 16 is a diagram illustrating a state in which light is projected on a windshield using the vehicle display device including the bezel body illustrated in FIG. 14.

FIG. 17 is a diagram illustrating a state in which light is projected on a windshield using the vehicle display device including the bezel body illustrated in FIG. 15.

DESCRIPTION OF EMBODIMENTS

First Invention

First, a first invention will be described.

Figure 1:
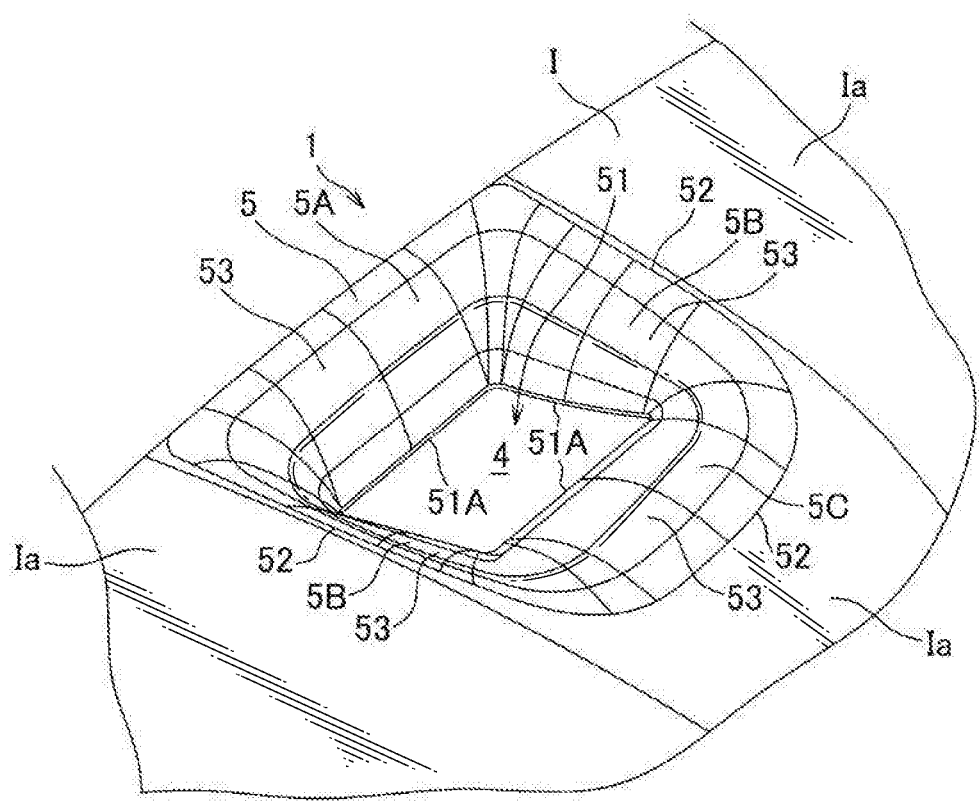
FIG. 1 is a perspective view illustrating a part of an instrument panel provided with a vehicle display device according to an embodiment of the present invention.
Figure 2:
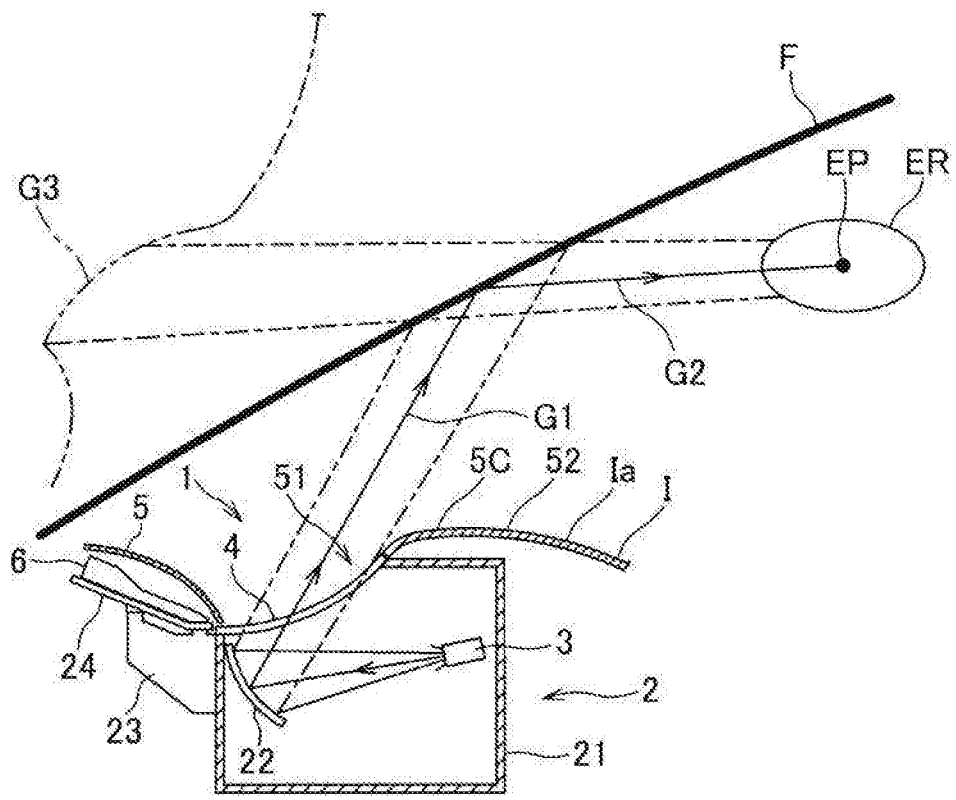
FIG. 2 is a sectional view illustrating the vehicle display device.
Figure 3:
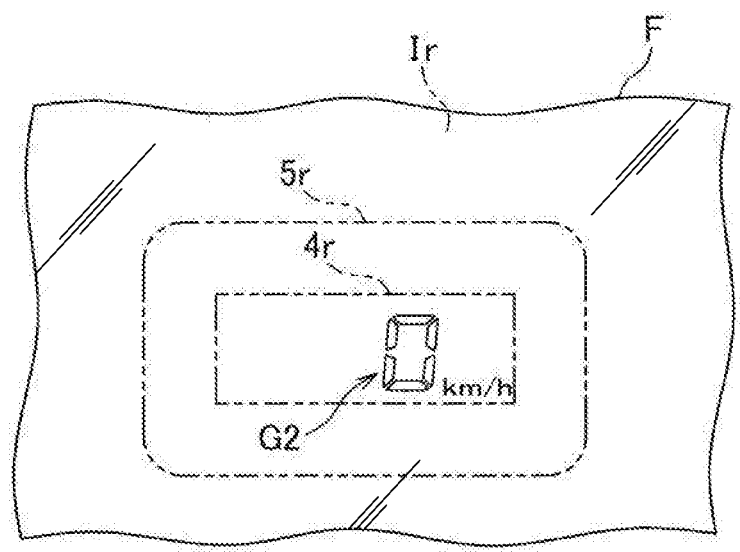
FIG. 3 is a diagram illustrating a display state by the vehicle display device.

Hereinafter, an embodiment of the present invention will be described on the basis of the drawings. As illustrated in FIGS. 1 to 3, a vehicle display device 1 of the present embodiment is provided in an instrument panel I of a vehicle, projects a display image G1 on a windshield F, and causes a passenger to visually recognize a virtual image G3 of a display image G2 reflected on a windshield F. That is, as illustrated in FIGS. 2 and 3, the display image G1 projected from the vehicle display device 1 is reflected on the windshield F and reaches an eye range ER of the passenger. In a case where the passenger sees the front from an eye point EP in the eye range ER, the passenger visually recognizes the reflected display image G2 as the virtual image G3 existing in farther front with respect to the windshield F. Accordingly, the passenger obtains a front visual field through the windshield F, and can visually recognize the virtual image G3 superimposed on the front visual field.

The vehicle display device 1 includes a device main body unit 2 provided in an inner side of the instrument panel I, a display unit 3 as a projection unit provided inside the device main body unit 2 and which projects a display image, a transparent cover 4 as a transmission unit that transmits the display image projected from the display unit 3 toward the windshield F, a bezel body 5 as a frame unit having an opening portion 51 that allows the display image transmitted through the transparent cover 4 to pass through, and a light guide member 6 as emission unit provided below (on a back side) of the bezel body 5 on a vehicle front side. Note that, in the present embodiment, the diagonal upper left side in FIG. 1 and the left side in FIG. 2 are the front side of the vehicle, and hereinafter, the front side may be simply written as vehicle front side.

The device main body unit 2 includes a box-shaped housing 21, an optical unit 22 provided inside the housing 21 and which guides the display image from the display unit 3 to the transparent cover 4, and a control unit (not illustrated). The housing 21 is formed to open upward, and the transparent cover 4 is attached in an opening portion thereof. A support member 24 is fixed to a vehicle front side of the housing 21 through a bracket 23, and the light guide member 6 is supported by the support member 24. The housing 21 is fixed to a vehicle main body such as a vehicle body panel in the vehicle, and is not directly fixed with the instrument panel I and an edge of the housing 21 is cut off.

The optical unit 22 includes a plurality of mirrors that reflects the display image projected from the display unit 3 and a plurality of lenses that enlarges/reduces the display image, and extends a projection path of the display image G1 from the display unit 3 so that the virtual image G3 visually recognized by the passenger is focused on a distant place on the vehicle front side.

The display unit 3 includes a display that generates the display image upon receipt of a signal from the control unit. The display is configured from a transmissive liquid crystal display panel, for example, and can display visible information (display image) such as numerical values, characters, and figures, as needed. Further, a light source for illumination such as backlight is provided in the display unit 3, and projects the visible information displayed by the display as a light beam.

The transparent cover 4 is a rectangular face plate having a downward convex curved shape and having a light-transmitting property, and is supported with a front part low by the housing 21 toward the vehicle front side.

The bezel body 5 includes the opening portion 51 in its center, and an outer edge portion 52 is continuously provided to the instrument panel I and is supported by the instrument panel I. The opening portion 51 includes a square end edge 51A along an end edge of the transparent cover 4, and allows the display image G1 transmitted through the transparent cover 4 to pass through. The outer edge portion 52 has the same height with and continues with a surface Ia of the instrument panel I without a step, and is attached to the instrument panel I without a gap.

Figure 4:
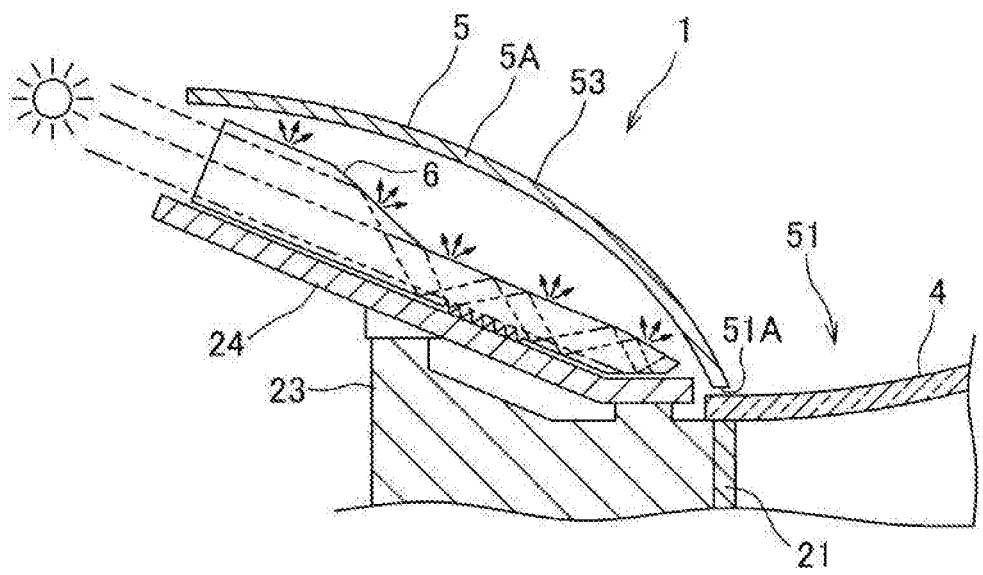
FIG. 4 is a sectional view illustrating apart of the vehicle display device, the part being enlarged.
Figure 5:
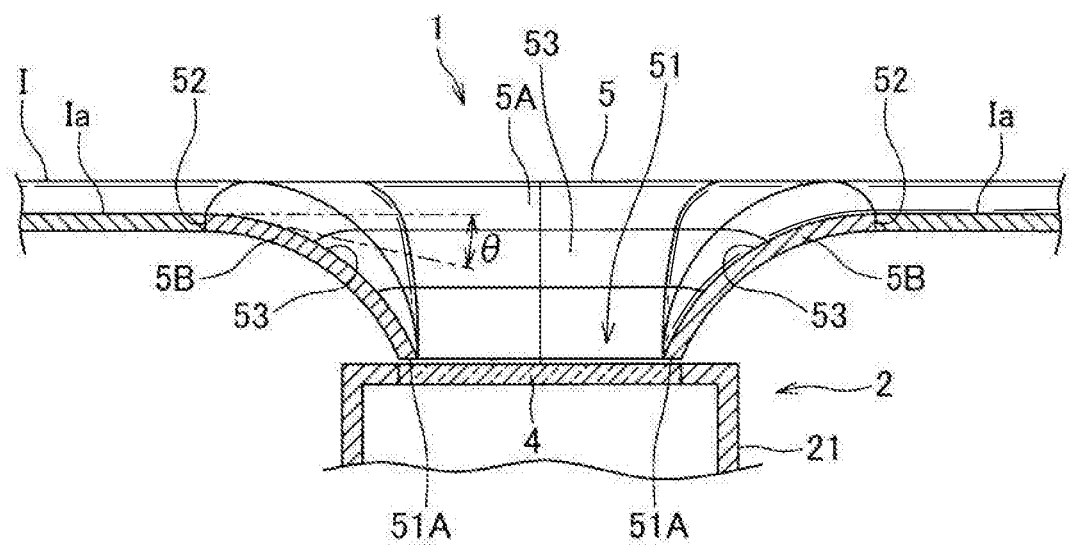
FIG. 5 is a sectional view illustrating a part of the vehicle display device, the part being enlarged.

Further, as illustrated in FIGS. 4 and 5, the bezel body 5 includes a frame surface portion 53 serving as a descending slope from the outer edge portion 52 toward the end edge 51A of the opening portion 51. The frame surface portion 53 is formed in an upward convex curved shape in which the descending slope becomes gradually larger as going from the outer edge portion 52 toward the end edge 51A of the opening portion 51, that is, in a mortar shape in which the entire surface of the bezel body 5 lowers toward the opening portion 51 of a central portion. Further, the bezel body 5 includes a front frame unit 5A positioned on the vehicle front side, a pair of transverse frame units 5B positioned on the right and left sides, and a rear frame unit 5C positioned on a vehicle rear side, and is formed in an approximately square annular shape in plan view.

Such a bezel body 5 is made of a thermoplastic resin having an appropriate thickness, and is molded by injection molding, for example. The thermoplastic resin is a semi-transparent material that transmits light, and the transmittance after molding is favorably about 20%. Further, surface treatment similar to that on the surface Ia of the instrument panel I is provided on the frame surface portion 53 of the bezel body 5. The surface treatment includes uneven finishing treatment that forms unevenness at the time of injection molding, and coating treatment that coats the surface after molding. The frame surface portion 53 and the surface Ia of the instrument panel I after the surface treatment are set to have equivalent degrees of glossiness and colors. Here, the degrees of glossiness can be considered to be equivalent to each other if, on the basis of values measured using a gloss meter or the like, the value of the degree of glossiness of the frame surface portion 53 is ±10% of the value of the degree of glossiness of the surface Ia of the instrument panel I.

Here, an example of the uneven finishing treatment at the time of injection molding includes emboss processing that forms unevenness having an uneven dimension of about 0.1 to 1 mm. An example of a molding method of applying such emboss processing includes so-called heat & cool injection molding. In the heat & cool injection molding, a mold having unevenness for emboss in a molding surface is used, a melt resin is injected into and filled in a cavity in a state where the mold is heated, and the mold is opened after cooled, so that the unevenness of the emboss can be provided in the frame surface portion 53 of the bezel body 5. Meanwhile, in a case where the surface Ia of the instrument panel I is visually recognized in a bright manner even if the emboss processing is applied on the frame surface portion 53 of the bezel body 5, fine uneven processing that forms fine unevenness having a smaller uneven dimension (for example, 10 to 100 μm) than the emboss may be applied on the surface Ia to decrease the degree of glossiness of the surface Ia.

As illustrated in FIG. 4, the front frame unit 5A of the bezel body 5 is provided to have the back side released toward the vehicle front side, and the light guide member 6 is provided below the front frame unit 5A. The light guide member 6 is a prism that reflects, in its inside, the light from outside entering through the windshield F at the vehicle front side, and emits the light toward the back surface of the front frame unit 5A. The light guide member 6 is formed to have an appropriate polygonal section having a plurality of reflection surfaces so that the emitted light is dispersed to become uniform dispersed light.

The support member 24 that supports the light guide member 6 is configured from a metal plate and the like, and is configured such that a surface on the light guide member 6 side is a mirror surface and reflects the light emitted from the light guide member 6 toward the light guide member 6. The light guide member 6 and the support member 24 are provided below the front frame unit 5A of the bezel body 5, as described above. Therefore, the light from outside entering through the windshield F is reflected on and dispersed in the inside of the light guide member 6, and a part of the light is reflected on the support member 24 and is emitted from a top surface of the light guide member 6 toward the back surface of the front frame unit 5A as dispersed light. The emitted dispersed light is transmitted through the front frame unit 5A of the bezel body 5 having semi-transparency, and is emitted above the front frame unit 5A, so that the frame surface portion 53 in the front frame unit 5A is seen bright.

As illustrated in FIG. 5, the transverse frame units 5B of the bezel body 5 have the outer edge portions 52 provided in contact with the right and left instrument panels I, and the frame surface portion 53 of the transverse frame unit 5B and the surface Ia of the instrument panel I are continuously provided without a step such that an angle θ made by the frame surface portion 53 and the surface Ia becomes 30° or less in the outer edge portion 52. The bezel body 5 is formed such that the angle θ made by the frame surface portion 53 and the surface Ia of the instrument panel I becomes small. Therefore, as the reflected images reflected in the windshield F illustrated in FIG. 3, contrast in a boundary of a reflected image Ir of the instrument panel I and a reflected image 5r of the bezel body 5 can be suppressed and made unnoticeable. Note that the angle θ made by the frame surface portion 53 and the surface Ia of the instrument panel I in the outer edge portion 52 may just be 30° or less. However, the angle θ is favorably 20° or less from a perspective of a decrease in the contrast.

Figure 6:
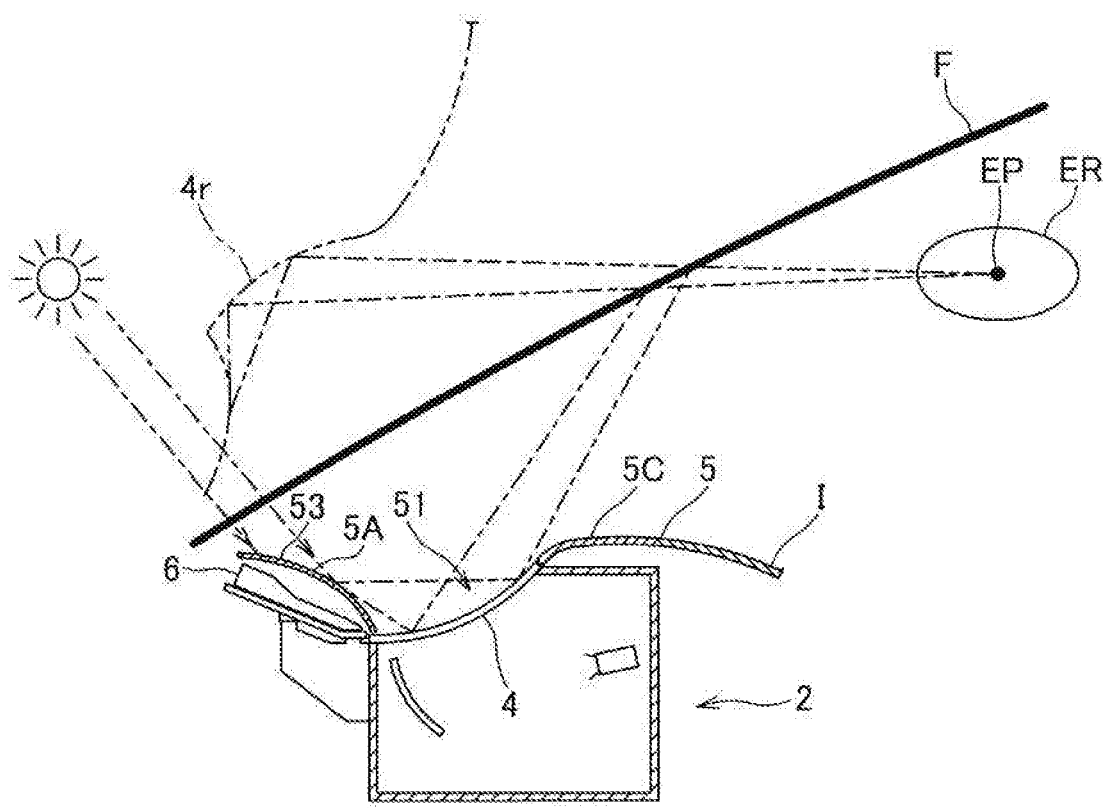
FIG. 6 is a sectional view for describing a function of the vehicle display device.

Further, as illustrated in FIG. 6, the transparent cover 4 is provided to be inclined with a front part low toward the vehicle front side, and the front frame unit 5A of the bezel body 5 is provided to rise in an upward convex curved shape from a front end edge of the transparent cover 4 toward the vehicle front side. With such arrangement of the transparent cover 4 and the front frame unit 5A of the bezel body 5, in a case where an incident angle of the light from outside (sunlight) is low, the light from outside is blocked by the front frame unit 5A and does not reach the transparent cover 4. Meanwhile, when the incident angle (sun altitude) of the light from outside is large, the light reaches the transparent cover 4 but the incident angle with respect to the transparent cover 4 with a front part low becomes large. Therefore, the light from outside reflected on the transparent cover 4 proceeds to the vehicle front side, and cannot proceed to an eye range ER side even if the light from outside is reflected on the windshield F. Therefore, dazzle of the passenger can be prevented.

Further, in a case where the passenger visually recognizes a reflected image 4r (FIG. 3) of the transparent cover 4 through the windshield F, the front frame unit 5A is reflected in a farther point than to the reflected image 4r of the transparent cover 4, as illustrated in FIG. 6. Here, the frame surface portion 53 of the front frame unit 5A is illuminated with the light from outside and is bright, and the dispersed light from the light guide member 6 of the back side is transmitted through the frame surface portion 53 and the frame surface portion 53 is bright, as described above. Therefore, the degree of brightness of the reflected image 4r of the transparent cover 4, in which the frame surface portion 53 is reflected, is increased. As the reflected images reflected in the windshield F, the degree of brightness of the reflected image 4r of the transparent cover 4 is increased, so that the difference (contrast) between the reflected image Ir of the instrument panel I and a reflected image 5r of the bezel body 5 becomes small, and the reflected image 4r of the transparent cover 4 being visually recognized dark and noticeable can be suppressed.

In the vehicle display device 1 of the present embodiment, as the reflected images reflected in the windshield F illustrated in FIG. 3, the degrees of brightness of the reflected image Ir of the instrument panel I, the reflected image 5r of the bezel body 5, and the reflected image 4r of the transparent cover 4 are made uniform. To be specific, a contrast ratio Rr (Rr=E1/E2) between the degree of brightness E1 of a brightest reflected image R1 and the degree of brightness E2 of a darkest reflected image R2, of the reflected images Ir, 5r, and 4r, is set to be 1.3 or less. Note that, as a method of measuring the degrees of brightness of the reflected images Ir, 5r, and 4r, the degrees of brightness may be measured using a measuring device such as an illuminometer, or the degrees of the brightness of the respective units may be calculated by processing an image obtained through capturing by an imaging device such as a CCD camera. Further, the degrees of brightness may be calculated by comparison with samples of the degree of brightness. An arbitrary measuring method can be employed. Further, the contrast ratio Rr is more favorably 1.2 or less.

Such a contrast ratio Rr is set by combination of the shapes, dimensions, and materials of the respective units, as described above, such as by making the degree of glossiness or the color of the frame surface portion 53 of the bezel body 5 equivalent to that of the surface Ia of the instrument panel I by the surface treatment, by adjusting the transmittance by changing the resin material or the thickness of the bezel body 5, by adjusting the intensity or the direction of the emitted light from the light guide member 6 toward the back surface of the front frame unit 5A, or by changing the curved shape of the front frame unit 5A or the angle of the transparent cover 4 to adjust the degree of brightness of the reflected image 4r of the transparent cover 4. Here, the shape of the instrument panel I, and the angle and the curvature of the windshield F are different depending on a model of car. Even the cars of the same model may have different finishing (unevenness or the color) of the surface Ia of the instrument panel I. Therefore, the shape, the dimension, the material, the surface treatment, and the like of the bezel body 5 and the transparent cover 4 are set according to the individual instrument panel I and windshield F.

According to the present embodiment, there are effects as follow. That is, as the reflected images reflected in the windshield F, the respective degrees of brightness of the reflected image Ir of the instrument panel I, the reflected image 5r of the bezel body 5, and the reflected image 4r of the transparent cover 4 are made uniform. Therefore, the contrast among the reflected images Ir, 5r, and 4r is suppressed, any of the reflected images Ir, 5r, and 4r is not noticeable, and the feeling of strangeness provided to the passenger can be relieved. Therefore, by decreasing the parallax due to the dark reflected images Ir, 5r, and 4r, the visibility of the virtual image G3 of the display image G2 can be improved.

The angle θ made by the frame surface portion 53 of the bezel body 5 and the surface Ia of the instrument panel I is 30° or less in the boundary portion. Therefore, the contrast between the reflected images Ir and 5r reflected in the windshield F can be suppressed. Further, the frame surface portion 53 is formed in an upward convex curved shape, and the slope on the outer edge portion 52 side is gently formed, and thus the outer edge portion 52 and the instrument panel I smoothly continue. Therefore, change of the degree of brightness of the reflected image 5r of the bezel body 5 reflected in the windshield F can be made gentle, and the feeling of strangeness provided to the passenger can be further relieved. Therefore, even if there is the difference in the degree of brightness between the reflected image Ir of the instrument panel I and the reflected image 5r of the bezel body 5, the difference can be made unnoticeable, and the feeling of strangeness provided to the passenger can be relieved. Further, in the bezel body 5, the opening portion 51 side can be made deep, and the degree of freedom in setting of the installation height of the transparent cover 4 and the angle can be enhanced.

Further, the bezel body 5 is formed of a semi-transparent material, the light guide member 6 is provided below the front frame unit 5A of the bezel body 5, and the light emitted from the light guide member 6 is transmitted to the surface side of the front frame unit 5A and the surface of the front frame unit 5A becomes bright. Therefore, the reflected image of the front frame unit 5A reflected in the windshield F being dark can be suppressed. Further, the bright front frame unit 5A is reflected in a farther point than to the reflected image 4r of the transparent cover 4. Therefore, the degree of brightness of the reflected image 4r of the transparent cover 4 is enhanced, the contrast between the reflected image Ir of the instrument panel I and the reflected image 5r of the bezel body 5 becomes small, and the reflected image 4r of the transparent cover 4 being visually recognized dark can be suppressed.

The surface treatment such as emboss processing and coloring is applied to the frame surface portion 53 of the bezel body 5, and the degrees of glossiness and the colors between the frame surface portion 53 and the surface Ia of the instrument panel I are set in an equivalent manner. Therefore, the appearance of the reflected image 5r of the bezel body 5 and the reflected image Ir of the instrument panel I, the reflected images being reflected in the windshield F, can be close to each other, and the feeling of strangeness can be less likely to be provided to the passenger. Further, if the fine uneven processing is applied to the surface Ia of the instrument panel I and finer unevenness than the emboss is formed, so that the degree of glossiness of the surface Ia is decreased, the contrast between the reflected image Ir of the instrument panel I and the reflected image 5r of the bezel body 5 can be further suppressed.

Note that the present invention is not limited to the embodiment, and includes other configurations and the like that can achieve the objective of the present invention and also includes modifications and the like as described below. For example, in the embodiment, the bezel body 5 separately formed from the instrument panel I is used as a frame having an opening portion. However, an embodiment is not limited thereto, and the frame unit may be integrally formed as a part of the instrument panel.

Further, the frame unit is not limited to the one formed in a mortar shape having the descending slope toward the opening portion 51, like the bezel body 5 of the embodiment, the frame unit may be one formed in an approximately flat manner with the surface of the instrument panel, or one formed to have an ascending slope toward the opening portion, instead of the descending slope. Further, in the embodiment, the transparent cover 4 as a transmission unit is provided with a front part low toward the vehicle front side. However, an embodiment is not limited thereto, and the transmission unit may be provided in an approximately horizontal manner, or may be provided to be inclined with a front part high, or in a right and left direction.

Further, in the above-described embodiment, the bezel body 5 as a frame unit is formed of a semi-transparent material and is configured to have optical transparency, and the light guide member 6 as emission unit is provided below the front frame unit 5A. However, the frame unit may not have the optical transparency, and in this case, the emission unit can be omitted. Further, the emission unit is not limited to the one provided below the front frame unit 5A, and may be provided below the entire bezel body 5 including the transverse frame unit 5B and the rear frame unit 5C, or may just be provided below at least any of the front frame unit 5A, the transverse frame unit 5B, and the rear frame unit 5C. Further, the emission unit is not limited to the light guide member 6 that allows the light from outside to enter, transmit, reflect, and emit the light, and may include a light-emitting device that emits light by power or a sensor that detects the light from outside.

In addition, the most favorable configurations, methods, and the like for implementing the present invention have been disclosed in the above description. However, the present invention is not limited thereto. That is, although the present invention has been especially illustrated and described regarding a specific embodiment, various modifications can be applied to the above-described embodiment in shapes, materials, quantities, and other detailed configurations by a person skilled in the art without departing from the technical idea and the objective scope of the present invention. Therefore, the shapes, materials, and the like disclosed in the above description are exemplarily described for facilitating the understanding of the present invention, and do not limit the present invention. Therefore, description of a member with a name, from which a part or all of the limitations of the shapes, materials, and the like are removed, is included in the present invention.

Second Invention

Next, a second invention will be described.
The second invention is a bezel body and a vehicle display device having the following characteristics.
(1)
A bezel body including a bezel member fit in a facing wall in an instrument panel of a vehicle, the facing wall facing a windshield, and forming a part or all of a peripheral edge of an opening for projecting an image on the windshield by an image projector arranged in the instrument panel,
the bezel body including a light source unit provided in an inner side of the bezel member, and adapted to emit light toward the bezel member, wherein
at least a part of the bezel member is configured to transmit the light of the light source unit so that the light emitted from the light source unit is projected on the windshield.
(2)
The bezel body according to (1), wherein
the entire bezel member is configured to transmit the light of the light source unit, and the bezel member is formed in an annular shape in plan view to form all of the peripheral edge of the opening.
(3)
The bezel body according to (2), wherein
the light source unit is arranged to face at least one of an outer edge portion and an inner edge portion of the bezel member.
(4)
The bezel body according to (2), wherein
the light source unit is provided to emit the light to the entire bezel member, and
the bezel member is formed to have a thickness gradually changed as going from the outer edge portion to the inner edge portion of the bezel member.
(5)
The bezel body according to (1), wherein
a portion that transmits the light emitted from the light source unit in the bezel body has a shape of a symbol indicating predetermined information to the windshield.
(6)
A vehicle display device including:
an image projector arranged in an instrument panel of a vehicle; and
a bezel body including a bezel member fit in a facing wall in the instrument panel, the facing wall facing a windshield, and forming a part or all of a peripheral edge of an opening for projecting an image on the windshield by the image projector, wherein
the bezel body is configured from the bezel body according to any one of (1) to (5).

Hereinafter, the second invention will be described in detail.

TECHNICAL FIELD

The present invention relates to a bezel body disposed in an instrument panel of a vehicle, and a vehicle display device including the bezel body.

BACKGROUND ART

Figure 22:
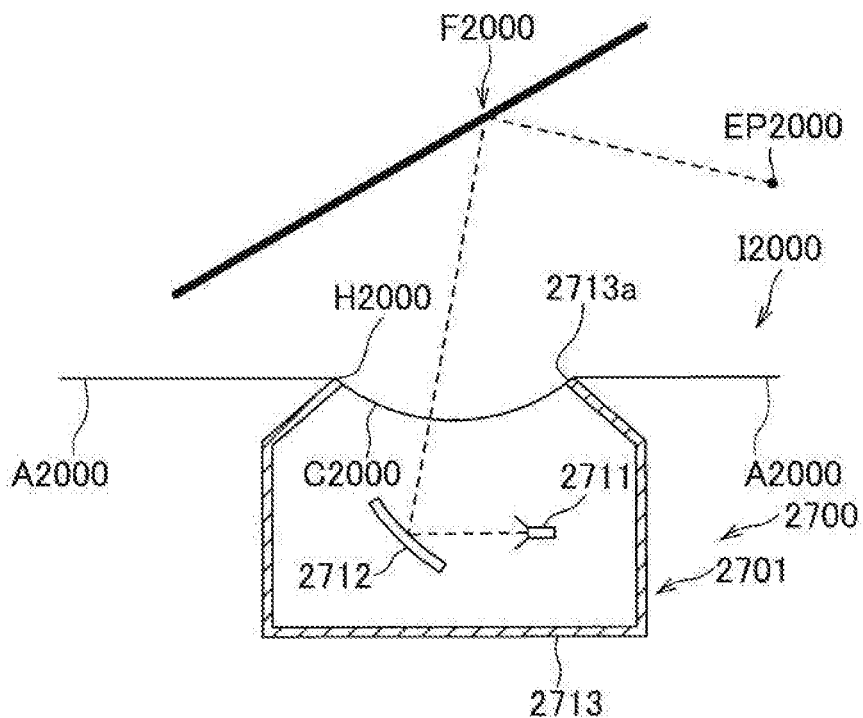
FIG. 22 is a diagram illustrating a conventional vehicle display device.

Conventionally, a vehicle display device as a head-up display device that projects an image on a windshield of a vehicle is provided in an instrument panel (for example, see Patent Literature 21). A vehicle display device 2700 described in Patent Literature 21 is attached inside an instrument panel I2000 having an opening H2000 provided in a facing wall A2000 facing a windshield F2000, as illustrated in FIG. 22, and projects an image on the windshield F2000 through the opening H2000 by an image projector 2701.

CITATION LIST

Patent Literature

Patent Literature 21: JP 2007-148092 A

SUMMARY OF INVENTION

Technical Problem

The image projector 2701 includes a display source 2711, a reflection portion 2712 for reflecting the image from the display source, and a housing 2713 in which the display source 2711 and the reflection portion 2712 are accommodated. An opening 2713a is formed in an upper surface of the housing 2713. The image projector 2701 reflects the image projected by the display source 2711 on the reflection portion 2712, and projects the image on the windshield F2000 through the opening 2713a. Accordingly, a passenger of the vehicle recognizes the image displayed on the windshield F2000. An EP2000 illustrated in FIG. 22 indicates an eye point of the passenger.

However, production of various visual effects using light, such as improvement of visibility of the image displayed on the windshield F2000 by the vehicle display device 2700, attracting passenger's attention, an display of information other than the image displayed by the vehicle display device 2700 on the windshield F2000 has been demanded.

Therefore, the present invention has focused on the problem as described above, and an objective of the present invention is to provide a bezel body that can produce various visual effects using light and a vehicle display device including the bezel body.

Solution to Problem

To solve the above-described problem, the invention described in (1) is a bezel body including a bezel member fit in a facing wall in an instrument panel of a vehicle, the facing wall facing a windshield, and forming a part or all of a peripheral edge of an opening for projecting an image on the windshield by an image projector arranged in the instrument panel, the bezel body including a light source unit provided in an inner side of the bezel member, and adapted to emit light toward the bezel member, wherein at least a part of the bezel member is configured to transmit the light of the light source unit so that the light emitted from the light source unit is projected on the windshield.

The invention described in (2) is that, in the invention according to (1), the entire bezel member is configured to transmit the light of the light source unit, and the bezel member is formed in an annular shape in plan view to form all of the peripheral edge of the opening.

The invention described in (3) is that, in the invention according to (2), the light source unit is arranged to face at least one of an outer edge portion and an inner edge portion of the bezel member.

The invention described in (4) is that, in the invention according to (2), the light source unit is provided to emit the light to the entire bezel member, and the bezel member is formed to have a thickness gradually changed as going from the outer edge portion to the inner edge portion of the bezel member.

The invention described in (5) is that, in the invention according to (1), a portion that transmits the light emitted from the light source unit in the bezel body has a shape of a symbol indicating predetermined information to the windshield.

The invention described in (6) is a vehicle display device including: an image projector arranged in an instrument panel of a vehicle; and a bezel body including a bezel member fit in a facing wall in the instrument panel, the facing wall facing a windshield, and forming a part or all of a peripheral edge of an opening for projecting an image on the windshield by the image projector, wherein the bezel body is configured from the bezel body according to any one of (1) to (5).

Advantageous Effects of Invention

According to the invention described in (1), the light source unit provided in an inner side of the bezel member and which emits light toward the bezel member is included, and at least a part of the bezel member is configured to transmit the light of the light source unit so that the light emitted from the light source unit is projected on the windshield. From this configuration, various visual effects can be produced using the light emitted from the light source unit, in addition to the image projected on the windshield by the image projector.

According to the invention described in (2), the entire bezel member is configured to transmit the light of the light source unit, and the bezel member is formed in an annular shape in plan view to form all of the peripheral edge of the opening. From this configuration, the light from the light source unit is projected to surround the image projected on the windshield by the image projector, and the visibility of the image projected on the windshield by the image projector can be improved, and attracting passenger's attention can be performed.

According to the invention described in (3), the light source unit is arranged to emit light to at least one of the outer edge portion and the inner edge portion of the bezel member. From this configuration, the light from the light source unit is projected to surround the image projected on the windshield by the image projector, the visibility of the image projected on the windshield by the image projector can be improved, and attracting passenger's attention can be performed.

According to the invention described in (4), the bezel member is formed to have the thickness gradually changed as going from the outer edge portion to the inner edge portion of the bezel member. From this configuration, the light emitted from the light source unit is projected to surround the image projected on the windshield by the image projector in such a manner that the intensity of the light is continuously changed outward from the projected image. The visibility of the image projected on the windshield by the image projector can be improved, and attracting passenger's attention can be performed.

According to the invention described in (5), the portion that transmits the light emitted from the light source unit in the bezel body has the shape of a symbol indicating predetermined information to the windshield. From this configuration, the light emitted from the light source unit and transmitted through the portion that transmits the light of the bezel body has the shape of a symbol indicating the predetermined information and is projected on the windshield. Therefore, the predetermined information can be indicated to the windshield, in addition to the image projected by the image projector.

According to the invention described in (6), the bezel body according to anyone of (1) to (4) is included. Therefore, various visual effects can be produced using the light emitted from the light source unit, in addition to the image projected on the windshield by the image projector.

Description of Embodiments

First Embodiment

A vehicle display device and a bezel body according to a first embodiment of the present invention will be described with reference to FIGS. 7 to 10.

A vehicle display device 2001 of the present embodiment is used as a head-up display device attached to an instrument panel I2000 of a vehicle V2000 and which performs projection on a windshield F2000, and includes an image projector 2010 and a bezel body 2020. Note that, in the present embodiment, an up and down direction, a front and rear direction, and a right and left direction correspond to an up and down direction, a front and rear direction, and a right and left direction of the vehicle V2000.

Figure 7:
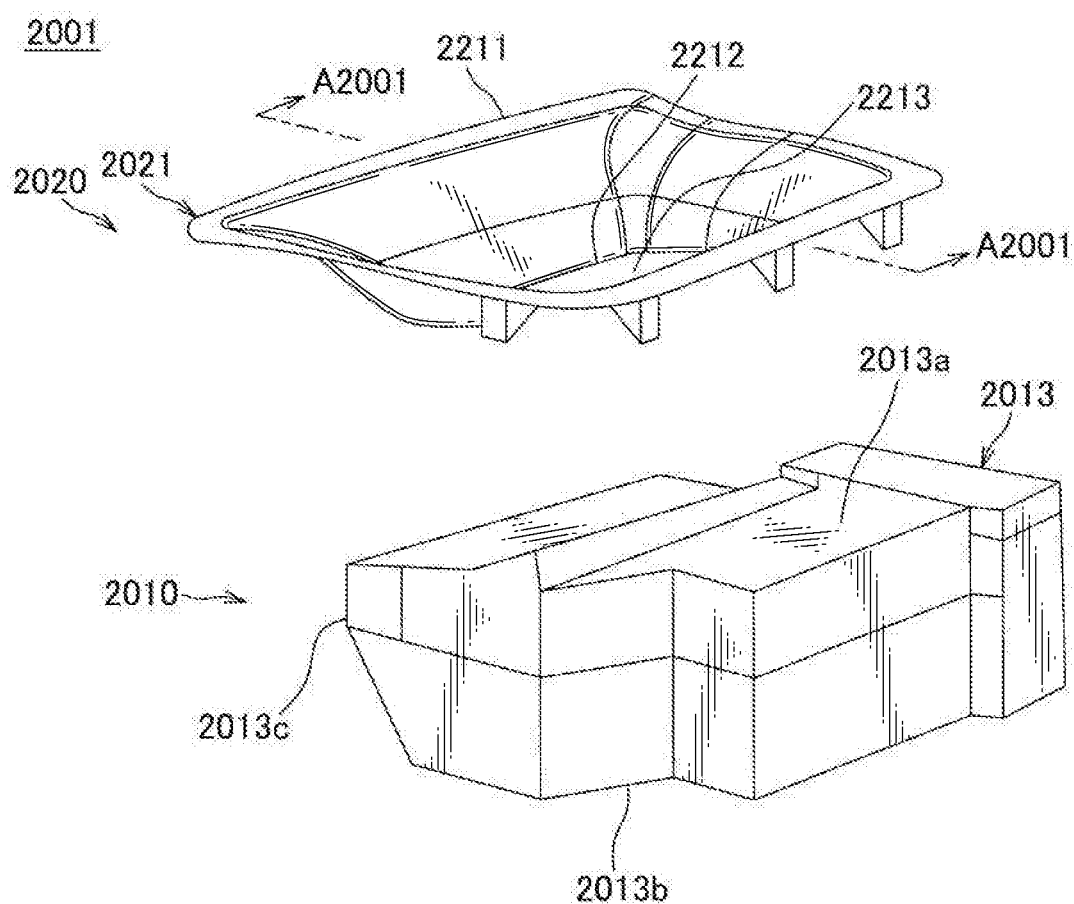
FIG. 7 is an exploded perspective view illustrating a vehicle display device according to a first embodiment of the present invention.
Figure 8:
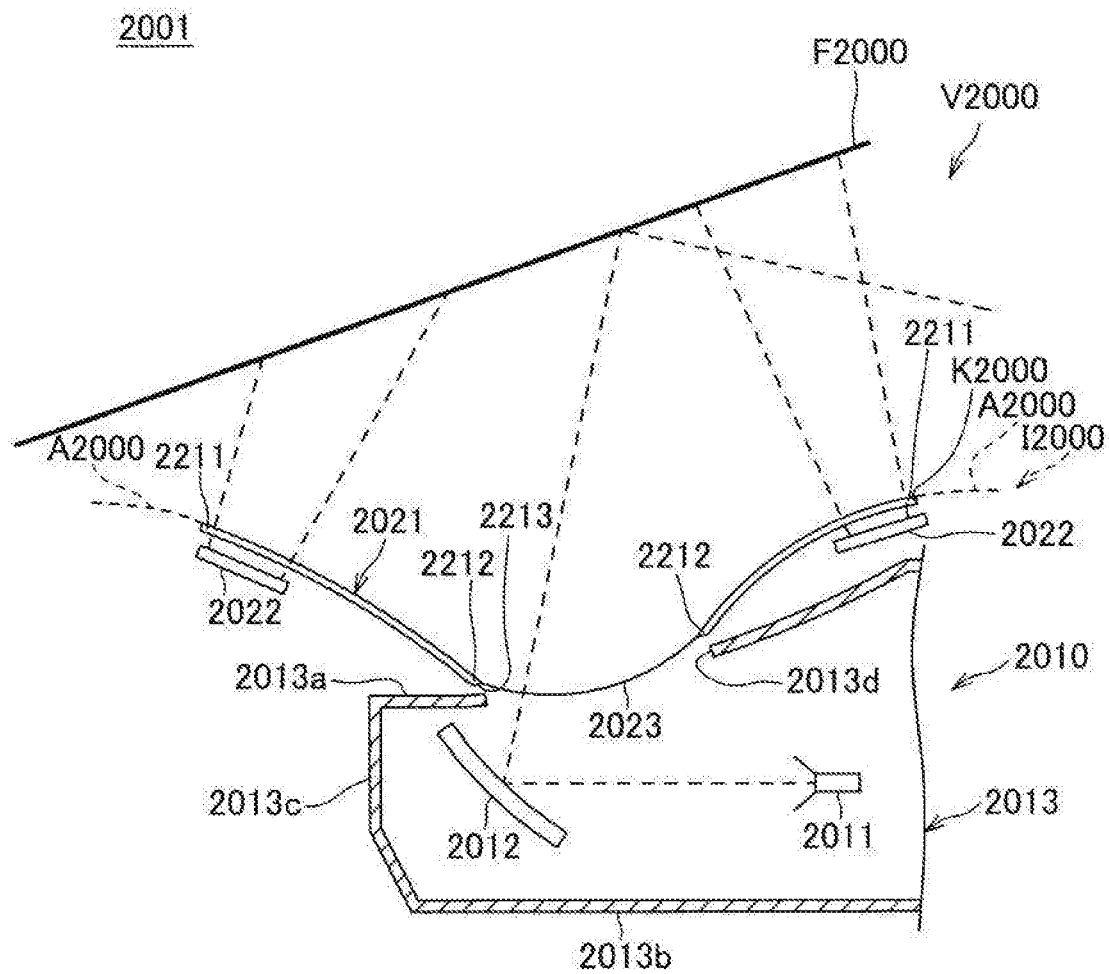
FIG. 8 is a diagram illustrating an arrow view A2001-A2001 line section of the vehicle display device illustrated in FIG. 7, and is a sectional view illustrating a state in which the vehicle display device is assembled in a vehicle.
Figure 9:
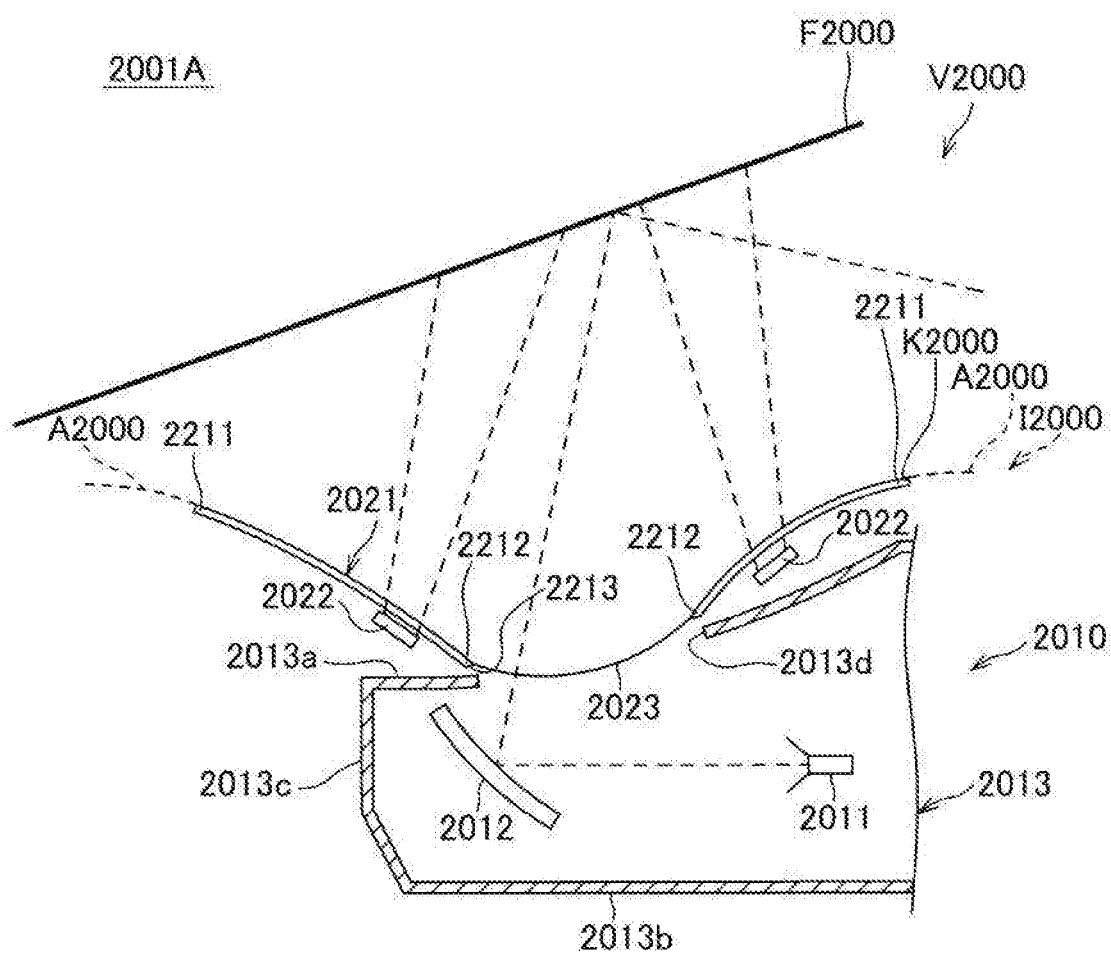
FIG. 9 is a diagram illustrating a modification of the vehicle display device illustrated in FIG. 8.

As illustrated in FIGS. 7 and 8, the image projector 2010 is provided with a display source 2011, a reflection portion 2012 that reflects an image from the display source 2011, and a housing 2013 in which the display source 2011 and the reflection portion 2012 are accommodated. The housing 2013 is formed in a box shape, using a synthetic resin, and includes an upper surface wall 2013a, a bottom wall 2013b, a peripheral wall 2013c, and an opening 2013d provided in the upper surface wall 2013a. The opening 2013d is arranged to be layered with an opening 2213 of a bezel member 2021 described below. Further, the image projector 2010 reflects an image projected by the display source 2011, on the reflection portion 2012 and projects the image on a region R2001 (see FIG. 10) of the windshield F2000 through the opening 2013d. Accordingly, the passenger of the vehicle V2000 recognizes the image displayed on the windshield F2000.

The bezel body 2020 includes the bezel member 2021 fit in a hole K2000 provided in a facing wall A2000 of the instrument panel I2000, the facing wall A2000 facing the windshield F2000, a light source unit 2022 that emits light toward the bezel member 2021, and a cover 2023 attached to the opening 2213 provided in the bezel member, which is described below. Because the cover 2023 is attached, dust and water can be prevented from intruding into an inside through an opening 2313.

The bezel member 2021 is formed in an annular shape in plan view, using a synthetic resin having optical transparency. The bezel member 2021 is gradually formed downward as going from an outer edge portion 2211 to an inner edge portion 2212. The opening 2213 for projecting the image on the windshield F2000 by the image projector 2010 is formed in the bezel member 2021. That is, the bezel member 2021 forms all of a peripheral edge of the opening 2213. The bezel member 2021 may be formed of a synthetic resin containing a light diffusing agent. Further, a light diffusing member (not illustrated) for diffusing the light may be arranged between the bezel member 2021 and the light source unit 2022.

As illustrated in FIG. 8, when the bezel member 2021 is fit in the hole K2000 provided in the facing wall A2000, the outer edge portion 2211 of the bezel member 2021 is arranged to continue into the facing wall A2000, and an outer surface (upper surface) of the bezel member 2021 and an outer surface of the facing wall A2000 are arranged to smoothly continue. At this time, the opening 2213 of the bezel member 2021 and the opening 2013d of the image projector 2010 are layered and arranged in the up and down direction. Further, color adjustment to have similar appearance to the facing wall A2000, surface finishing, and the like are performed for the bezel member 2021 so that a difference in glare to the windshield F2000 between the bezel member 2021 and the facing wall A2000 of the instrument panel I2000 is not noticeable.

As illustrated in FIG. 8, the light source unit 2022 is arranged to face the entire inner side (lower side) of the outer edge portion 2211 of the bezel member 2021. Further, the light source unit 2022 includes a light source such as an LED, and can emit light toward the bezel member 2021. The light emitted toward the bezel member 2021 is transmitted through the bezel member 2021 and projected on the windshield F2000.

Figure 10:
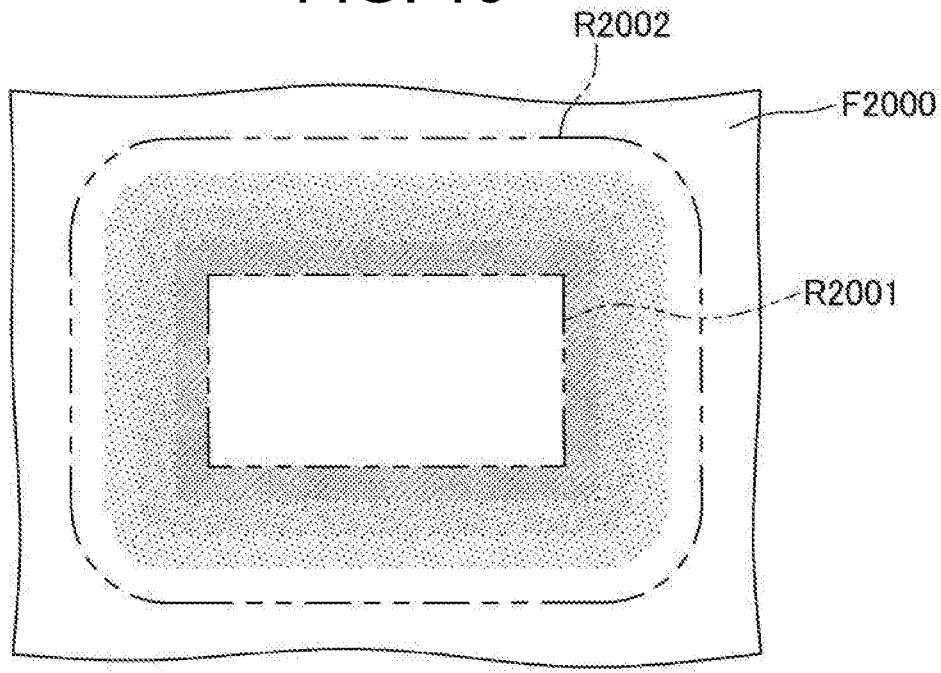
FIG. 10 is a diagram illustrating a state in which light is projected on a windshield using the vehicle display device illustrated in FIGS. 8 and 12.

FIG. 10 is a diagram schematically illustrating a state in which the light emitted from the light source unit 2022 is projected on the windshield F2000. As illustrated in FIG. 10, the region R2001 where the image projected on the windshield F2000 by the image projector 2010 is displayed is surrounded by a region R2002 where the light emitted from the light source unit 2022 is projected. Further, as illustrated in FIG. 8, because the light source unit 2022 is arranged inside (in a lower side) of the outer edge portion 2211 of the bezel member 2021, the light projected on the windshield F2000 through the bezel member 2021 from the light source unit 2022 is changed to gradually become brighter as going from an inner periphery to an outer periphery of the region R2002. Further, in a case where the bezel member 2021 is formed of a synthetic resin containing a light diffusing agent, or a case where the light diffusing member for diffusing the light is arranged between the bezel member 2021 and the light source unit 2022, the light emitted from the light source unit 2022 is diffused by the bezel member 2021 or the light diffusing member, and nonuniformity of the light projected on the windshield F2000 due to arrangement of the light source such as LEDs in the light source unit 2022 can be suppressed.

According to the present embodiment, the bezel body 2020 included in the vehicle display device 2001 includes the light source unit 2022 provided in an inner side of the bezel member 2021, and which emits the light toward the bezel member 2021, and the bezel member 2021 is configured to transmit the light of the light source unit 2022 such that the light emitted from the light source unit 2022 is projected on the windshield F2000. From this configuration, various visual effects can be produced using the light emitted from the light source unit 2022, in addition to the image projected on the windshield F2000 by the image projector 2010.

Further, the bezel member 2021 is formed of a synthetic resin having optical transparency, and is formed in an annular shape in plan view to form all of the peripheral edge of the opening 2213. From this configuration, the light from the light source unit 2022 is projected to surround the periphery of the image projected on the windshield F2000 by the image projector 2010. The visibility of the image projected on the windshield F2000 by the image projector 2010 can be improved, and the attracting passenger's attention can be performed.

Note that the present invention is not limited to the embodiment, and includes other configurations and the like that can achieve the objective of the present invention and also includes modifications and the like as described below.

Figure 11:
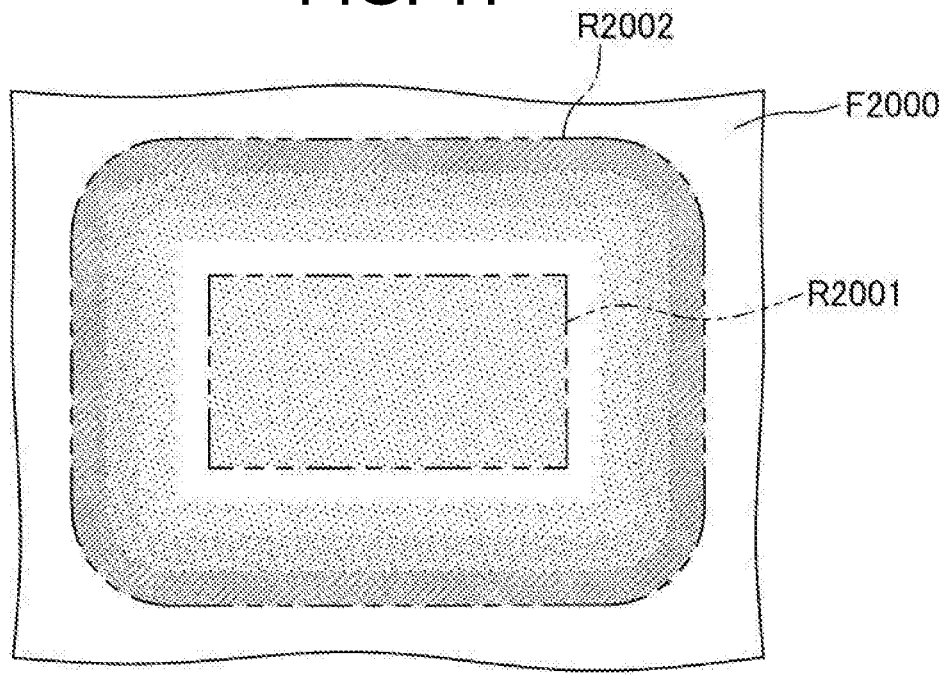
FIG. 11 is a diagram illustrating a state in which light is projected on a windshield using the vehicle display device illustrated in FIGS. 9 and 13.

In the present embodiment, the light source unit 2022 is arranged to face the entire inner side (lower side) of the outer edge portion 2211 of the bezel member 2021. However, in the bezel member of the present invention, the light source unit 2022 may just be arranged to emit the light to at least one of the outer edge portion 2211 and the inner edge portion 2212 of the bezel member 2021, and the light source unit 2022 may be arranged to face the entire inner side (lower side) of the inner edge portion 2212 of the bezel member 2021, like a vehicle display device 2001A illustrated in FIG. 9. In this case, the light projected on the windshield F2000 through the bezel member 2021 from the light source unit 2022 is changed to gradually become darker as going from the inner periphery to the outer periphery of the region R2002, as illustrated in FIG. 11.

Further, the light source unit 2022 may be arranged to face the entire inner side (lower side) of the outer edge portion 2211 and the inner edge portion 2212 of the bezel member 2021. In this case, the light projected on the windshield F2000 through the bezel member 2021 from the light source unit 2022 is changed to gradually become darker as going from the inner periphery and the outer periphery to an intermediate portion of the region R2002.

Second Embodiment

A vehicle display device according to a second embodiment of the present invention will be described with reference to FIGS. 10 to 17. Note that, in the present embodiment, the same configuration portions as those in the first embodiment are denoted with the same reference signs and description is omitted.

A vehicle display device of the present embodiment is used as a head-up display device attached to an instrument panel I2000 of a vehicle V2000, and which performs projection on a windshield F2000. The vehicle display device includes an image projector 2010 (see FIGS. 7 and 8) and a bezel body 2030.

Figure 12:
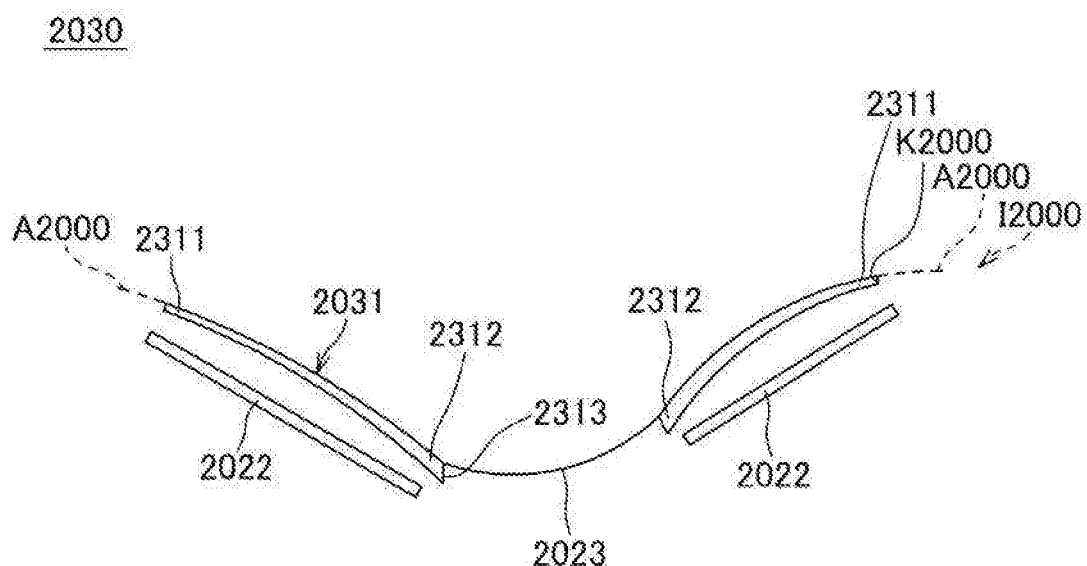
FIG. 12 is a sectional view illustrating a bezel body in a vehicle display device according to a second embodiment of the present invention.
Figure 13:
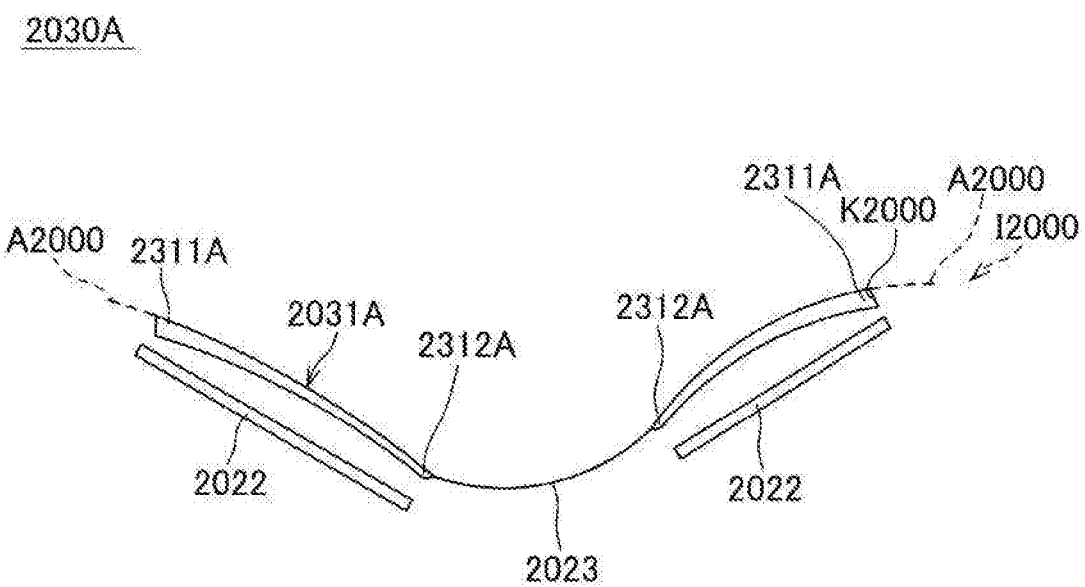
FIG. 13 is a diagram illustrating a modification of the bezel body illustrated in FIG. 12.
Figure 14:
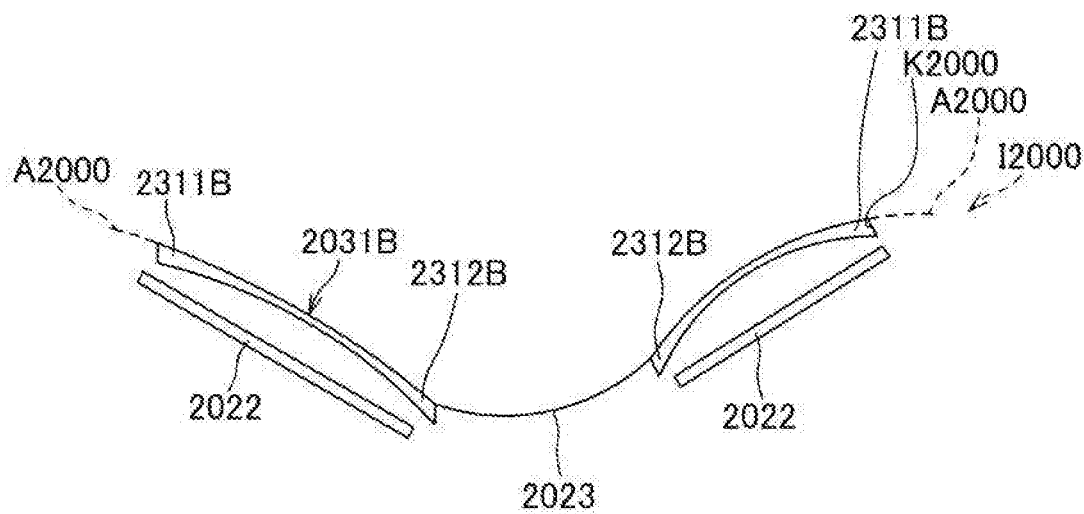
FIG. 14 is a diagram illustrating another modification of the bezel body illustrated in FIG. 12.

As illustrated in FIG. 12, the bezel body 2030 includes a bezel member 2031 fit in a hole K2000 provided in a facing wall A2000 of the instrument panel I2000, the facing wall A2000 facing the windshield F2000, a light source unit 2022 that emits light toward the bezel member 2031, and a cover 2023 attached to an opening 2313 provided in the bezel member 2031 and described below.

The bezel member 2031 is a bezel member having a different shape from the bezel member 2021 of the first embodiment. As illustrated in FIG. 12, the bezel member 2031 is formed to go gradually downward and to have the thickness gradually become thicker, as going from an outer edge portion 2311 to an inner edge portion 2312. The opening 2313 for projecting an image on the windshield F2000 by the image projector 2010 is formed in the bezel member 2031. That is, the bezel member 2031 forms all of a peripheral edge of the opening 2313.

The light source unit 2022 is configured to perform surface-emission in an annular shape in plan view, which is approximately the same as the shape of the bezel member 2031, using an LED array or an organic EL illumination module, for example. The light source unit 2022 is arranged to face an inner side (lower side) of the bezel member 2031 throughout the outer edge portion 2311 to the inner edge portion 2312 of the bezel member 2031. Accordingly, the light emitted from the light source unit 2022 is emitted toward the entire bezel member 2031.

FIG. 10 is a diagram schematically illustrating a state in which the light emitted from the light source unit 2022 is projected on the windshield F2000. As illustrated in FIG. 12, because the bezel member 2031 is formed to have the thickness gradually become thicker as going from the outer edge portion 2311 to the inner edge portion 2312, the light from the light source unit 2022 is less easily transmitted in a portion of the inner edge portion 2312, which is formed thick. From this configuration, the light projected on the windshield F2000 through the bezel member 2031 from the light source unit 2022 is changed to become gradually brighter as going from an inner periphery to an outer periphery of a region R2002.

According to the present embodiment, the bezel member 2031 is formed to have the thickness gradually become thicker as going from the outer edge portion 2311 to the inner edge portion 2312 of the bezel member 2031. From this configuration, the light emitted from the light source unit 2022 is projected to surround an image projected on a region R2001 of the windshield F2000 by the image projector 2010 such that intensity of light continuously become stronger outward from the projected image. Visibility of the image projected on the windshield F2000 by the image projector 2010 can be improved, and attracting passenger's attention can be performed.

Note that the present invention is not limited to the embodiment, and includes other configurations and the like that can achieve the objective of the present invention and also includes modifications and the like as described below.

In the present embodiment, the bezel member 2031 is formed to have the thickness gradually become thicker as going from the outer edge portion 2311 to the inner edge portion 2312. However, the bezel member of the present invention may just be formed to have the thickness gradually changed as going from the outer edge portion to the inner edge portion of the bezel member, and may be formed to have the thickness gradually thinner as going from an outer edge portion 2311A to an inner edge portion 2312A of a bezel member 2031A, like a bezel body 2030A illustrated in FIG. 13. In this case, as illustrated in FIG. 11, light projected on the windshield F2000 through the bezel member 2031A from the light source unit 2022 is changed to become gradually darker as going from an inner periphery to an outer periphery of a region R2002.

Further, the bezel member may not be formed to have the thickness uniformly changed as going from the outer edge portion to the inner edge portion. The bezel member may be formed to have the thickness become gradually thinner as going from an outer edge portion 2311B to an inner edge portion 2312B of a bezel member 2031B, and gradually become thicker as going from a predetermined position to the inner edge portion 2312B, like a bezel body 2030B illustrated in FIG. 14, for example. In this case, as illustrated in FIG. 16, the light projected on the windshield F2000 through the bezel member 2031B from the light source unit 2022 is dark in an inner periphery and an outer periphery of a region R2002, and is changed to gradually become brighter as going from the inner periphery and the outer periphery to an intermediate portion.

Figure 15:
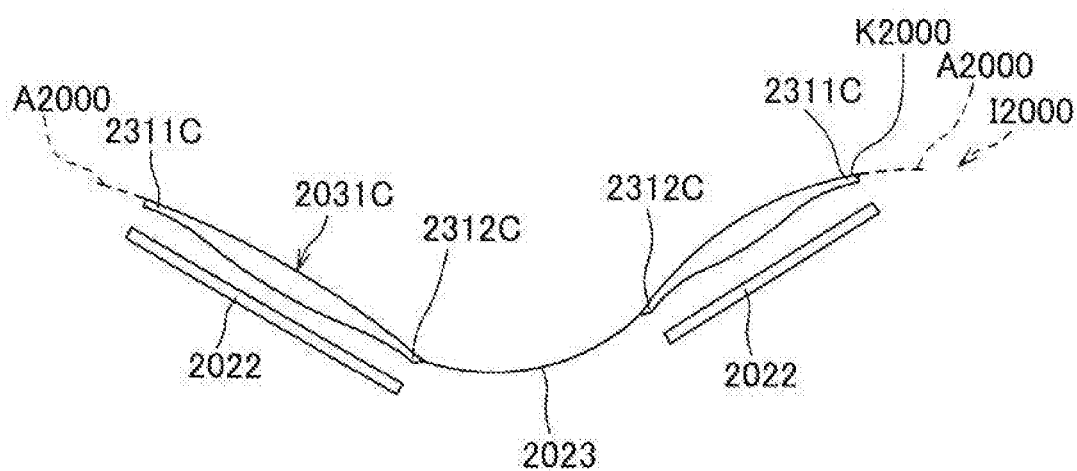
FIG. 15 is a diagram illustrating still another modification of the bezel body illustrated in FIG. 12.

Further, the bezel member may be formed to have the thickness gradually become thicker as going from an outer edge portion 2311C to an inner edge portion 2312C of a bezel member 2031C, and gradually become thinner as going from a predetermined position to the inner edge portion 2312C, like a bezel body 2030C illustrated in FIG. 15. In this case, as illustrated in FIG. 17, the light projected on the windshield F2000 through the bezel member 2031C from the light source unit 2022 is bright in an inner periphery and an outer periphery of a region R2002, and is change to gradually become darker as going from the inner periphery and the outer periphery to an intermediate portion.

Further, the shape of the bezel member of the present invention is not limited to the above examples, and may be formed such that a portion having the thickness gradually become thicker and a portion having the thickness gradually become thinner as going toward the outer edge portion and the inner edge portion of the bezel member are repeated a plurality of times.

Third Embodiment

A vehicle display device 3 according to a third embodiment of the present invention will be described with reference to FIGS. 18 to 21. Note that, in the present embodiment, the same configuration portions as those in the first embodiment are denoted with the same reference signs and description is omitted.

The vehicle display device 3 of the present embodiment is used as a head-up display device attached to an instrument panel I2000 of a vehicle V2000, and which performs projection on a windshield F2000. The vehicle display device 3 includes an image projector 2010 (see FIGS. 7 and 8) and a bezel body 2040.

The bezel body 2040 includes a bezel member 2041 fit in a hole K2000 provided in a facing wall A2000 of the instrument panel I2000, the facing wall A2000 facing the windshield F2000, a light source unit 2022 that emits light toward the bezel member 2041, and a cover 2023 attached to an opening 2413 provided in the bezel member 2041 and described below (see FIGS. 7 and 8). In the present embodiment, the light source unit 2022 is arranged to face an inner side (lower side) of a light transmitting portion 2414 described below of a bezel member 2021.

Figure 18:
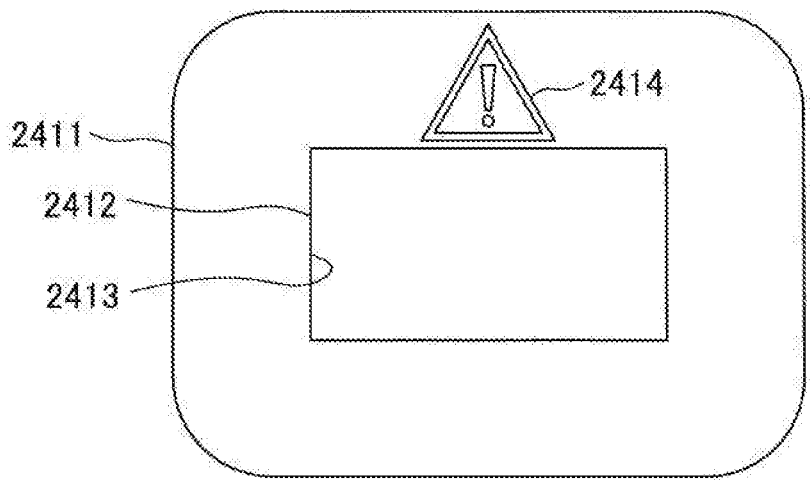
FIG. 18 is a plan view illustrating a bezel body in a vehicle display device according to a third embodiment of the present invention.

FIG. 18 is a plan view of the bezel member 2041 as viewed from a back side (from a lower side when the bezel member 2041 is fit in the instrument panel I2000). Note that an upper side of FIG. 18 corresponds to a rear side of the vehicle V2000, and a lower side corresponds to a front side of the vehicle V2000. The bezel member 2041 is formed to go gradually downward as going from an outer edge portion 2411 to an inner edge portion 2412 in an annular shape in plan view. That is, the bezel member 2021 forms all of a peripheral edge of the opening 2213. Further, a light transmitting portion 2414 that transmits the light from the light source unit 2022 ("a portion that transmits light emitted from the light source unit" in claims) is provided at a vehicle rear side (at an upper side in FIG. 18) with respect to the opening 2413 of the bezel member 2041. The light transmitting portion 2414 is formed into a shape of a triangle and an exclamation mark arranged inside the triangle. The shape formed in the light transmitting portion 2414 indicates meaning of attracting passenger's attention of the vehicle V2000.

Further, the bezel member 2041 is formed such that a portion other than the light transmitting portion 2414 does not transmit light. For example, the bezel member 2041 is formed of a transparent material, and the portion other than the light transmitting portion 2414 is coated with a light shielding coating or the like, so that the portion other than the light transmitting portion 2414 does not transmit light. Note that the light may be blocked by applying masking to a periphery of an edge of the light transmitting portion 2414, or forming the periphery of the edge of the light transmitting portion 2414 thicker than the light transmitting portion 2414. Further, for example, the light transmitting portion 2414 may be formed by forming the bezel member 2041 with a material that does not transmit light and having a hole formed into the shape of the light transmitting portion 2414, and fitting a transparent member having the shape of the light transmitting portion 2414 into the hole.

Further, the light transmitting portion 2414 may be formed in a distorted shape compared with the shape to be displayed so that the shape formed in the light transmitting portion 2414 can be normally displayed without distortion when projected on the windshield F2000. That is, so-called warping may be applied to the shape of the light transmitting portion 2414.

Figure 19:
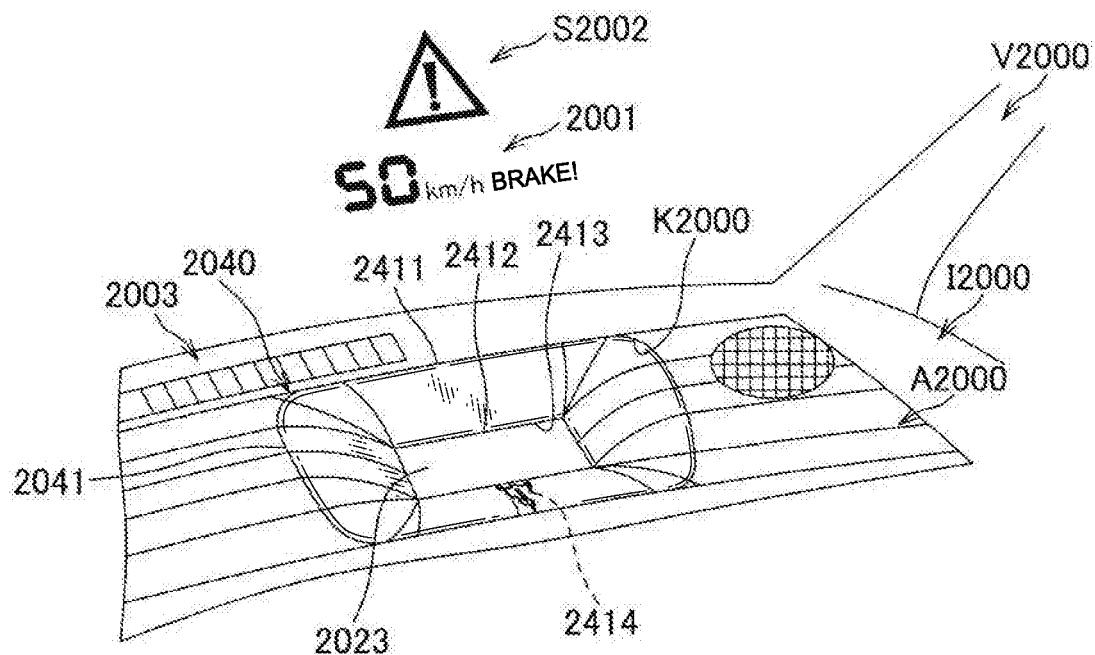
FIG. 19 is a diagram illustrating a state in which light is projected on a windshield using the vehicle display device including the bezel body illustrated in FIG. 18.
Figure 20:
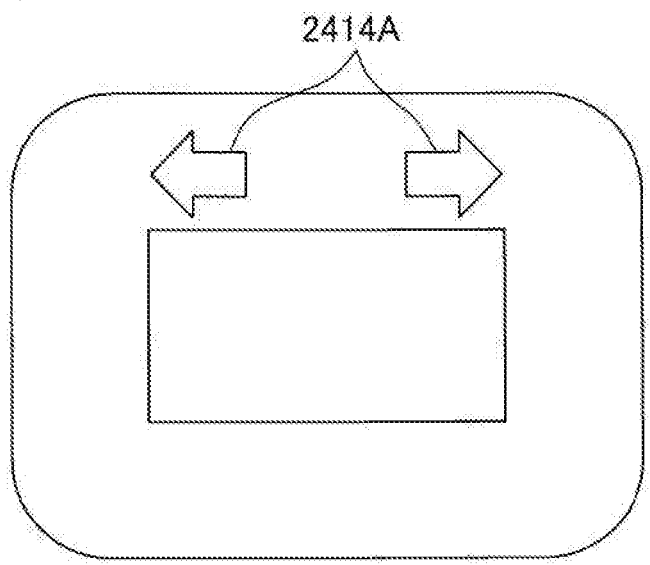
FIG. 20 is a diagram illustrating a modification of the bezel body illustrated in FIG. 18.

FIG. 19 is a diagram schematically illustrating a state in which the light emitted from the light source unit 2022 is projected on the windshield F2000. As illustrated in FIG. 19, the light emitted from the light source unit 2022 is projected, through the light transmitting portion 2414, on a portion above an image (a portion S2001 illustrated in FIG. 19) projected on the windshield F2000 by the image projector 2010, as a symbol having a shape of an exclamation mark inside a triangle (a portion S2002 illustrated in FIG. 19).

Further, for example, as illustrated in FIG. 19, the light source unit 2022 is controlled to emit light toward the bezel member 2041 when an ECU (not illustrated) detects approach of a front vehicle or deviation from a traffic lane and the image projector 2010 projects warning display (display of "brake!" that prompts the passenger to put on the brake) on the windshield F2000. Accordingly, as illustrated in S2002 of FIG. 19, the light emitted from the light source unit 2022 toward the light transmitting portion 2414 is projected on the windshield F2000, as the symbol having the shape of an exclamation mark inside a triangle, and can attract passenger's attention.

According to the present embodiment, the light transmitting portion 2414 of the bezel member 2041 has the shape of the symbol indicating meaning of attracting passenger's attention to the windshield F2000. From this configuration, the light emitted from the light source unit 2022 and transmitted through the light transmitting portion 2414 is projected on the windshield, having the shape of the symbol indicating information of attracting attention. The information of attracting attention can be displayed on the windshield, in addition to the image S2001 projected on the image projector 2010.

Note that the present invention is not limited to the embodiment, and includes other configurations and the like that can achieve the objective of the present invention and also includes modifications and the like as described below.

For example, in the present embodiment, the bezel member 2041 is formed in an annular shape in plan view to form all of the peripheral edge of the opening 2413. However, the bezel member 2041 may be formed to have only a portion where the light transmitting portion 2414 is provided. For example, the bezel member 2041 may be formed to have only a portion arrange on a vehicle rear side.

In the present embodiment, the light transmitting portion 2414 is formed to have the shape of an exclamation mark inside a triangle, which indicates meaning of attracting passenger's attention. However, the light transmitting portion may just have a shape of a symbol indicating predetermined information to the windshield F2000, or may have another shape. For example, the light transmitting portion may have shapes of arrow symbols indicating right and left directions, respectively, like light transmitting portions 2414A in a bezel member 2041A included in a bezel body 2040A illustrated in FIGS. 20 and 21.

Figure 21:
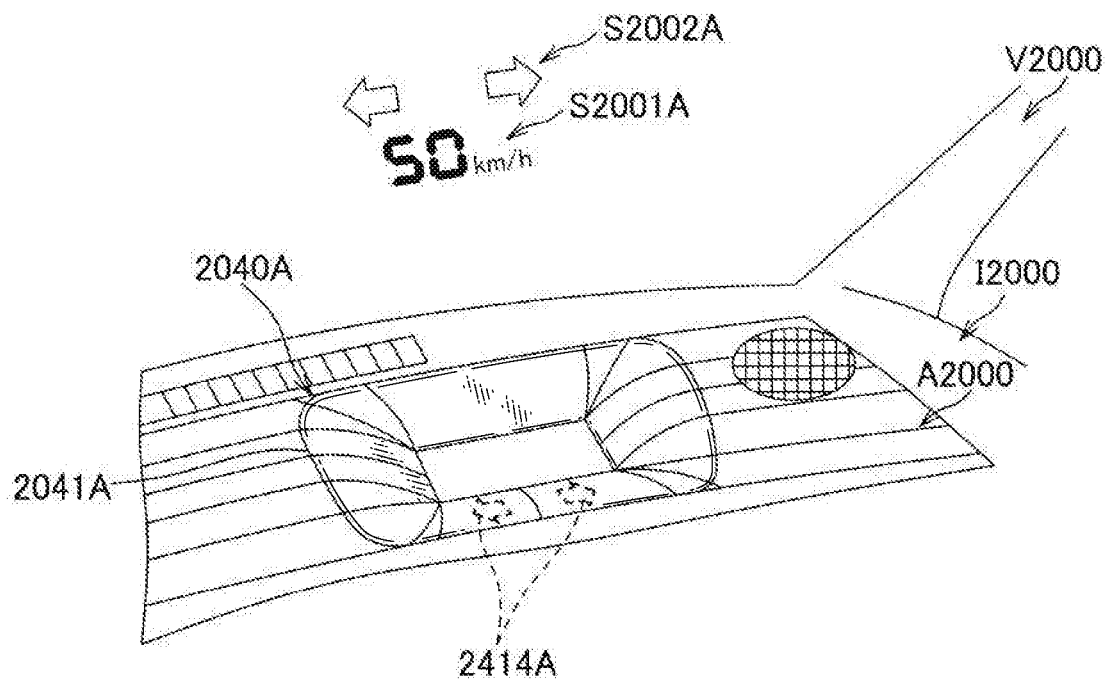
FIG. 21 is a diagram illustrating a state in which light is projected on a windshield using the vehicle display device including the bezel body illustrated in FIG. 20.

FIG. 21 is a diagram schematically illustrating a state in which the light emitted from the light source unit 2022 is projected on the windshield F2000. As illustrated in FIG. 21, the light emitted from the light source unit 2022 is projected, through the light transmitting portions 2414A, on a portion above an image (a portion S2001A illustrated in FIG. 21) projected on the windshield F2000 by the image projector 2010, as symbols having arrow shapes indicating a left direction and a right direction (portions S2002A illustrated in FIG. 21). For example, the light source unit 2022 is lighted in accordance with display of a car navigation system or the like, such as indicating a direction to turn when the vehicle approaches an intersection, so that the arrow symbol is projected on the windshield F2000, and the direction to turn in the intersection can be indicated to the passenger in an easy-to-understand manner.

Further, in the above-described embodiments, the image projector 2010 and the bezel body are combined and are attached to the vehicle V2000 as a vehicle display device. However, the image projector 2010 and the bezel body may be separate bodies and separately attached to the vehicle V2000.

In addition, the most favorable configurations, methods, and the like for implementing the present invention have been disclosed in the above description. However, the present invention is not limited thereto. That is, although the present invention has been especially illustrated and described regarding a specific embodiment, various modifications can be applied to the above-described embodiment in shapes, materials, quantities, and other detailed configurations by a person skilled in the art without departing from the technical idea and the objective scope of the present invention.

Therefore, the shapes, materials, and the like disclosed in the above description are exemplarily described for facilitating the understanding of the present invention, and do not limit the present invention. Therefore, description of a member with a name, from which a part or all of the limitations of the shapes, materials, and the like are removed, is included in the present invention.

Abstract

Provided are a bezel body that can produce various visual effects using light and a vehicle display device including the bezel body. A vehicle display device (2001) includes an image projector (2010) and a bezel body (2020). The bezel body (2020) includes a bezel member (2021) fit in a hole (K2000) of an instrument panel (I2000) and a light source unit (2022) that emits light toward the bezel member (2021). The bezel member (2021) has optical transparency and is formed in an annular shape in plan view. The light source unit (2022) is arranged to face an inner side (lower side) of an outer edge portion (2211) of the bezel member (2021), and the light emitted from the light source unit (2022) toward the bezel member (2021) is transmitted through the bezel member (2021) and is projected on a windshield (F2000).

Third Invention

Next, a third invention will be described.

The third invention is a bezel member, a bezel body, and a vehicle display device having the following characteristics.

(1)

A bezel member fit in a facing wall in an instrument panel of a vehicle, the facing wall facing a windshield, and forming a part or all of a peripheral edge of an opening for projecting an image on the windshield by an image projector arranged in the instrument panel, the bezel member including:

a bezel main body formed in a frame shape and having optical transparency; and a rib formed in the bezel main body to protrude into the instrument panel, wherein the rib is formed to guide light entering the rib to the bezel main body.

(2)

The bezel member according to (1), wherein the rib has a shape expressing information regarding travel of the vehicle.

(3)

The bezel member according to (1) or (2), wherein the bezel main body is a member having transmittance of light of from 15% to 25%, both inclusive.

(4)

A bezel body including:

the bezel member according to any one of (1) to (3); and one or a plurality of light sources arranged to face an incident portion of light in the rib of the bezel member.

(5)

A vehicle display device including:

an image projector arranged in an instrument panel of a vehicle; and a bezel body including a bezel member fit in a facing wall in the instrument panel, the facing wall facing a windshield, and forming a part or all of a peripheral edge of an opening for projecting an image on the windshield by the image projector, wherein the bezel body includes the bezel member according to any one of (1) to (3), and one or a plurality of light sources arranged to face an incident portion of light in the rib of the bezel member.

Hereinafter, the third invention will be described in detail.

TECHNICAL FIELD

The present invention relates to a bezel member disposed in an instrument panel of a vehicle, a bezel body including the bezel member, and a vehicle display device including the bezel body.

BACKGROUND ART

Figure 32:
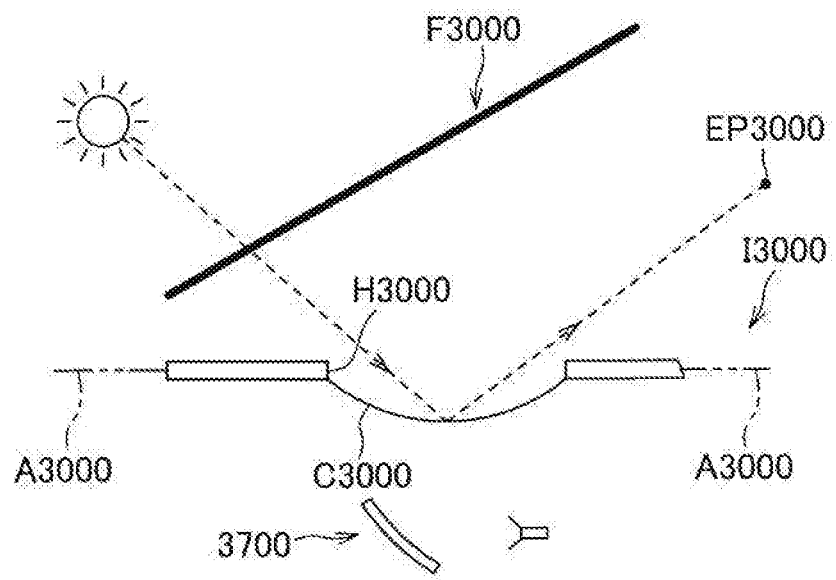
FIG. 32 is a sectional view schematically illustrating a conventional vehicle display device.

Conventionally, a vehicle display device as a head-up display device that projects an image on a windshield of a vehicle is provided in an instrument panel (for example, see Patent Literature 31). A vehicle display device 3700 described in Patent Literature 31 is attached in an instrument panel I3000 provided with an opening H3000 in a facing wall A3000 facing a windshield F3000, as illustrated in FIG. 32, and projects an image on the windshield F3000 through the opening H3000. In such a vehicle display device 3700, a transparent cover C3000 that blocks the opening H3000 is provided to prevent dust, water, and the like from entering the opening H3000, for example. However, light from outside such as sunlight may be reflected on the cover C3000 and directly proceed to an eye point EP3000 of a passenger, and may provide a feeling of unpleasantness.

Figure 33:
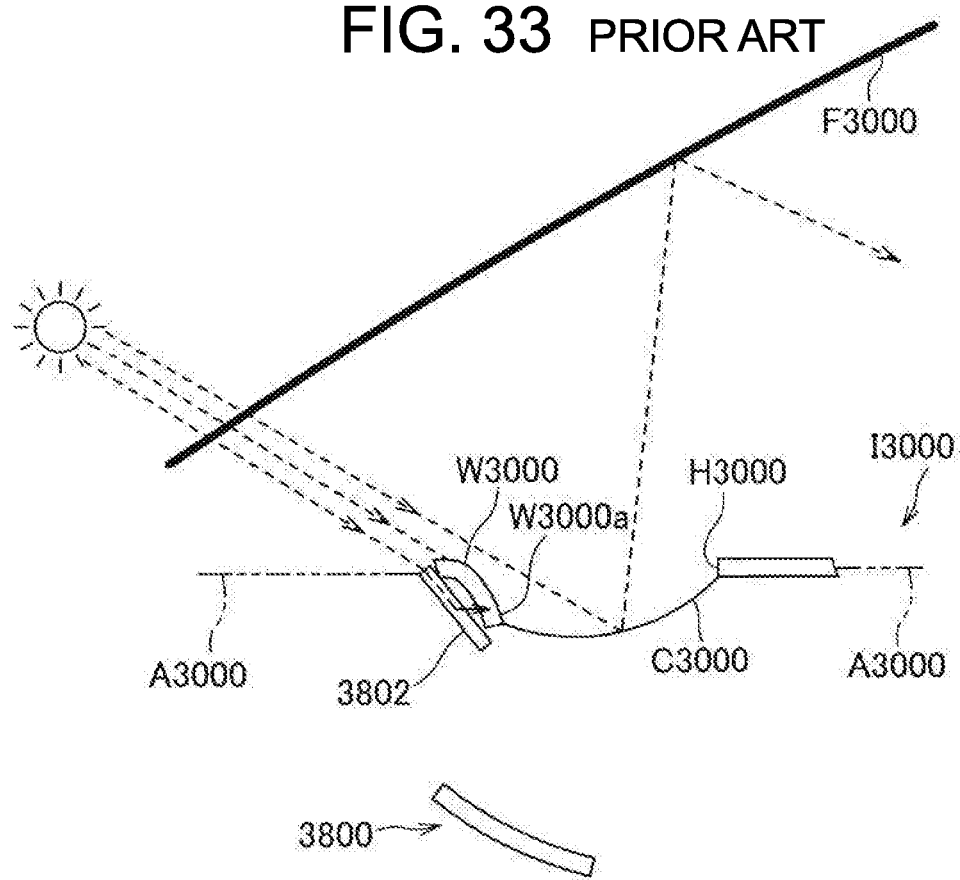
FIG. 33 is a sectional view schematically illustrating another conventional vehicle display device.

Therefore, as a configuration to avoid proceeding of the light from outside to the eye point EP3000 of the passenger, a vehicle display device 3800 illustrated in FIG. 33 can be considered. This vehicle display device 3800 is provided in the instrument panel I3000. The instrument panel I3000 is provided with a descent wall portion W having optical transparency and gradually going downward as going from a front side to a rear side (from the left to the right in FIG. 33) of the vehicle, and the opening H3000 adjacent to a lower end of the descent wall portion W, in the facing wall A3000 facing the windshield F3000. Then, the opening H3000 is provided with the cover C3000 gradually going upward as going from the front side to the rear side of the vehicle, and the vehicle display device 3800 projects an image on the windshield F3000 through the opening H3000. In such a configuration, the descent wall portion W is provided and a vehicle front side of the cover C3000 is positioned lower than the rear side. Therefore, the light from outside can be caused to less easily reach the cover C3000, and direct proceeding of the light from outside reflected on the cover C3000 to the eye point EP3000 of the passenger can be suppressed.

CITATION LIST

Patent Literature

Patent Literature 31: JP 2007-148092 A

SUMMARY OF INVENTION

Technical Problem

In the above-described configuration, the light from outside does not illuminate a position W3000a near the opening H3000 in the descent wall portion W3000 in the instrument panel I3000. Therefore, the position W3000a becomes dark, and a difference in brightness from the cover C3000 becomes large. Accordingly, glare to the windshield F3000 becomes noticeable. Therefore, a configuration to make the descent wall portion W3000 with an optical transparent material, and to arrange a plate light guide member 3802 to face an inner surface of the descent wall portion W3000 to guide the light from outside with the light guide member 3802 to the position W3000a near the opening H3000 of the descent wall portion W3000, and illuminate the descent wall portion W3000 from the inner surface side can be considered. According to this configuration, the descent wall portion W3000 is made bright so that the difference in brightness becomes small. Therefore, the glare to the windshield F3000 can be made unnoticeable, and the feeling of unpleasantness provided to the passenger can be suppressed.

By the way, the vehicle display device may be required to provide so-called ambient display near a projected image to emphasize the projected image to allow the passenger to easily recognize the image, or to allow the passenger to recognize information regarding travel of the vehicle. However, a periphery of the vehicle display device exemplarily illustrated in FIGS. 32 and 33 does not have sufficient space, and presently, it is difficult to separately add an image projector or the like for the ambient display.

Therefore, an objective of the present invention is to provide a bezel member that can perform ambient display while suppressing an occupied space, a bezel body including the bezel member, and a vehicle display device including the bezel body.

Solution to Problem

To solve the above objective, the invention according to (1) is a bezel member fit in a facing wall in an instrument panel of a vehicle, the facing wall facing a windshield, and forming a part or all of a peripheral edge of an opening for projecting an image on the windshield by an image projector arranged in the instrument panel, the bezel member including: a bezel main body formed in a frame shape and having optical transparency; and a rib formed in the bezel main body to protrude into the instrument panel, wherein the rib is formed to guide light entering the rib to the bezel main body.

The invention described in (2) is that, in the invention according to (1), the bezel main body is a member having transmittance of light of from 15% to 25%, both inclusive.

The invention described in (3) is that, in the invention according to (1) or (2), the rib has a shape expres sing information regarding travel of the vehicle.

To solve the above objective, the invention according to (4) is a bezel body including: the bezel member according to any one of (1) to (3); and one or a plurality of light sources arranged to face an incident portion of light in the rib of the bezel member.

To solve the above objective, the invention according to (5) is a vehicle display device including: an image projector arranged in an instrument panel of a vehicle; and a bezel body including a bezel member fit in a facing wall in the instrument panel, the facing wall facing a windshield, and forming a part or all of a peripheral edge of an opening for projecting an image on the windshield by the image projector, wherein the bezel member is configured from the bezel member according to any one of (1) to (3).

Advantageous Effects of Invention

According to the invention described in (1), (4), and (5), the bezel main body has optical transparency, and the rib formed in the bezel main body guides the incident light to the bezel main body. Accordingly, an image having the shape corresponding to the rib can be reflected in near an image projected on the windshield by the image projector. That is, ambient display of the shape corresponding to the rib can be performed near the image projected on the windshield using the glare to the windshield. Further, the rib for the ambient display is formed in the bezel main body and does not require a space. Therefore, the ambient display can be performed while suppressing the occupied space.

According to the invention described in (2), the bezel main body is a member having the transmittance of light of from 15% to 25%, both inclusive. Therefore, the rib is approximately invisible from the passenger at the time of non-emission of the light source while the light from the rib is transmitted at the time of emission of the light source, and appearance can be improved.

According to the invention described in (3), the rib has the shape expressing the information regarding travel of the vehicle. Therefore, the ambient display that causes the passenger to recognize such information can be performed.

Description of Embodiments

A bezel member, a bezel body, and a vehicle display device according to a first embodiment of the present invention will be described with reference to FIGS. 23 to 28.

Figure 23:
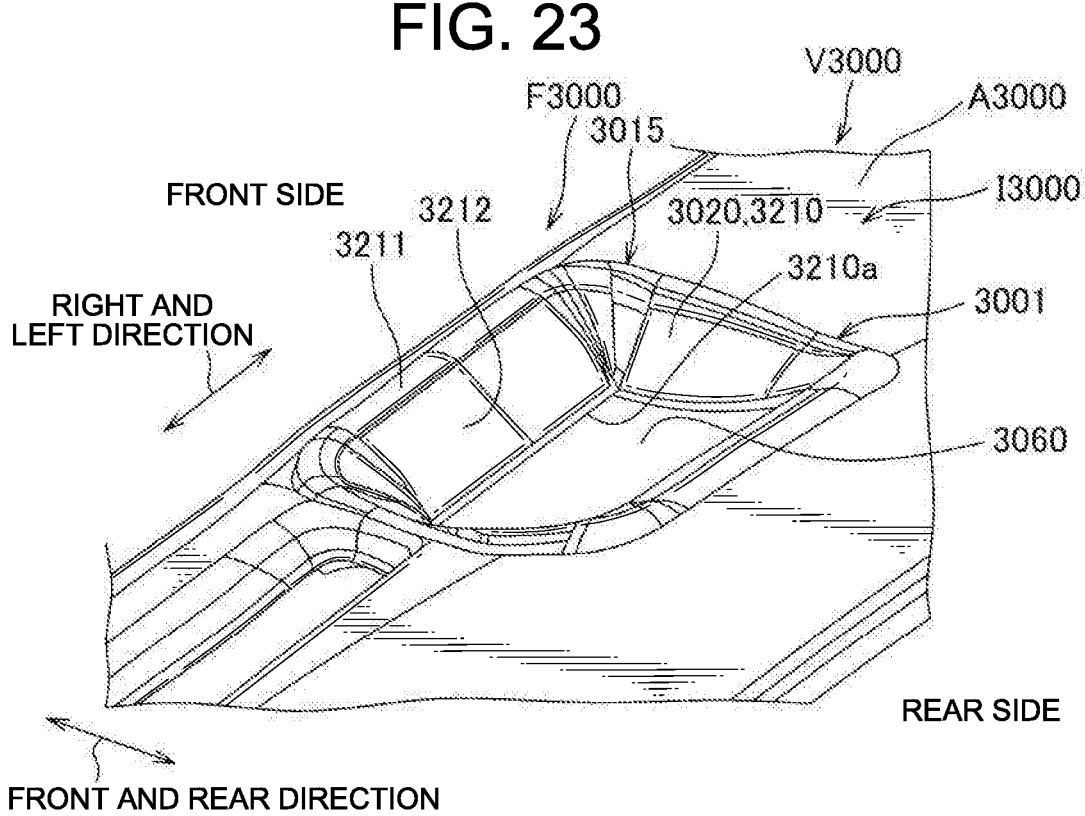
FIG. 23 is a perspective view illustrating a state in which a vehicle display device according to a first embodiment of the present invention is assembled in an instrument panel.
Figure 24:
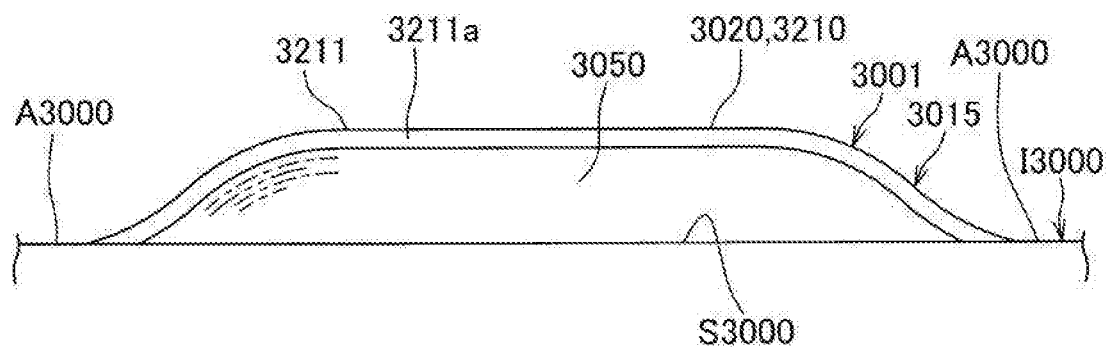
FIG. 24 is a diagram of the vehicle display device of FIG. 23 viewed from a front direction of a vehicle.
Figure 25:
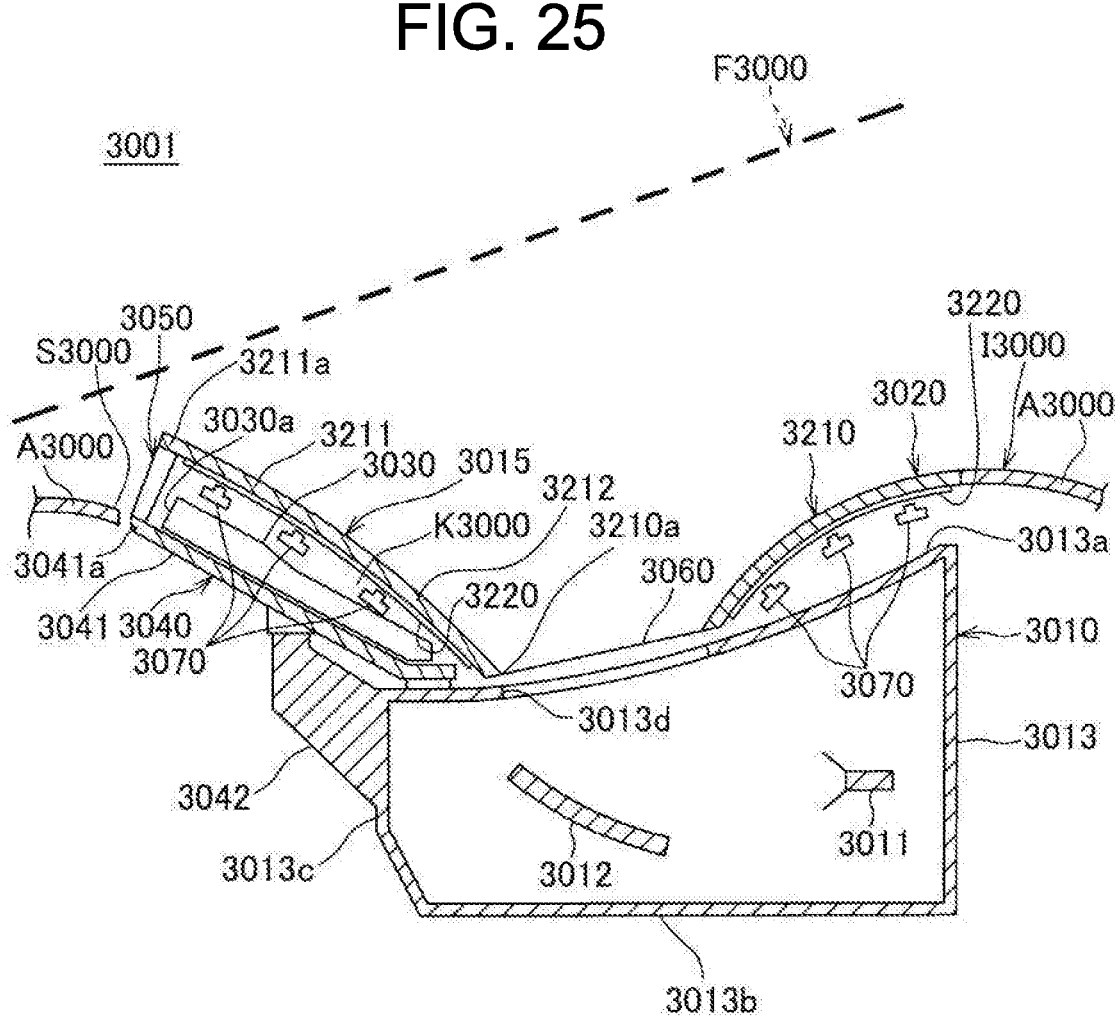
FIG. 25 is a sectional view of the vehicle display device of FIG. 23.
Figure 26:
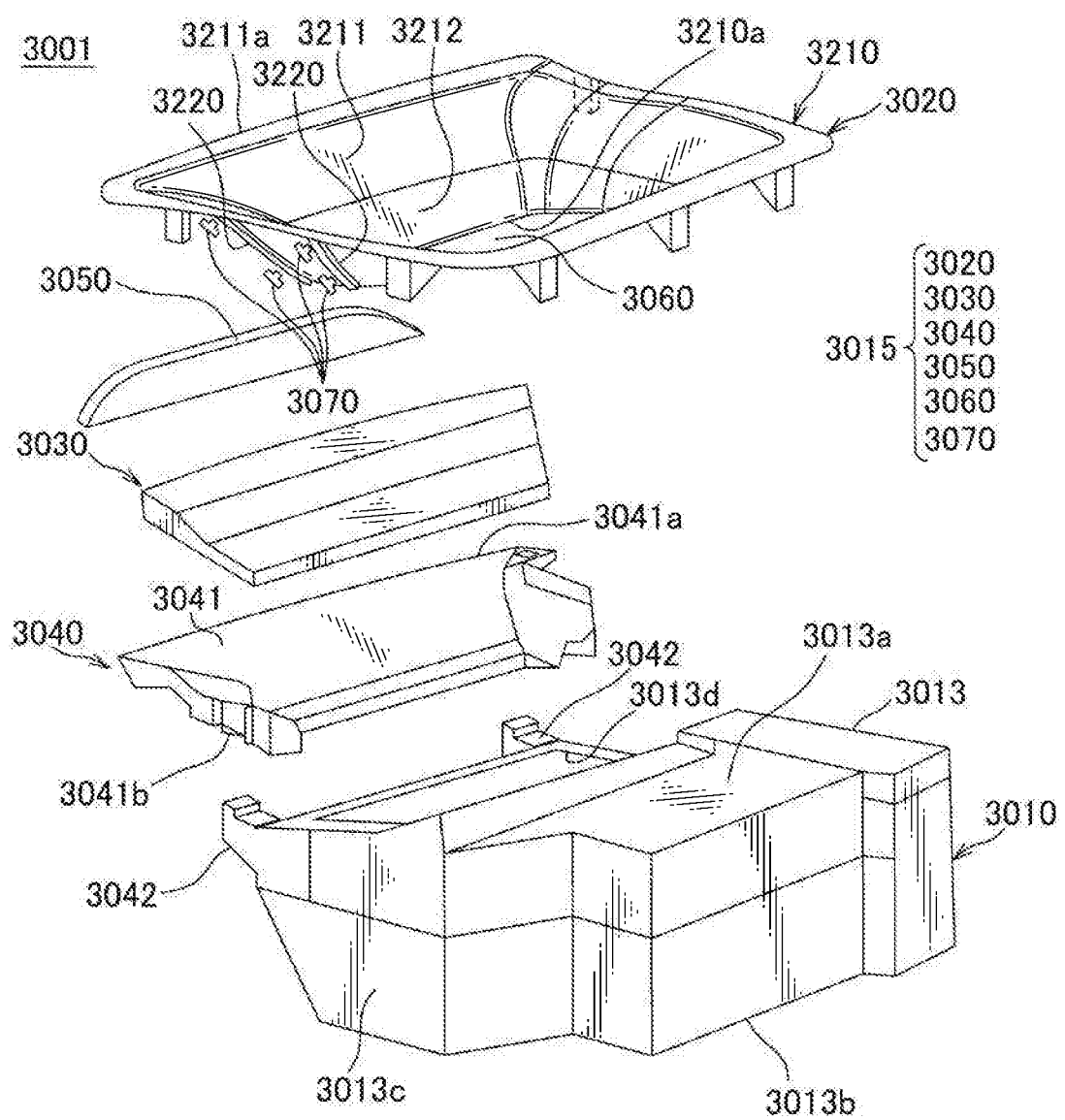
FIG. 26 is an exploded perspective view of the vehicle display device of FIG. 23.
Figure 27:
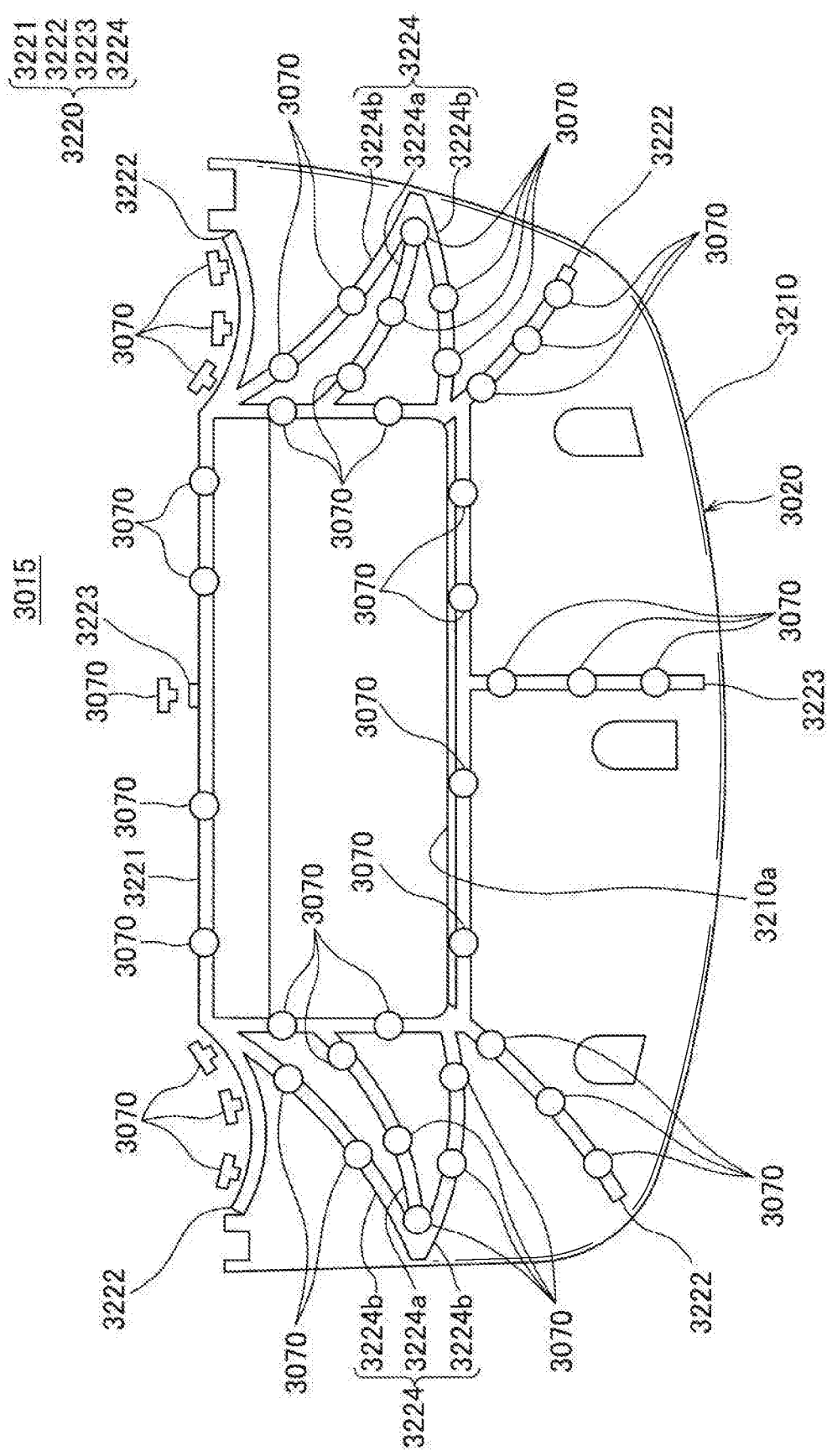
FIG. 27 is a diagram for describing a bezel body included in the vehicle display device of FIG. 23.
Figure 28A:
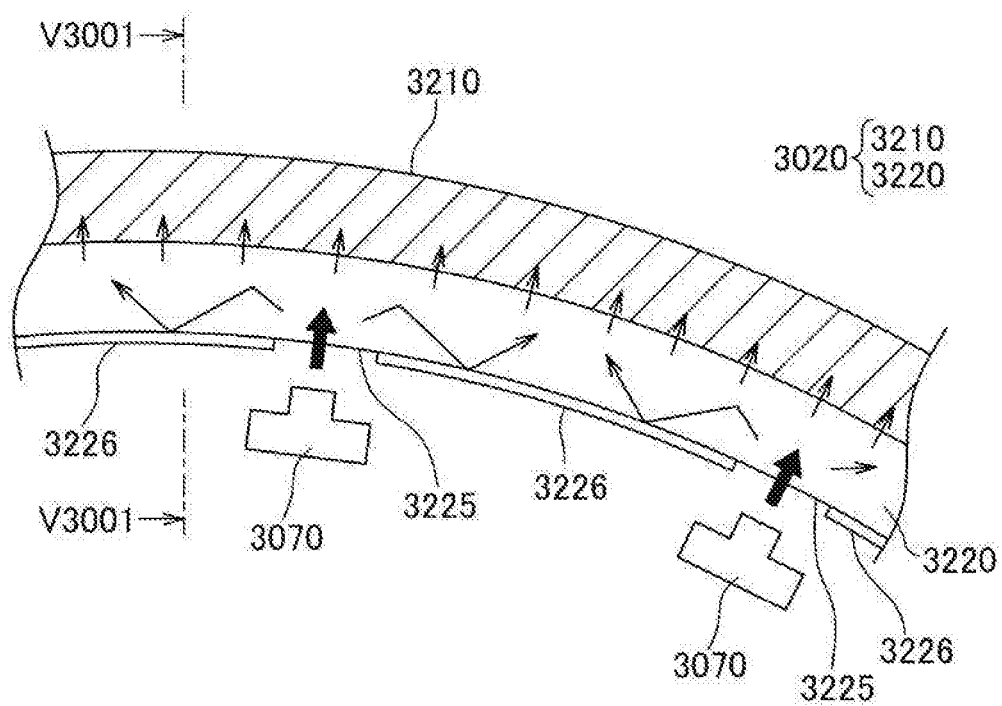
FIGS. 28A and 28B are diagrams illustrating a state in which light enters from an end surface of a rib illustrated in FIG. 27.
Figure 28B:
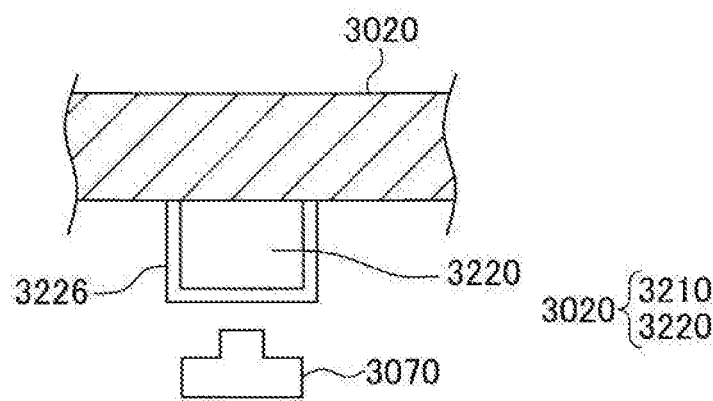

FIG. 23 is a perspective view illustrating a state in which a vehicle display device according to the first embodiment of the present invention is assembled in an instrument panel. FIG. 24 is a diagram of the vehicle display device of FIG. 23 viewed from a front direction of a vehicle. FIG. 25 is a sectional view of the vehicle display device of FIG. 23. FIG. 26 is an exploded perspective view of the vehicle display device of FIG. 23. FIG. 27 is a diagram for describing a bezel body included in the vehicle display device of FIG. 23. FIGS. 28A and 28B are diagrams illustrating a state in which light enters from an end surface of a rib illustrated in FIG. 27. In the description below, "front, rear, up, down, left, and right" correspond to "front, rear, up, down, left, and right" of a vehicle V3000.

A vehicle display device 3001 of the present embodiment is used as a head-up display device attached to an instrument panel I3000 of the vehicle V3000, and which performs projection of an image on a windshield F3000, as illustrated in FIGS. 23 and 24.

As illustrated in FIGS. 25 and 26, the vehicle display device 3001 includes an image projector 3010 and a bezel body 3015.

The image projector 3010 includes a display source 3011 for projecting an image, a reflection portion 3012 that reflects the image from the display source 3011, and a housing 3013 made of a synthetic resin, which accommodates the display source 3011 and the reflection portion 3012. The housing 3013 includes an upper wall portion 3013a, a lower wall portion 3013b arranged to face the upper wall portion 3013a, and a peripheral wall portion 3013c linked with peripheral edges of the upper wall portion 3013a and the lower wall portion 3013b. The upper wall portion 3013a is provided with an opening 3013d arranged to be layered with an opening 3210a of a bezel member 3020 described below. The image projector 3010 reflects an image projected by the display source 3011 on the reflection portion 3012 and projects the image on the windshield F3000 through the opening 3013d. Accordingly, a passenger of the vehicle V3000 visually recognizes the image displayed on the windshield F3000.

The bezel body 3015 includes the bezel member 3020, a light guide member 3030, a support member 3040, a lighting window member 3050, a cover 3060, and an LED 3070 as a light source for ambient display described below. Further, the bezel member 3020 includes a bezel main body 3210 and a rib 3220.

The bezel main body 3210 is made of a synthetic resin that transmits light at predetermined transmittance, and has an annular shape in plan view having the opening 3210a in the center and has a shape gradually going downward as going from an outer peripheral edge to an inner peripheral edge. In other words, the bezel main body 3210 has a shape of a hollow and approximately truncated square pyramid, which is flipped upside down, with an upper end surface and a lower end surface open. The bezel main body 3210 is arranged to be fit in a hole provided in a facing wall A3000 in the instrument panel I3000, the facing wall A3000 facing the windshield F3000. That is, the bezel main body 3210 is fit in the facing wall A3000 and forms all of a peripheral edge of the opening 3210a for projecting the image on the windshield F3000 by the image projector 3010 arranged in the instrument panel I3000. Note that the transmittance of light in the bezel main body 3210 is favorably from 15% to 25%, both inclusive, and is more favorably from 18% to 22%, both inclusive.

The bezel main body 3210 includes a front bezel portion 3211 arranged at a front side of the vehicle V3000 when fit in the facing wall A3000. The front bezel portion 3211 is arranged to rise upward from the facing wall A3000 such that an end portion 3211a of the front side of the vehicle V3000 provides a gap S3000 between the end portion 3211a and the facing wall A3000 (the front bezel portion 3211 is arranged above the facing wall A3000). Further, the front bezel portion 3211 has a descent wall portion 3212 gradually going downward as going from the front side to the rear side of the vehicle V3000 and reaching the opening 3210a.

When the bezel main body 3210 is fit in the facing wall A3000, a part of the front side in the outer peripheral edge of the bezel main body 3210 (that is, the end portion 3211a of the front bezel portion 3211 at the front side of the vehicle V3000) is arranged to rise upward from the facing wall A3000 (FIG. 24), and the other part except the part of the outer peripheral edge is arranged such that an outer surface (upper surface) of the bezel main body 3210 and an outer surface of the facing wall A3000 smoothly continue into each other (FIG. 23). Further, at this time, the opening 3210a of the bezel main body 3210 and the opening 3013d of the image projector 3010 are layered and arranged in the up and down direction. Further, color adjustment to have similar appearance to the facing wall A3000, surface finishing, and the like are performed for the bezel main body 3210 so that a difference in glare to the windshield F3000 between the bezel main body 3210 and the facing wall A3000 of the instrument panel I3000 is not noticeable.

The rib 3220 is formed in an inner surface of the bezel main body 3210 to protrude into the instrument panel I3000. The rib 3220 is formed of an edge rib 3221, skew ribs 3222, front and rear ribs 3223, and arrow-like ribs 3224. The edge rib 3221 is a square rib following an edge or the opening 3210a. The skew ribs 3222 are ribs radially extending toward a peripheral edge of the bezel main body 3210 from four corners of the opening 3210a. The front and rear ribs 3223 are ribs extending to the front and rear toward the peripheral edge of the bezel main body 3210 from centers of a front side and a rear side in the opening 3210a. The arrow-like ribs 3224 are ribs having an arrow-like shape formed adjacent to the right and left of the opening 3210a in FIG. 27. Each of the arrow-like ribs 3224 is formed of a rectilinear portion 3224a extending to the right or left toward the peripheral edge of the bezel main body 3210 from the center of a right or a left side in the opening 3210a, and two skew portions 3224b obliquely extending toward the corners of the opening 3210a from a tip end of the rectilinear portion 3224a.

The rib 3220 is integrally formed of the same resin material as the bezel main body 3210 with the bezel main body 3210, and transmits light with the same transmittance as the bezel main body 3210. The rib 3220 plays a role of a reinforcing member that reinforces the bezel main body 3210, and also plays a role to guide the light entering from the LED 3070 to the bezel main body 3210 described below.

The light guide member 3030 is formed in an approximately square plate shape (FIG. 26) in plan view, using a material having a high degree of transparency, such as glass, acrylic, or a synthetic resin like polycarbonate, and is arranged to be layered with an inner surface of the front bezel portion 3211 with a slight gap. The light guide member 3030 is formed such that a front side is thick, a rear side is thin, and a portion between the thick portion and the thin portion gradually becomes thinner as going from the front to the rear, in section view in the front and rear direction (FIG. 25). To be specific, a surface facing downward in the light guide member 3030 is formed in a plan manner, and an inclined surface gradually descending as going from the front to the rear is formed in an intermediate portion in the front and rear direction, of a surface facing upward at the descent wall portion 3212 side.

The light guide member 3030 is formed to guide the light having entered the light incident surface 3030a that is an end surface of the vehicle V3000 at the front side to an end portion of the rear side, and to emit the light from a surface at the descent wall portion 3212 side. That is, the light guide member 3030 guides the light in a light guiding direction from an end portion at the front side, where the light incident surface 3030a exists, to an opposite end portion at the rear side. Accordingly, the light can be guided toward the descent wall portion 3212 having optical transparency, and the position near the opening 3210a in the descent wall portion 3212 can be illuminated.

The support member 3040 includes a placing portion 3041 made of a synthetic resin and a pair of leg portions 3042.

The placing portion 3041 is a portion on which the light guide member 3030 is placed, and is formed in an approximately plate shape in plan view that is slightly larger than the shape in plan view of the light guide member 3030. The placing portion 3041 is placed with a gap from an inner surface of the front bezel portion 3211 such that an end portion 3041a at the front side of the vehicle V3000 is arranged side by side with the end portion 3211a of the front bezel portion 3211 with a gap roughly in the up and down direction, and both end portions facing each other in the right and left direction are in contact with an inner surface of the bezel main body 3210. Accordingly, the placing portion 3041 forms an accommodation space K3000 that accommodates the light guide member 3030 between the placing portion 3041 and the front bezel portion 3211. The accommodation space K3000 opens toward the gap S3000. In the accommodation space K3000, the light guide member 3030 is arranged such that the light incident surface 3030a faces the gap S3000 through the opening of the accommodation space K3000.

The pair of leg portions 3042 is a portion that connects the placing portion 3041 and the housing 3013 of the image projector 3010, and respectively runs forward and upward from both ends in the right and left direction, of a front surface of the peripheral wall portion 3013c of the housing 3013 (FIG. 26). Base ends of the leg portions 3042 are integrally fixed with the housing 3013, and fixing portions 3041b provided in a lower surface of the placing portion 3041 are fixed to tip ends of the leg portions 3042.

The lighting window member 3050 is formed of a material having a high degree of transparency, such as glass, acrylic, or a synthetic resin like polycarbonate. The lighting window member 3050 is provided to seal the opening of the accommodation space K3000, and take the light through the gap S3000 into the accommodation space K3000.

The lighting window member 3050 is formed in an approximately trapezoid plate shape in plan view, which is the same as the opening of the accommodation space K3000 (see FIGS. 24 and 26). The lighting window member 3050 is arranged between the end portion 3211a of the front bezel portion 3211 at the front side and the end portion 3041a of the placing portion 3041 of the support member 3040 at the front side to seal the opening of the accommodation space K3000 that accommodates the light guide member 3030, and the entire periphery of an end surface of the lighting window member 3050 is closely in contact with the inner surface of the bezel main body 3210 and an upper surface of the placing portion 3041.

The cover 3060 is formed in a thin plate shape using a material having a high degree of transparency, such as glass, acrylic, or a synthetic resin like polycarbonate, and is attached and fixed to a peripheral edge of the opening 3210a to block the opening 3210a of the bezel main body 3210. The cover 3060 is arranged to go upward as going from the front side to the rear side of the vehicle V3000 (FIG. 25). Accordingly, direct proceeding of the light shining on the cover 3060 to the eye point of the passenger can be suppressed.

A plurality of the LEDs 3070 is arranged along the rib 3220 to face an end surface in the rib 3220, the end surface facing the bezel main body 3210, and allows the light to enter from the end surface to the rib 3220.

FIGS. 28A and 28B are diagrams illustrating a state in which light enters from an end surface of a rib illustrated in FIG. 27. FIG. 28A illustrates a sectional view of the bezel member 3020 along a longitudinal direction of the rib 3220, and FIG. 28B illustrates a sectional view of the bezel member 3020 along a V3001-V3001 line in FIG. 28A. As illustrated in FIGS. 28A and 28B, in the rib 3220, a part of the end surface at an inner side of the instrument panel I3000 is an incident portion 3225 through which the light form the LED 3070 enters. Meanwhile, a reflection layer 3226 that reflects the incident light to an inside of the rib 3220 is formed on a surface other than the incident portion. An example of such a reflection layer 3226 includes a plated layer with a metal such as aluminum. Accordingly, the light entering the rib 3220 is trapped and proceeds in the rib 3220, and is guided to the bezel main body 3210. As a result, a light-emission image having a shape corresponding to the shape of the rib 3220 appears on a surface in the bezel main body 3210 at the front panel F side. This light-emission image is reflected in the windshield F3000, so that the ambient display as follows for emphasizing the projected image and causing the passenger to easily recognize the image, or causing the passenger to recognize the information regarding travel of the vehicle V3000 is performed near the projected image from the image projector 3010.

Next, an example of the ambient display as a function of the vehicle display device 3001 will be described with reference to FIGS. 29A and 29B and 30A and 30B.

Figure 29A:
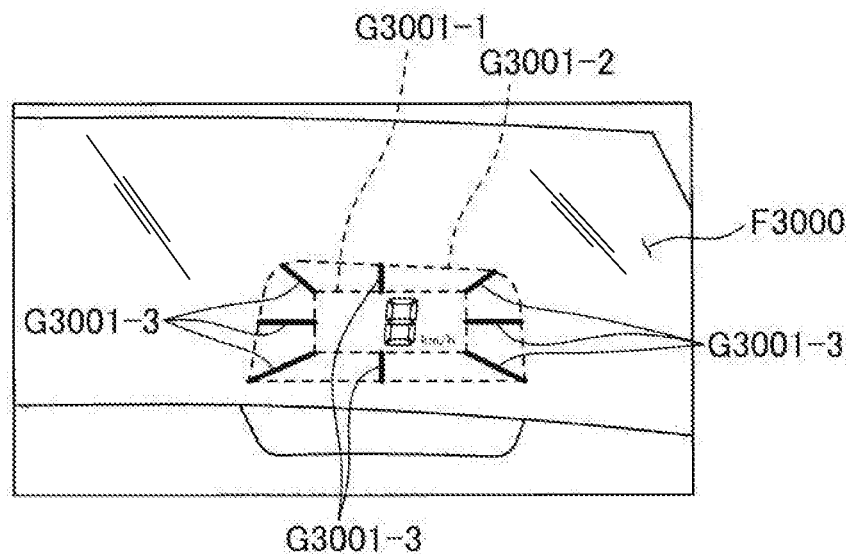
FIGS. 29A and 29B are diagrams illustrating examples of ambient display that emphasizes a projected image, which is performed in the vehicle display device of FIG. 23.
Figure 29B:
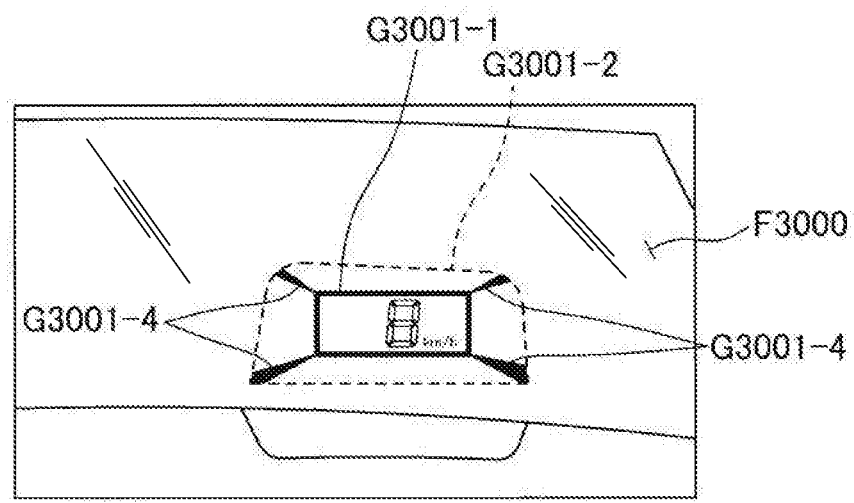

FIGS. 29A and 29B illustrate examples of the ambient display that emphasizes a projected image G3001-1. FIG. 29A illustrates a first example and FIG. 29B illustrates a second example.

First, in either example, a glare image G3001-2 such as a boundary line between the bezel main body 3210 and the instrument panel I3000 in which the difference in brightness is reduced by emission of the light guide member 3030 is reflected in a periphery of the projected image G3001-1 in a pale and unnoticeable manner. Then, in the first example illustrated in FIG. 29A, the LEDs 3070 are caused to emit light, the LEDs 3070 corresponding to the skew ribs 3222, the front and rear ribs 3223, and the rectilinear portions 3224a of the arrow-like ribs 3224 illustrated in FIG. 27, so that a first emphasizing ambient image G3001-3 is formed. Further, in the first example illustrated in FIG. 29B, the LEDs 3070 corresponding to the edge rib 3221 and the skew ribs 3222 illustrated in FIG. 27 are caused to emit light, so that a second emphasizing ambient image G3001-4 is formed. These ambient images G3001-3 and G1-4 are displayed to surround the periphery of the projected image G3001-1. Therefore, the projected image G3001-1 is emphasized against scenery outside the windshield F3000.

Figure 30A:
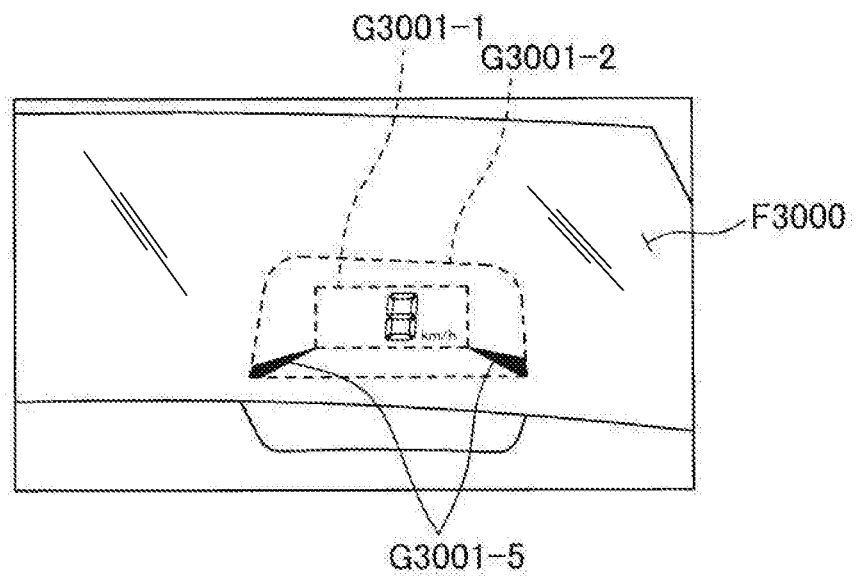
FIGS. 30A and 30B are diagrams illustrating examples of ambient display that causes a passenger to recognize traffic lane information as information regarding traveling of a vehicle, which is performed in the vehicle display device of FIG. 23.
Figure 30B:
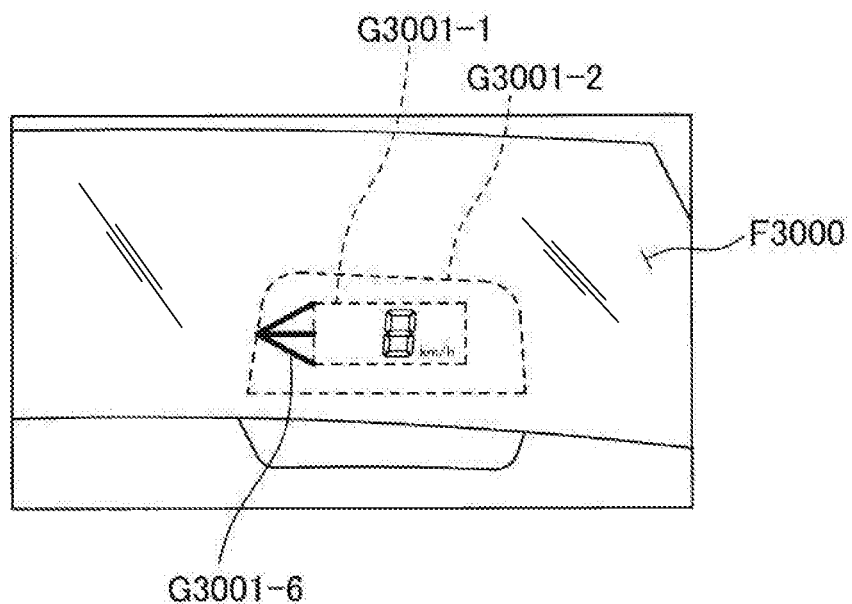

FIGS. 30A and 30B illustrate examples of the ambient display that causes the passenger to recognize traffic lane information as the information regarding travel of the vehicle V3000. In the examples of FIGS. 30A and 30B, the glare image G3001-2 is reflected in a pale manner in the periphery of the projected image G3001-1.

Then, FIG. 30A illustrates an ambient image G3001-5 as a traffic lane guideline indicating a traffic lane in driving. The ambient image G3001-5 is formed by emitting the light of the LEDs 3070 corresponding to the two skew ribs 3222 extending from the two corners of the opening 3210a across the front bezel portion 3211 and the descent wall portion 3212 illustrated in FIGS. 25 and 26, of the four skew ribs 3222 illustrated in FIG. 27. The ambient image G3001-5 is visually recognized by the passenger as two lines extending to the front in the proceeding direction of the vehicle V3000, and plays a role of a traffic lane guide light.

FIG. 30B illustrates an ambient image G3001-6 as an arrow of direction instruction. The ambient image G3001-6 is formed by emitting the light of the LED 3070 corresponding to the arrow-like rib 3224 illustrated in FIG. 27. In the example of FIG. 30B, the LED 3070 corresponding to the arrow-like rib 3224 on the left in the drawing, of the right and left arrow-like ribs 3224, is emitted, so that the ambient image G3001-6 as the arrow that prompts change to a left-side traffic lane is instructed.

Further, in the vehicle display device 3001 of the present embodiment, which image of the ambient images G3001-3 to G3001-6 illustrated in FIGS. 29A and 29B and 30A and 30B is to be displayed is selectively determined by light-emission control of the LEDs 3070 by a control device (not illustrated).

According to the vehicle display device 3001 described with reference to FIGS. 23 to 30A and 30B, the bezel main body 3210 has optical transparency, and the rib 3220 formed in the inner surface of the bezel main body 3210 guides the incident light into the bezel main body 3210. Accordingly, the image having the shape corresponding to the rib 3220 can be reflected in near the projected image G3001-1 projected on the windshield F3000 by the image projector 3010. That is, according to the vehicle display device 3001, the ambient display having the shape corresponding to the rib 3220 can be performed using the glare to the windshield F3000 near the projected image G3001-1 projected on the windshield F3000. Further, the rib 3220 for the ambient display is formed in the bezel main body 3210 and does not require a space. That is, according to the vehicle display device 3001, the ambient display can be performed while suppressing an occupied space.

Further, according to the vehicle display device 3001, the bezel main body 3210 is a member having the transmittance of light of from 15% to 25%, both inclusive. Therefore, the rib 3220 is approximately invisible from the passenger at the time of non-emission of the LEDs 3070 while the light from the rib 3220 is transmitted at the time of emission of the LEDs 3070, and appearance can be improved.

Further, according to the vehicle display device 3001, the rib 3220 has the shape expressing the traffic lane information as the information regarding travel of the vehicle V3000, and the ambient display that causes the passenger to recognize information regarding the travel traffic lane or the traffic lane change can be performed.

Next, a second embodiment of the present invention will be described. The second embodiment is similar to the first embodiment described above, except for the shape of a rib and arrangement of LEDs in a bezel body. Therefore, hereinafter, different points in the bezel body in the second embodiment from the first embodiment will be focused and described, and description of the same points such as an entire configuration of a vehicle display device will be omitted.

Figure 31:
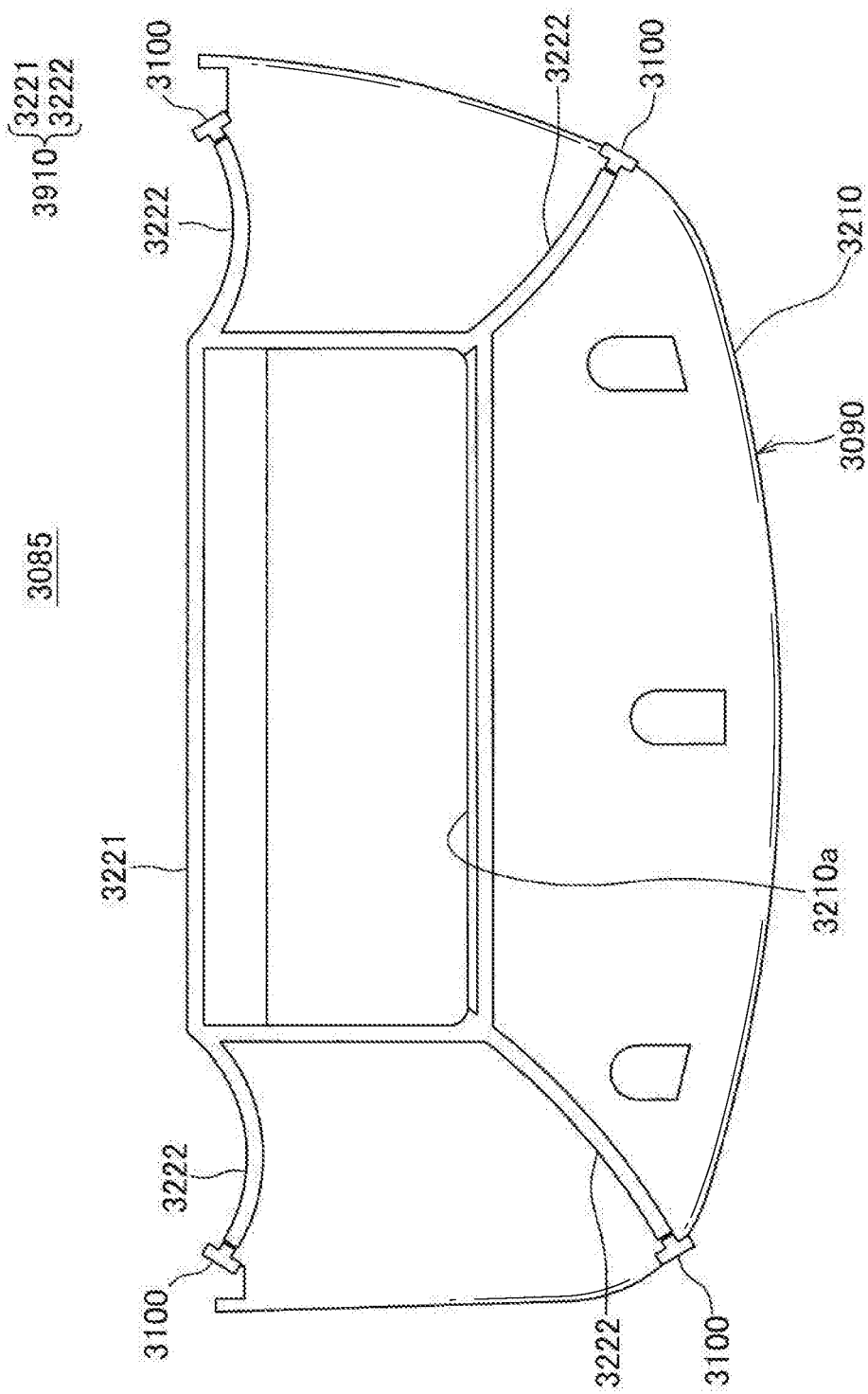
FIG. 31 is a diagram for describing a bezel body according to a second embodiment of the present invention.

FIG. 31 is a diagram for describing the bezel body according to the second embodiment of the present invention. FIG. 31 illustrates an inner surface side of a bezel body 3085 according to the second embodiment. Note that, in FIG. 31, configuration elements equivalent to the configuration elements of the bezel body 3015 according to the first embodiment illustrated in FIG. 27 are denoted with the same reference signs as those in FIG. 27, and hereinafter, overlapping description about the equivalent configuration elements is omitted.

In the bezel body 3085 illustrated in FIG. 31, a rib 3910 of a bezel member 3090 includes an edge rib 3221 along an edge of an opening 3210a illustrated in FIG. 27, and skew ribs 3222 radially extending toward a peripheral edge of a bezel main body 3210 from four corners of the opening 3210a. Then, LEDs 3100 are respectively arranged near tip end surfaces of the skew ribs 3222 at a peripheral edge side of the bezel main body 3210 in a side edge system in which light enters the skew ribs 3222 from the respective tip end surfaces. In the rib 3910, reflection layers (not illustrated) are formed in portions except the tip end surfaces of the skew ribs 3222. Accordingly, the incident light proceeds from the skew ribs 3222 to the edge ribs 3221 in a trapped state in the rib 3910, and is guided to the bezel main body 3210. As a result, a light-emission image having a shape corresponding to the shape of the rib 3910 appears on a surface in the bezel main body 3210 at a front panel F side. This light-emission image is reflected in a windshield F3000, so that ambient display is performed near a projected image from an image projector 3010.

For example, all of the four LEDs 3100 illustrated in FIG. 31 are caused to emit light, so that an emphasizing ambient image equivalent to the second emphasizing ambient image G3001-4 illustrated in FIG. 29B. Further, the two LEDs 3100 corresponding to the two skew ribs 3222 extending form the two corners of the opening 3210a across a front bezel portion 3211 and a descent wall portion 3212 illustrated in FIGS. 25 and 26, of the four LEDs 3100, are caused to emit light, so that a lower half of the emphasizing ambient image can be selectively displayed.

According to the second embodiment, it is also obvious to be able to perform the ambient display while suppressing an occupied space, similarly to the first embodiment. Further, in the second embodiment, the number of the LEDs 3100 can be suppressed by employing the side edge system described above for the arrangement of the LEDs 3100.

The first and second embodiments have been described as favorable embodiments about the present invention. However, the bezel member, the bezel body, and the vehicle display device of the present invention are not limited to the configurations of the embodiments.

In the first and second embodiments, the LEDs 3070 arranged to face the end surfaces in the rib 3220, the end surfaces facing the bezel main body 3210, and the LEDs 3100 arranged to face the tip end surfaces of the skew ribs 3222 are exemplarily described. However, the arrangement of the LEDs is not limited to the examples, and for example, the LEDs may be arranged to face a side surface in the rib 3220, the side surface rising from an inner surface of the bezel main body 3210. The arrangement of the LEDs may just be able to cause the light to enter the ribs 3220, and is not limited to specific arrangement.

Further, in the first embodiment, the rib 3220 includes the edge rib 3221, the skew ribs 3222, the front and rear ribs 3223, and the arrow-like ribs 3224, and has the configuration to selectively perform the ambient display to emphasize the projected image G3001-1 and to cause the passenger to recognize the information regarding travel of the vehicle V3000. Further, in the second embodiment, the rib 3910 includes the edge rib 3221 and the skew ribs 3222, and has the configuration to perform the ambient display to emphasize the projected image G3001-1. However, the shape and the configuration of the ribs are not limited to the embodiments. The ribs may be configured from the edge ribs 3221 only or the skew ribs 3222 only, or may be configured from the arrow-like ribs 3224 only. The shape and the configuration of the rib may just correspond to desired ambient display, and are not limited to specific shape and configuration.

Note that the above-described embodiments merely describe representative forms of the present invention, and the present invention is not limited to the embodiments. That is, various modifications can be implemented without departing from the gist of the present invention. Configurations by the modifications are obviously included in the scope of the present invention as long as the configurations are furnished with the configurations of the bezel member, the bezel body, and the vehicle display device of the present invention.

Ambient display is performed while suppressing an occupied space. In a bezel member (3020) fit in a facing wall (A3000) in an instrument panel (I3000) of a vehicle (V3000), the facing wall (A3000) facing a windshield (F3000), and forming a part or all of a peripheral edge of an opening (2210a) for projecting an image on the windshield (F3000) by an image projector (3010) arranged in the instrument panel (I3000), the bezel member (3020) includes a bezel main body (3210) formed in a frame shape and having optical transparency, and a rib (3220) formed to protrude into the instrument panel (I3000), in the bezel main body (3210). The rib (3210) is formed to guide light entering the rib (3210) to the bezel main body (3210).

Fourth Invention

Next, a fourth invention will be described.

The fourth invention is a vehicle display device having the following characteristics.

(1)

A vehicle display device arranged in an instrument panel provided with a descent wall portion having optical transparency, and going downward as going from front to rear of a vehicle, and an opening adjacent to a lower end of the descent wall portion, in a facing wall facing a windshield, the vehicle display device including:

an image projector arranged below the opening, and adapted to project an image on the windshield through the opening;

a light guide member arranged in an inner side of the descent wall portion, and adapted to guide light toward the descent wall portion; and a support member provided to protrude to the front from the image projector to support the light guide member from below, wherein the support member is provided with a fracture portion that fractures to allow the light guide member to fall by force applied at a time of collision of the vehicle.

(2)

The vehicle display device according to (1), wherein the support member includes a placing portion where the light guide member is placed, and a leg portion connecting the placing portion and the image projector.

(3)

The vehicle display device according to (2), wherein the fracture portion is formed along a right and left direction of the vehicle, in a central portion of the placing portion in a front and rear direction of the vehicle.

(4)

The vehicle display device according to (2) or (3), wherein the fracture portion is formed near a position in the leg portion, the position continuing to the image projector, or near a position in the leg portion, the position continuing to the placing portion, in the leg portion.

(5)

The vehicle display device according to (3) or (4), wherein the fracture portion is a wedge-shaped notch gradually narrower as going from a surface to an inside.

Hereinafter, the fourth invention will be described in detail.

TECHNICAL FIELD

The present invention relates to a vehicle display device that performs projection on a windshield.

BACKGROUND ART

Figure 40:
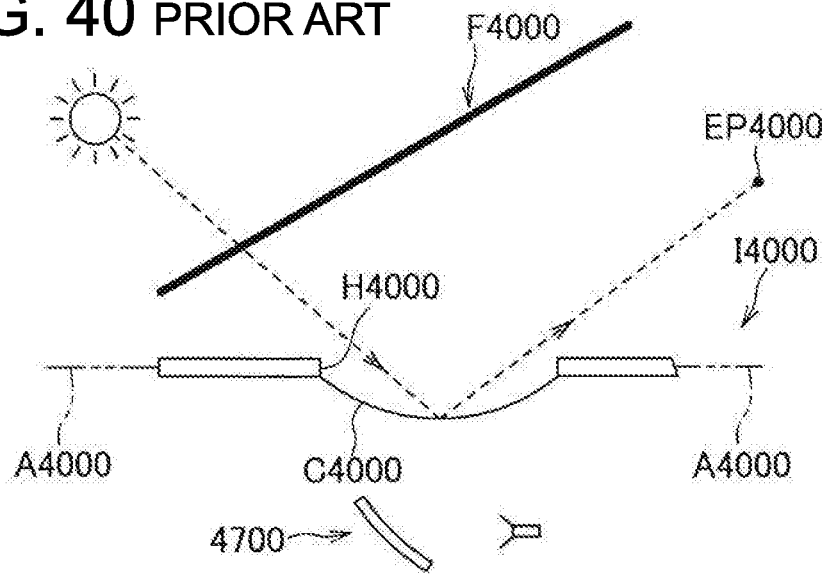
FIG. 40 is a sectional view schematically illustrating a conventional vehicle display device.

Conventionally, a vehicle display device as a head-up display device that projects an image on a windshield of a vehicle is provided in an instrument panel (for example, see Patent Literature 41). A vehicle display device 4700 described in Patent Literature 41 is attached in an instrument panel I4000 provided with an opening H4000 in a facing wall A4000 facing a windshield F4000, as illustrated in FIG. 40, and projects an image on the windshield F4000 through the opening H4000. In such a vehicle display device 4700, for example, when a transparent cover C4000 is provided on the opening H4000 to prevent dust, water, and the like from entering the opening H4000, light from outside such as sunlight is reflected on the cover C4000 and reaches an eye point EP4000 of a passenger, and thus there is a problem that the light provides a feeling of unpleasantness.

Figure 41:
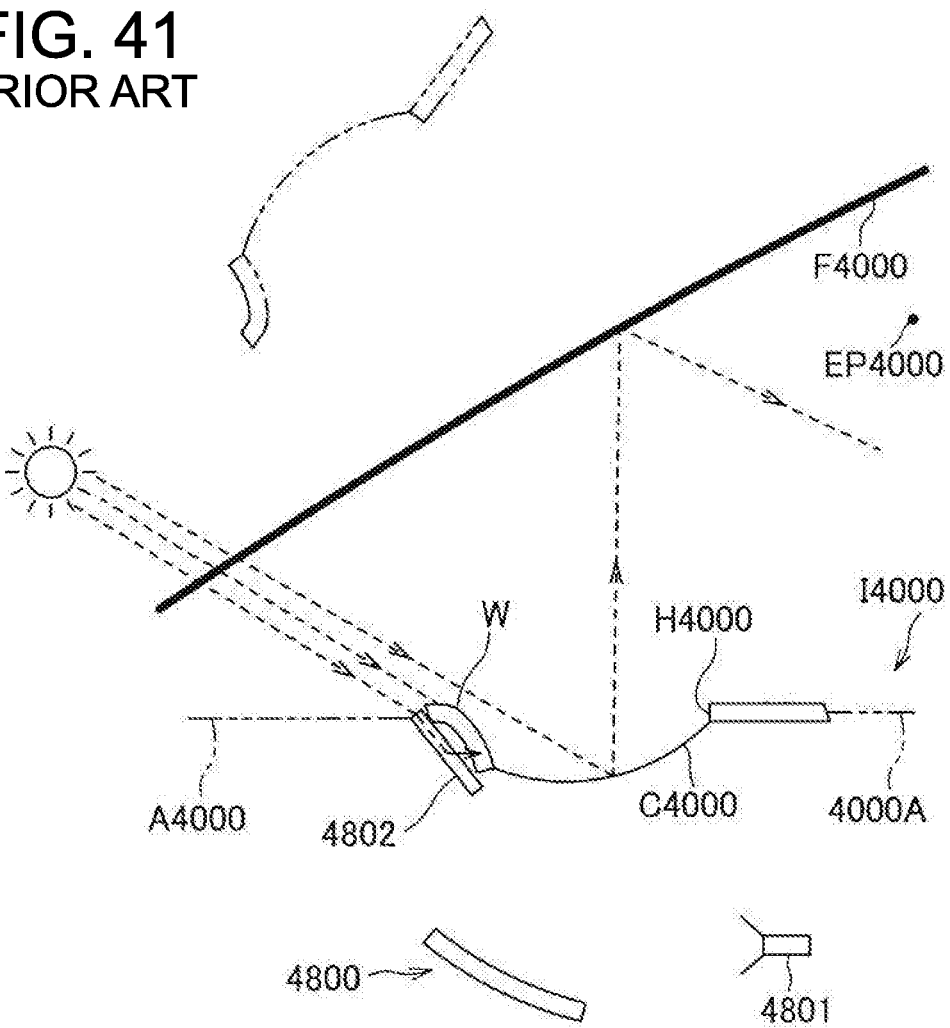
FIG. 41 is a sectional view schematically illustrating another conventional vehicle display device.
Figure 42:
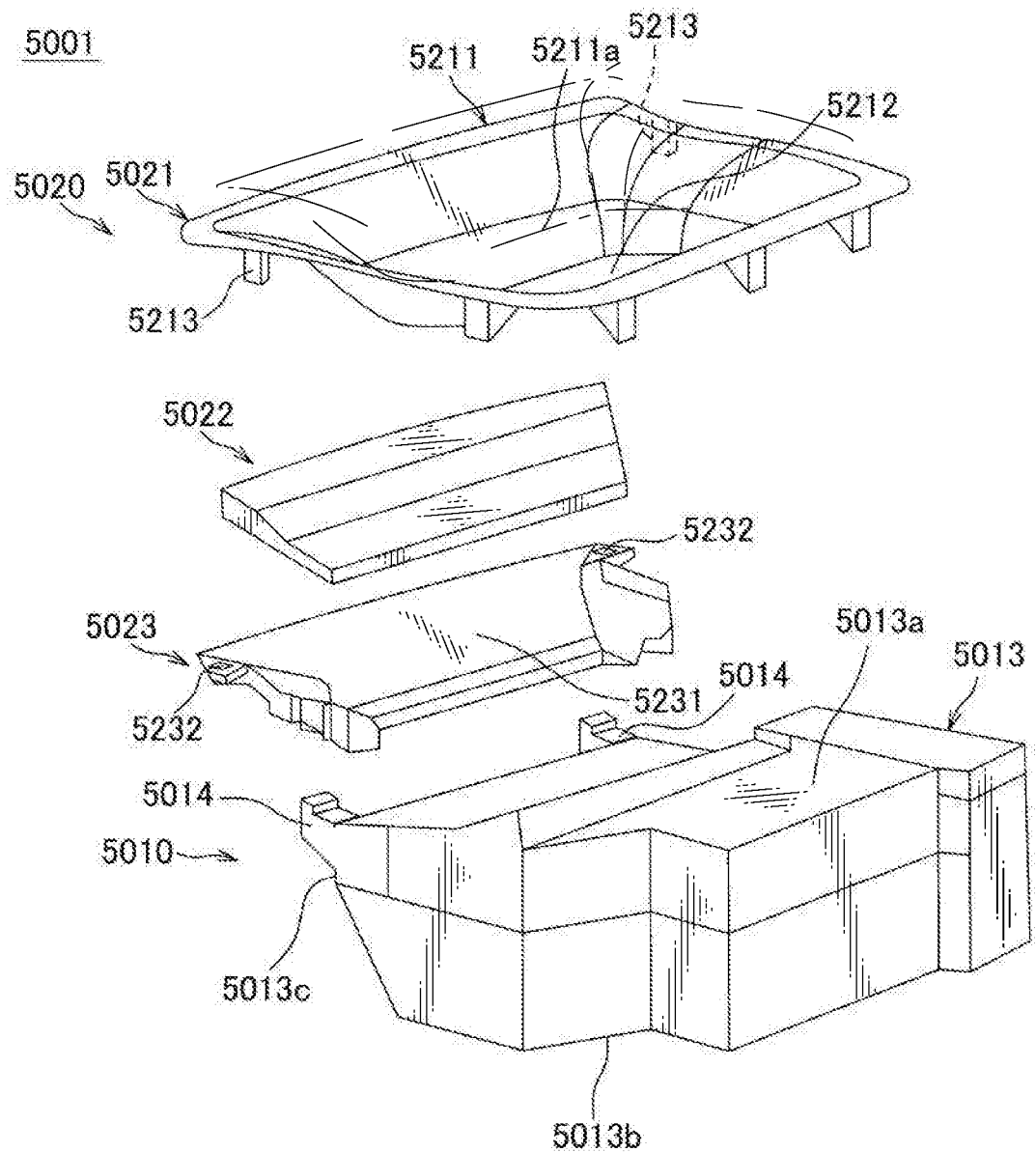
FIG. 42 is an exploded perspective view illustrating a vehicle display device according to an embodiment of the present invention.

Therefore, as a vehicle display device that can suppress the feeling of unpleasantness to the passenger, a following configuration can be considered. As illustrated in FIG. 41, a vehicle display device 4800 is provided in the instrument panel I4000. The instrument panel I4000 is provided with a descent wall portion W4000 having optical transparency and gradually going downward as going from the front to the rear of the vehicle, and the opening H4000 adjacent to a lower end of the descent wall portion W4000, in the facing wall A4000 facing the windshield F4000. Then, the cover C4000 gradually going upward as going from the front to the rear of the vehicle is provided on the opening H4000, and the vehicle display device 4800 projects an image on the windshield F4000 through the opening H4000. In such a configuration, because the descent wall portion W4000 is provided and a vehicle front side of the cover C4000 is positioned lower than the rear side, the light from outside can be caused to less likely reach the cover C4000, and reaching the eye point EP4000 of the passenger, of the light from outside reflected on the cover C4000 can be suppressed.

CITATION LIST

Patent Literature

Patent Literature 41: JP 2007-148092 A

SUMMARY OF INVENTION

Technical Problem

In the above-described configuration, in the instrument panel I4000, a problem can be considered, in which the descent wall portion W4000 becomes dark because the light from outside is not emitted near the opening H4000 of the descent wall portion W4000, and a difference in brightness between the cover C4000 and near the opening H4000 of the descent wall portion W4000 becomes large, so that glare to the windshield F4000 is made noticeable. Therefore, a configuration to configure the descent wall portion W4000 from an optically transparent material, to arrange a light guide member 4802 that guides incident light and emits the light, in an inner side (lower side) of the descent wall portion W4000, and to illuminate near the opening H4000 of the descent wall portion W4000 with the light guide member 4802 can be considered. According to such a configuration, the descent wall portion W4000 becomes bright, and the difference in brightness between the cover C4000 and near the opening H4000 of the descent wall portion W4000 is decreased, the glare to the windshield F4000 is made unnoticeable, and the feeling of unpleasantness to the passenger can be suppressed.

However, in the vehicle display device 4800, the light guide member 4802 is formed of a relatively hard material such as a resin or glass. Therefore, considering safety, a decrease in an impact on a collision object is required when the vehicle collides with the collision object such as a pedestrian.

Therefore, the present invention has focused on the problem as described above, and an objective of the present invention is to provide a vehicle display device that can make glare to a windshield unnoticeable, and can decrease an impact on a collision object.

Solution to Problem

To solve the above-described problem, the invention described in (1) is a vehicle display device arranged in an instrument panel provided with a descent wall portion having optical transparency, and gradually going downward as going from front to rear of a vehicle, and an opening adjacent to a lower end of the descent wall portion, in a facing wall facing a windshield, the vehicle display device including: an image projector arranged below the opening, and adapted to project an image on the windshield through the opening; a light guide member arranged in an inner side of the descent wall portion, and adapted to guide light toward the descent wall portion; and a support member provided to protrude to the front from the image projector to support the light guide member from below, wherein the support member is provided with a fracture portion that fractures to allow the light guide member to fall by force applied at a time of collision of the vehicle.

The invention described in (2) is that, in the invention according to (1), the support member includes a placing portion where the light guide member is placed, and a leg portion connecting the placing portion and the image projector.

The invention described in (3) is that, in the invention according to (2), the fracture portion is formed along a right and left direction of the vehicle, in a central portion of the placing portion in a front and rear direction of the vehicle.

The invention described in (4) is that, in the invention according to (2) or (3), the fracture portion is formed near a position in the leg portion, the position continuing to the image projector, or near a position in the leg portion, the position continuing to the placing portion, in the leg portion.

The invention described in (5) is that, in the invention according to (3) or (4), the fracture portion is a wedge-shaped notch gradually narrower as going from a surface to an inside.

Advantageous Effects of Invention

According to the invention described in (1), the support member provided to protrude to the front from the image projector to support the light guide member from below is included, and the support member is provided with the fracture portion that fractures to allow the light guide member to fall by force applied at the time of a collision of the vehicle. Therefore, for example, in a collision of the vehicle, when a collision object such as a head of a pedestrian gets hit by the light guide member, the support member fractures and absorbs an impact before the light guide member is destroyed. From this configuration, the impact on the collision object can be decreased.

According to the invention described in (2), the light guide member is placed on the placing portion of the support member. Therefore, the light guide member can easily fall when the support member fractures.

According to the invention described in (3), the fracture portion is formed along the right and left direction of the vehicle, in the central portion in the placing portion in the front and rear direction of the vehicle. Therefore, the fracture portion is provided in the position where the light guide member can easily fall as the fracture portion fractures. Therefore, when the vehicle has a collision, the placing portion fractures and can absorb the impact before the light guide member is destroyed, and the impact on the collision object can be decreased.

According to the invention described in (4), the fracture portion is formed near the position in the leg portion, the position continuing to the image projector, or near the position in the leg portion, the position continuing to the placing portion, in the leg portion. Therefore, the fracture portion is provided in the position where the light guide member can easily fall as the fracture portion fractures. Therefore, when the vehicle has a collision, the leg portion fractures and can absorb the impact before the light guide member is destroyed, and the impact on the collision object can be decreased.

According to the invention described in (5), because the fracture portion is the notch formed in a wedged shape, stress is more likely to be concentrated, and the fracture portion more easily fractures than a case where the force is applied at the time of a collision. From this configuration, the support member can more easily and reliably fracture in the notch.

Description of Embodiments

Figure 34:
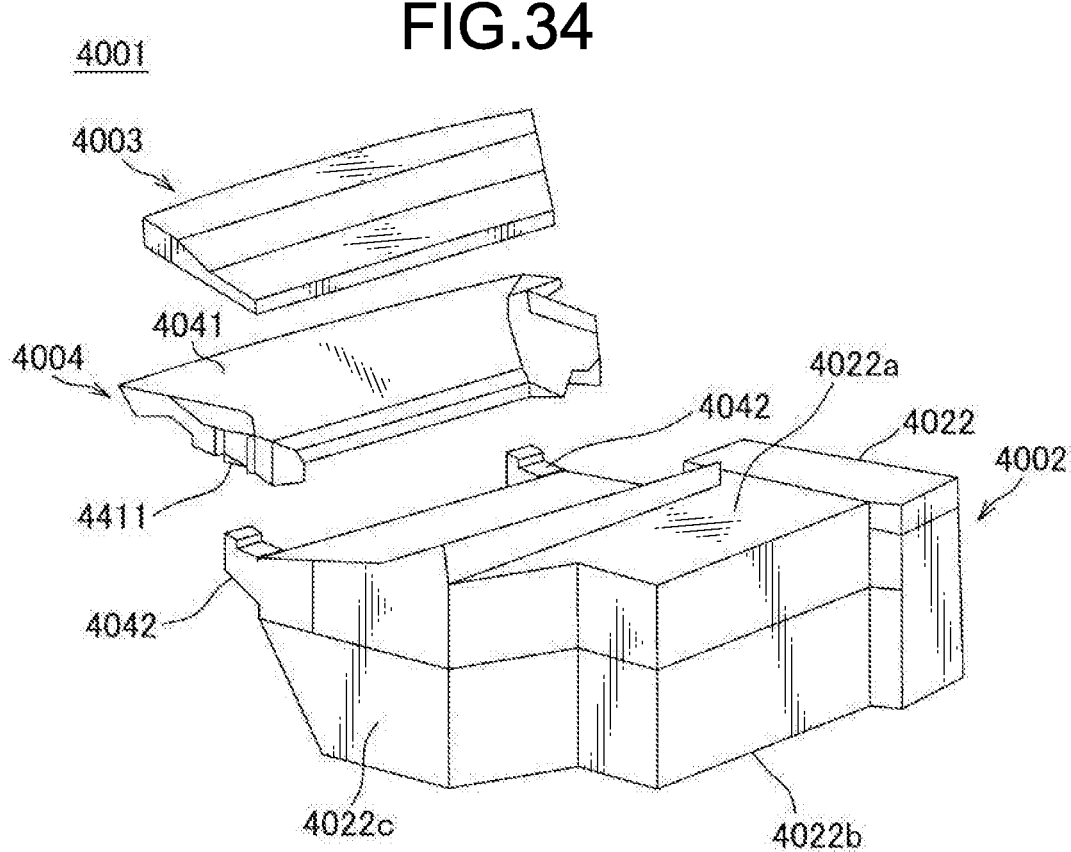
FIG. 34 is an exploded perspective view illustrating a vehicle display device according to an embodiment of the present invention.
Figure 35:
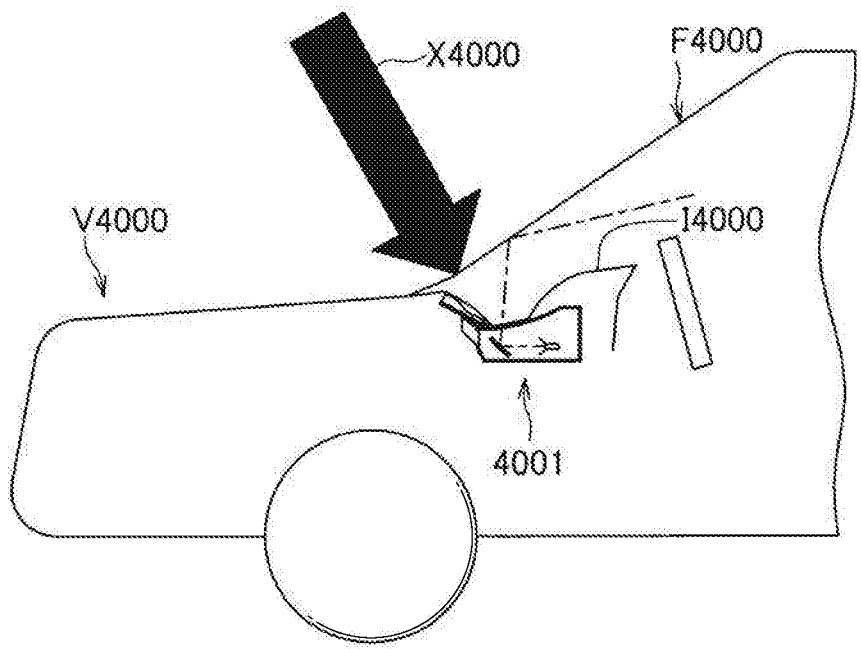
FIG. 35 is a sectional view illustrating a state in which the vehicle display device illustrated in FIG. 34 is attached to a vehicle.
Figure 36:
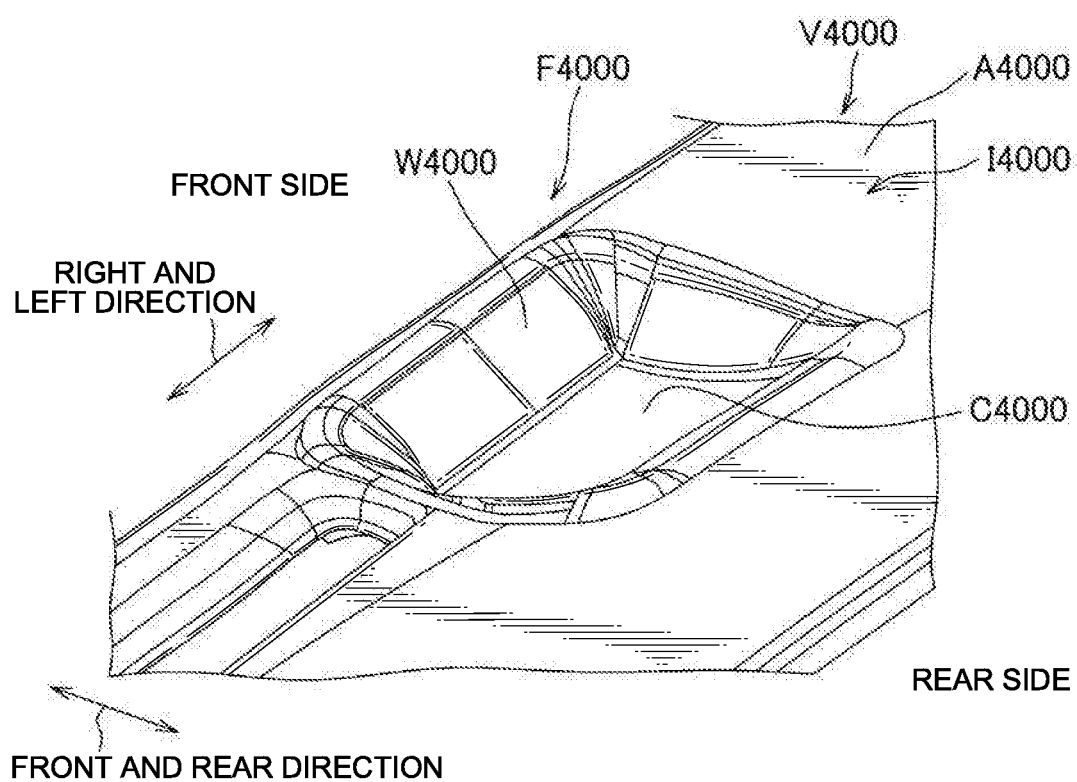
FIG. 36 is a perspective view illustrating an instrument panel to which the vehicle display device illustrated in FIG. 34 is attached.
Figure 37:
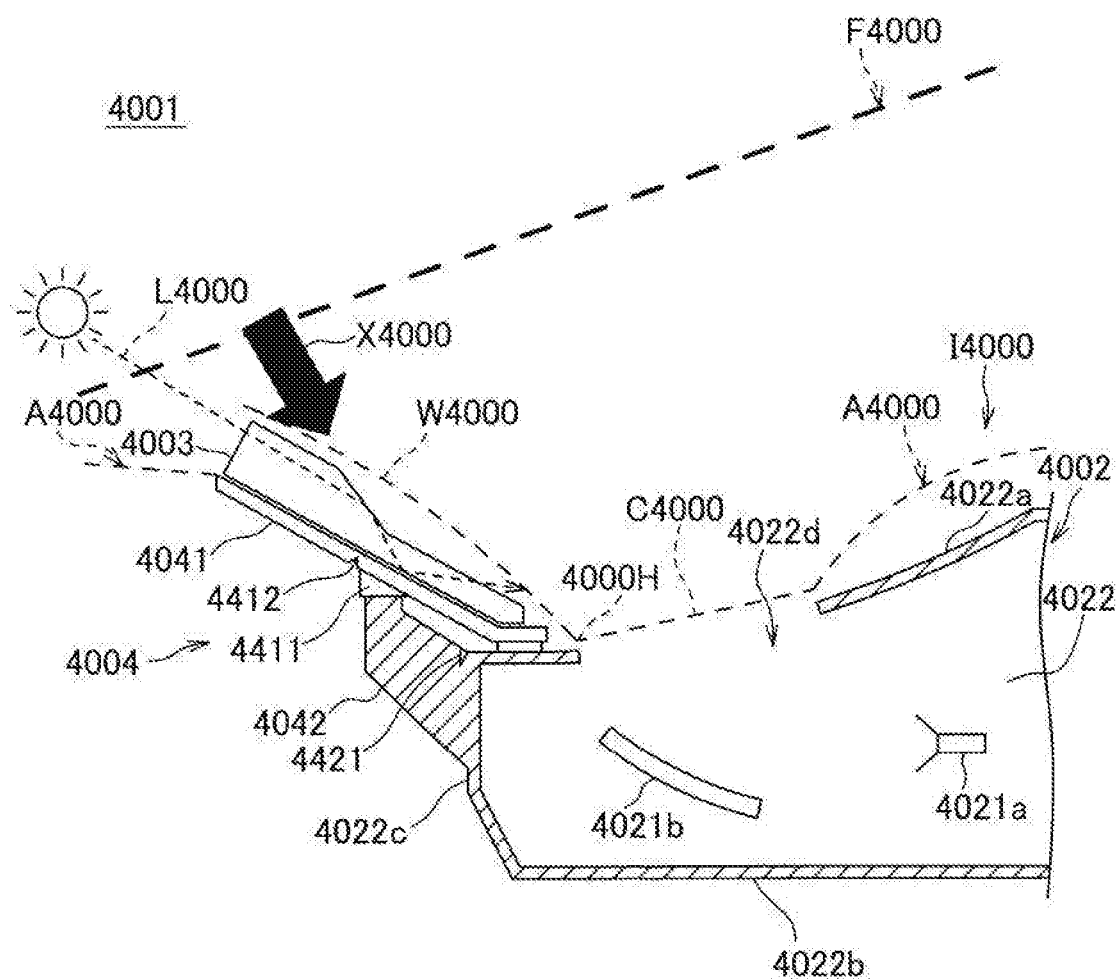
FIG. 37 is a sectional view schematically illustrating the vehicle display device illustrated in FIG. 34.

A vehicle display device according to an embodiment of the present invention will be described with reference to FIGS. 34 to 39. A vehicle display device 4001 of the present embodiment is used as a head-up display device attached inside an instrument panel I4000 of a vehicle V4000, and which performs projection on a windshield F4000, as illustrated in FIGS. 34 to 36. As illustrated in FIGS. 36 and 37, the instrument panel I4000 is provided with a descent wall portion W4000 having optical transparency, and gradually going downward as going from front to rear of the vehicle V4000, and an opening H4000 adjacent to a lower end of the descent wall portion W4000, in a facing wall A4000 facing the windshield F4000. Further, a transparent thin-plate cover C4000 is attached on the opening H4000 to gradually go upward as going from a front side to a rear side of the vehicle V4000, and prevents dust, water, and the like from entering the opening H4000. Note that, in the present embodiment, an up and down direction, a front and rear direction, and a right and left direction correspond to an up and down direction, a front and rear direction, and a right and left direction in the vehicle V4000.

The vehicle display device 4001 is configured from an image projector 4002 that projects an image on the windshield F4000 through the opening H4000, a light guide member 4003 arranged in an inner side (lower side) of the descent wall portion W4000, and which guides light toward the descent wall portion W4000, and a support member 4004 provided to protrude to the front from the image projector 4002 to support the light guide member 4003 from below.

The image projector 4002 includes a display source 4021a for projecting the image, a reflection portion 4021b that reflects the image from the display source 4021a, and a housing 4022 in which the display source 4021a and the reflection portion 4021b are accommodated. As illustrated in FIG. 34, the housing 4022 is formed in a box shape, using a synthetic resin, and includes an upper surface wall 4022a, a bottom wall 4022b, a peripheral wall 4022c, and an opening 4022d. The opening 4022d is arranged to be layered with the opening H4000 provided in the facing wall A4000 in the up and down direction. The image projector 4002 reflects the image projected by the display source 4021a, on the reflection portion 4021b, and projects the image on the windshield F4000 through the opening 4022d. Accordingly, a passenger of the vehicle V4000 recognizes the image displayed on the windshield F4000.

The light guide member 4003 is formed in an approximately square plate shape in plan view, using a material having a high degree of transparency, such as glass or a resin. Further, the light guide member 4003 is formed such that a front side is formed thick, a rear side is formed thin, and a portion between the portion formed thick and the portion formed thin is formed to gradually become thinner as going from the front to the rear, in section view in the front and rear direction. In other words, as illustrated in FIG. 37, a surface of the light guide member 4003 at a placing portion 4041 side described below is formed in a plan manner, and in a surface at the descent wall portion W4000 side, an inclined surface gradually descending as going from the front to the rear is formed in an intermediate portion in the front and rear direction.

Further, as illustrated by the arrow L4000 of FIG. 37, the light guide member 4003 is provided to receive light from outside such as sunlight with an end surface at the vehicle front side, to guide the light to an end portion at the vehicle rear side, and to emit the light toward the descent wall portion W4000 having optical transparency. Accordingly, the vicinity of the opening H4000 of the descent wall portion W4000 can be illuminated from an inside. According to such a configuration, the vicinity of the opening H4000 of the descent wall portion W4000, to which the light from outside is not emitted, can be illuminated and made bright. The difference in brightness between the cover C4000 and the vicinity of the opening H4000 of the descent wall portion W4000 can be decreased, the glare to the windshield F4000 can be made unnoticeable, and the feeling of unpleasantness to the passenger can be suppressed.

The support member 4004 is formed of a synthetic resin, and includes a placing portion 4041 on which the light guide member 4003 is placed, and two leg portions 4042 that connect the placing portion 4041 and the image projector 4002. The placing portion 4041 is formed in a plate shape, and is arranged to be inclined along the descent wall portion W4000. An end portion at the rear side of the placing portion 4041 is bent along the upper surface wall 4022a of the housing 4022. Further, the two leg portions 4042 are integrally formed with the housing 4022 of the image projector 4002. One ends of the leg portions 4042 respectively run forward and upward from both ends in the right and left direction, of a front surface of the peripheral wall 4022c, and upper ends that have run are bent upward. The other end sides are fixed to fixing portions 4411 described below of the placing portion 4041.

Figure 38:
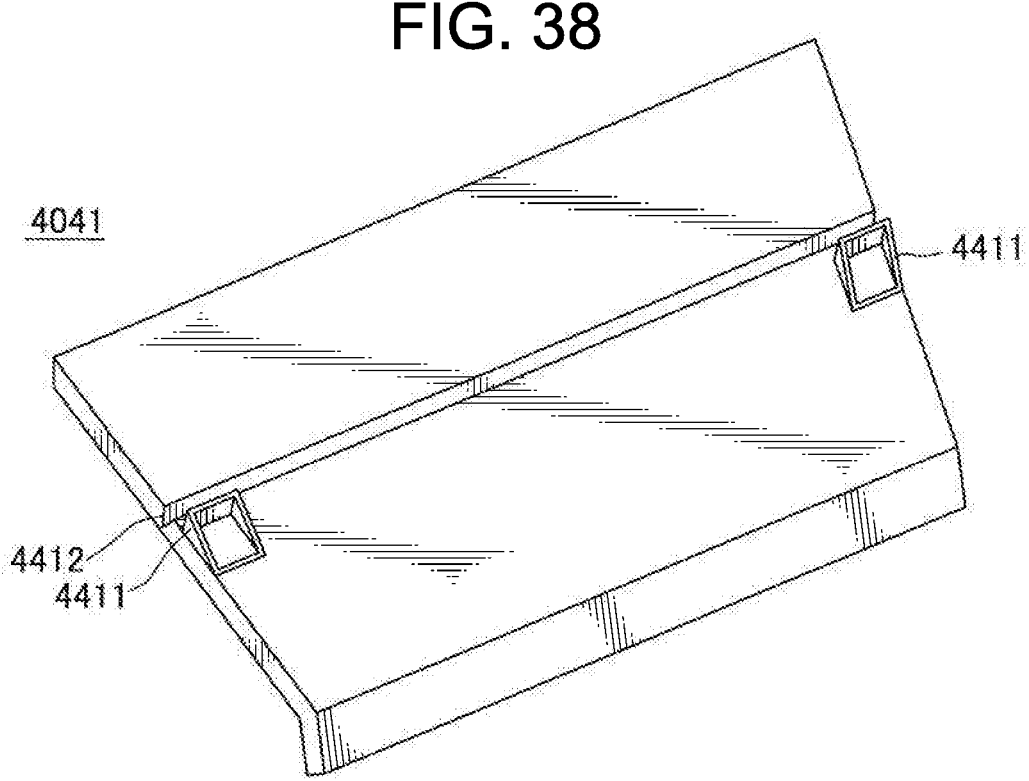
FIG. 38 is a perspective view schematically illustrating a lower-side surface of a placing portion in the vehicle display device illustrated in FIG. 34.

Further, the fixing portions 4411 that fix the other end sides of the leg portions 4042 are respectively provided in both ends in the right and left direction of a back surface (a surface opposite to the surface on which the light guide member 4003 is placed) of the placing portion 4041. As illustrated in FIGS. 37 and 38, a wedge-shaped notch 4412 that gradually becomes narrower as going inward in section view in the front and rear direction is formed in a central portion of the placing portion 4041 in the front and rear direction. The notch 4412 is formed throughout the entire length of the placing portion 4041 in the right and left direction. Further, the fixing portions 4411 are provided at a rear side with respect to the notch 4412.

Figure 39:
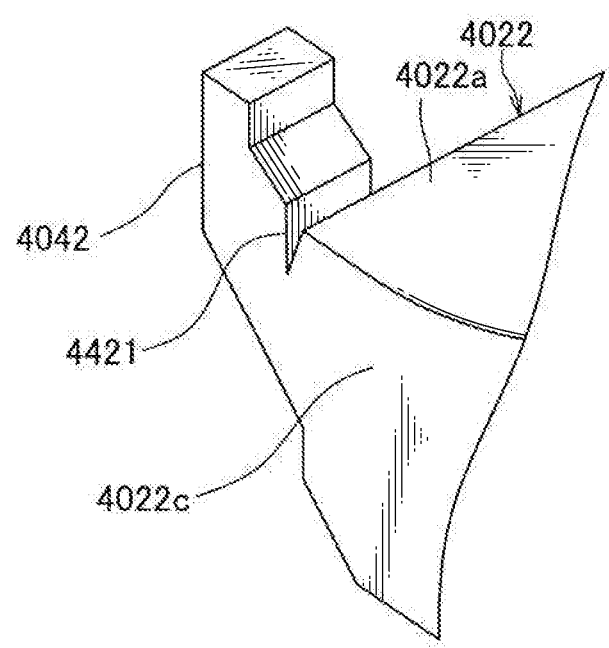
FIG. 39 is a perspective view illustrating an enlarged leg portion in the vehicle display device illustrated in FIG. 34.

As illustrated in FIGS. 37 and 39, wedge-shaped notches 4421 that gradually become narrower as going inward are respectively formed in vicinities of one ends (portions continuing into the housing 4022 of the image projector 4002) of the leg portions 4042. The notches 4421 are formed throughout the entire length of the leg portions 4042 in the right and left direction.

The notches 4412 and 4421 are provided as fracture portions that fracture by force applied at the time of a collision of the vehicle V4000, and are set not to fracture by vibration or the like at the time of normal traveling.

Next, a state of the support member 4004 when the vehicle V4000 to which the vehicle display device 4001 is attached has a collision and force is applied will be described. As illustrated in FIG. 37, when the vehicle V4000 has a collision, the force in the direction of the arrow X4000 is applied. At this time, the notches 4412 and 4421 are formed in the placing portion 4041 and the leg portions 4042 of the support member 4004. Therefore, stress is more likely to be concentrated to the notches 4412 and 4421, and the placing portion 4041 and the leg portions 4042 fracture from tip ends of the notches 4412 and 4421 to a surface opposite to the surface in which the notches 4412 and 4421 are provided. The support member 4004 fractures before the light guide member 4003, and thus the light guide member 4003 placed on the placing portion 4041 falls.

According to the present embodiment, the support member 4004 provided to protrude to the front from the image projector 4002 to support the light guide member 4003 from below is included, and the support member 4004 is provided with the fracture portions that fracture to allow the light guide member 4003 to fall by force applied at the time of a collision of the vehicle V4000. Therefore, for example, in a collision of the vehicle V4000, when the collision object such as a head of a pedestrian gets hit by the light guide member 4003, the support member 4004 fractures and absorbs an impact before the light guide member 4003 is destroyed. From this configuration, the impact on the collision object can be decreased.

Further, the light guide member 4003 is placed on the placing portion 4041 of the support member 4004. Therefore, the light guide member 4003 can easily fall when the support member 4004 fractures.

Further, the notch 4412 is formed along the right and left direction in the central portion of the placing portion 4041 in the front and rear direction of the vehicle V4000, and thus the notch 4412 is provided in the position where the light guide member 4003 can easily fall as the notch 4412 fractures. Therefore, when the vehicle V4000 has a collision, the placing portion 4041 fractures and can absorb an impact before the light guide member 4003 is destroyed, and the impact on the collision object can be decreased.

Further, the notches 4421 are formed near the positions in the leg portions 4042, the positions continuing into the housing 4022 of the image projector 4002, in the leg portions 4042. Therefore, the notches 4421 are provided in the positions where the light guide member 4003 can easily fall as the notches 4421 fracture. When the vehicle V4000 has a collision, the leg portions 4042 fracture and can absorb an impact before the light guide member 4003 is destroyed, and the impact on the collision object can be decreased.

Further, because the notches 4412 and 4421 are formed in wedged shapes, the support member 4004 can easily fracture when force is applied at the time of a collision, and the support member 4004 can more easily and reliably fracture in the notches 4412 and 4421.

Note that the present invention is not limited to the embodiment, and includes other configurations and the like that can achieve the objective of the present invention and also includes modifications and the like as described below.

For example, in the above-described embodiment, the notches 4412 and 4421 are provided as portions (fracture portions) that fracture by force applied at the time of a collision of the vehicle V4000. However, the fracture portions that fracture to allow the light guide member 4003 to fall by the force applied at the time of a collision of the vehicle V4000 may just be provided. For example, the fracture portions may be formed in shapes to which stress of other than the notches is easily concentrated, or may be formed of a material that allows portions to which the placing portion 4041 and the leg portions 4042 are fixed to fracture first.

Further, in the embodiment, the notches 4412 and 4421 are provided in the support member 4004. However, it is sufficient as long as the support member 4004 fractures by the force applied at the time of a collision of the vehicle V4000, and either one of the notches 4412 or 4421 is provided. Further, the positions in which the notches are provided are not limited to the central portion of the placing portion 4041 in the front and rear direction of the vehicle V4000, and near the positions of the leg portions 4042, the positions continuing into the housing 4022 of the image projector 4002. For example, the notches may be provided near the other ends of the leg portions 4042 (near positions of the leg portions 4042, the positions continuing into the placing portion 4041). In the embodiment, the notch 4412 is provided in the placing portion 4041 near the position where the placing portion 4041 and the leg portions 4042 continue into each other. However, the notch may be provided in the leg portion 4042.

Further, in the embodiment, the leg portions 4042 of the support member 4004 are integrally provided with the image projector 4002. However, it is sufficient as long as the leg portions 4042 are provided to protrude to the front from the image projector 4002, and leg portions 4042 formed in separate bodies may be fixed to the image projector 4002.

Further, in the present embodiment, the inclined surface portion and the opening are formed in the facing wall A4000 of the instrument panel I4000, the facing wall A4000 facing the windshield. However, the inclined surface portion and the opening may be provided by fitting a member in a separate body having the inclined surface portion and the opening, in a hole provided in the facing wall A4000.

In addition, the most favorable configurations, methods, and the like for implementing the present invention have been disclosed in the above description. However, the present invention is not limited thereto. That is, although the present invention has been especially illustrated and described regarding a specific embodiment, various modifications can be applied to the above-described embodiment in shapes, materials, quantities, and other detailed configurations by a person skilled in the art without departing from the technical idea and the objective scope of the present invention.

Therefore, the shapes, materials, and the like disclosed in the above description are exemplarily described for facilitating the understanding of the present invention, and do not limit the present invention. Therefore, description of a member with a name, from which a part or all of the limitations of the shapes, materials, and the like are removed, is included in the present invention.

The present invention provides a vehicle display device that can make glare to a windshield unnoticeable, and can decrease impact on a collision object. A vehicle display device (4001) includes an image projector (4002) attached inside an instrument panel (I4000) provided with a descent wall portion (W4000) and an opening (H4000), a light guide member (4003) that guides light toward the descent wall portion (W4000), and a support member (4004) that supports the light guide member (4003) from below. The support member (4004) includes a placing portion (4041) on which the light guide member (4003) is placed, and leg portions (4042) that connect the placing portion (4041) and the image projector (4002). Wedge-shaped notches (4412 and 4421) that fracture by force applied at the time of a collision of a vehicle (V4000) are formed in the placing portion (4041) and the leg portions (4042).

Fifth Invention

Next, a fifth invention will be described.

The fifth invention is a bezel body and a vehicle display device having the following characteristics.

(1)

A bezel body including a bezel member fit in a facing wall in an instrument panel of a vehicle, the facing wall facing a windshield, and forming a part or all of a peripheral edge of an opening for projecting an image on the windshield by an image projector arranged in the instrument panel, the bezel member including a front bezel portion arranged at a front side of the vehicle with respect to the opening, the front bezel portion including a descent wall portion having optical transparency, and gradually going downward as going from the front side to a rear side of the vehicle to reach the opening, and the bezel body further including a light guide member formed in a plate shape, arranged to be layered on an inner surface of the front bezel portion, and adapted to guide light to the descent wall portion, and a support member attached to the bezel member and supporting the light guide member, and integrally including the bezel member, the light guide member, and the support member.

(2)

The bezel body according to (1), further including:

a light source unit arranged to face the front bezel portion across the light guide member, and adapted to emit light toward the front bezel portion through the light guide member, wherein at least a facing portion in the front bezel portion, the facing portion facing the light source unit, has optical transparency.

(3)

A vehicle display device including:

an image projector arranged in an instrument panel of a vehicle; and a bezel body including a bezel member fit in a facing wall in the instrument panel, the facing wall facing a windshield, and forming a part or all of a peripheral edge of an opening for projecting an image on the windshield by the image projector, wherein the bezel body is configured from the bezel body according to (1) or (2).

Hereinafter, the fifth invention will be described in detail.

TECHNICAL FIELD

The present invention relates to a bezel body disposed in an instrument panel of a vehicle, and a vehicle display device including the bezel body.

BACKGROUND ART

Figure 46:
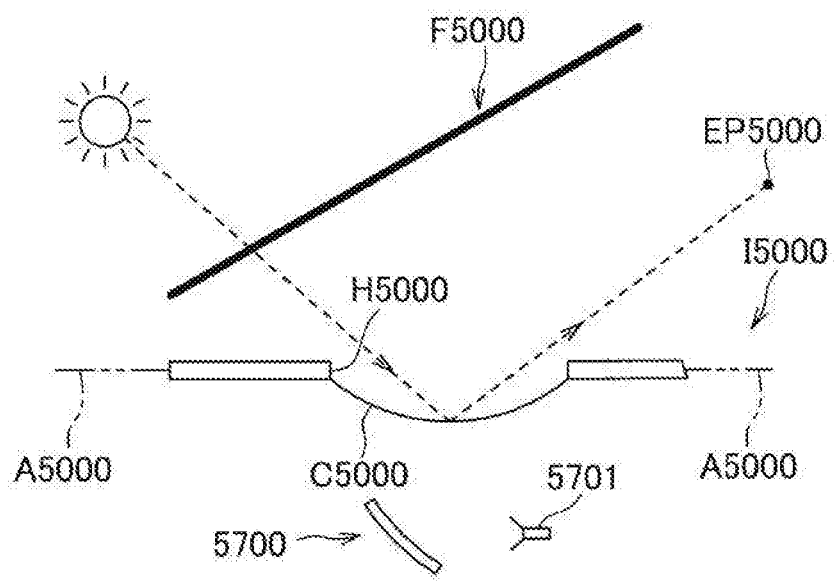
FIG. 46 is a sectional view schematically illustrating a conventional vehicle display device.

Conventionally, a vehicle display device as a head-up display device that projects an image on a windshield of a vehicle is provided in an instrument panel (for example, see Patent Literature 51). A vehicle display device 5700 described in Patent Literature 51 is attached in an instrument panel I5000 having an opening H5000 provided in a facing wall A5000 facing a windshield F5000, as illustrated in FIG. 46, and projects an image on the windshield F5000 through the opening H5000 by an image projector 5701. In such a vehicle display device 5700, for example, a transparent cover C5000 that blocks the opening H5000 is provided to prevent dust, water, and the like from entering the opening H5000. However, light from outside such as sunlight is reflected on the cover C5000 and proceeds to an eye point EP5000 of a passenger, and may provide a feeling of unpleasantness.

Figure 47:
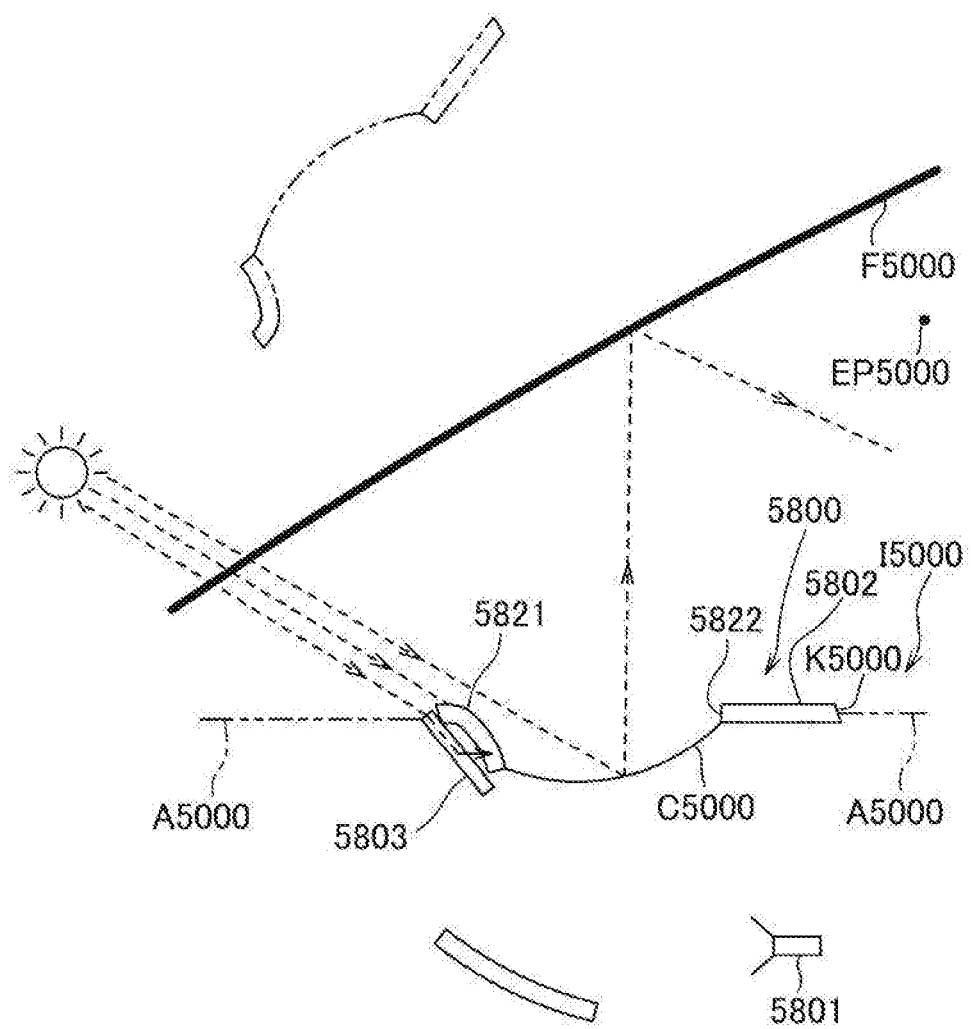
FIG. 47 is a sectional view schematically illustrating another conventional vehicle display device.

Therefore, as a configuration to avoid proceeding of the light from outside to the eye point EP5000 of the passenger, the vehicle display device 5800 illustrated in FIG. 47 can be considered. The vehicle display device 5800 is provided in the instrument panel I5000, and is configured from an image projector 5801 and a bezel member 5802. The bezel member 5802 is fit in a hole K5000 provided in the facing wall A5000 in the instrument panel I5000, the facing wall A5000 facing the windshield F5000. The bezel member 5802 is provided with a descent wall portion 5821 having optical transparency and gradually going downward as going from a front side to a rear side (from the left to the right in FIG. 47) of the vehicle, and an opening 5822 adjacent to a lower end and the rear side of the descent wall portion 5821. The opening 5822 is provided with the cover C5000 gradually going upward as going from the front side to the rear side of the vehicle, and the vehicle display device 5800 projects an image on the windshield F5000 through the opening 5822 of the bezel member 5802 by the image projector 5801. In such a configuration, the descent wall portion 5821 is provided, and the vehicle front side of the cover C5000 is positioned lower than the rear side. Therefore, the light from outside can be caused to less easily reach the cover C5000, and proceeding of the light from outside reflected on the cover C5000 toward the eye point EP5000 of the passenger can be suppressed.

CITATION LIST

Patent Literature

Patent Literature 51: JP 2007-148092 A

SUMMARY OF INVENTION

Technical Problem

In the above-described configuration, in the bezel member 5802, the light from outside does not illuminate near the opening 5822 of the descent wall portion 5821. Therefore, this position becomes dark and a difference in brightness between this position and the cover C5000 becomes large. Accordingly, a problem that glare to the windshield F5000 becomes noticeable can be considered. Therefore, a configuration to configure the descent wall portion 5821 of the bezel member 5802 from an optically transparent material, to arrange the light guide member 5803 to face an inner surface of the descent wall portion 5821, and to guide the light from outside with the light guide member 5803 to a position near the opening 5822 of the descent wall portion 5821 to illuminate the descent wall portion 5821 from the inner surface side can be considered. According to this configuration, the descent wall portion 5821 is made bright such that the difference in brightness becomes small. Therefore, the glare to the windshield F5000 can be made unnoticeable, and the feeling of unpleasantness provided to the passenger can be suppressed.

However, because the vehicle display device 5800 includes the light guide member 5803 and parts for supporting the light guide member 5803, the number of parts is increased, and thus there is a problem of a decrease in workability in attachment.

Therefore, the present invention has focused on the problem as described above, and an objective of the present invention is to provide a bezel body that can make glare to a windshield unnoticeable and can improve workability in attachment.

Solution to Problem

To solve the above-described problem, the invention described in (1) is a bezel body including a bezel member fit in a facing wall in an instrument panel of a vehicle, the facing wall facing a windshield, and forming a part or all of a peripheral edge of an opening for projecting an image on the windshield by an image projector arranged in the instrument panel, the bezel member including a front bezel portion arranged at a front side of the vehicle with respect to the opening, the front bezel portion including a descent wall portion having optical transparency, and gradually going downward as going from the front side to a rear side of the vehicle to reach the opening, and the bezel body further including a light guide member formed in a plate shape, arranged to be layered on an inner surface of the front bezel portion, and adapted to guide light to the descent wall portion, and a support member attached to the bezel member and supporting the light guide member, and integrally including the bezel member, the light guide member, and the support member.

The invention described in (2) further includes, in the invention according to (1), a light source unit arranged to face the front bezel portion across the light guide member, and adapted to emit light toward the front bezel portion through the light guide member, wherein at least a facing portion in the front bezel portion, the facing portion facing the light source unit, has optical transparency.

The invention described in (3) is a vehicle display device including: an image projector arranged in an instrument panel of a vehicle; and a bezel body including a bezel member fit in a facing wall in the instrument panel, the facing wall facing a windshield, and forming a part or all of a peripheral edge of an opening for projecting an image on the windshield by the image projector, wherein the bezel body is configured from the bezel body according to (1) or (2).

Advantageous Effects of Invention

According to the invention described in (1), the bezel member, the light guide member, and the support member attached to the bezel member and which supports the light guide member are integrally included. Therefore, the bezel member, the light guide member, and the support member can be integrally attached to the instrument panel, and workability in attaching the bezel body can be improved.

According to the invention described in (2), the light source unit arranged to face the front bezel portion across the light guide member, and which emits light toward the front bezel portion through the light guide member is further included, and at least the facing position in the front bezel portion, the facing portion facing the light source unit, has optical transparency. Therefore, the light emitted from the light source unit can be projected on the windshield through the light guide member and the front bezel portion, and various visual effects can be produced using the light emitted from the light source unit, in addition to the image projected on the windshield by the image projector.

According to the invention described in (3), the bezel body according to (1) or (2) is included. Therefore, the bezel member, the light guide member, and the support member can be integrally attached to the instrument panel, and the workability in attaching the vehicle display device can be improved.

Description of Embodiments

A vehicle display device and a bezel body according to an embodiment of the present invention will be described with reference to FIGS. 42 to 45. A vehicle display device 5001 of the present embodiment is used as a head-up display device attached to an instrument panel I5000 of a vehicle V5000, and which performs projection on a windshield F5000, and includes an image projector 5010 and a bezel body 5020. Note that, in the present embodiment, an up and down direction, a front and rear direction, and a right and left direction correspond to an up and down direction, a front and rear direction, and a right and left direction in the vehicle V5000.

Figure 44:
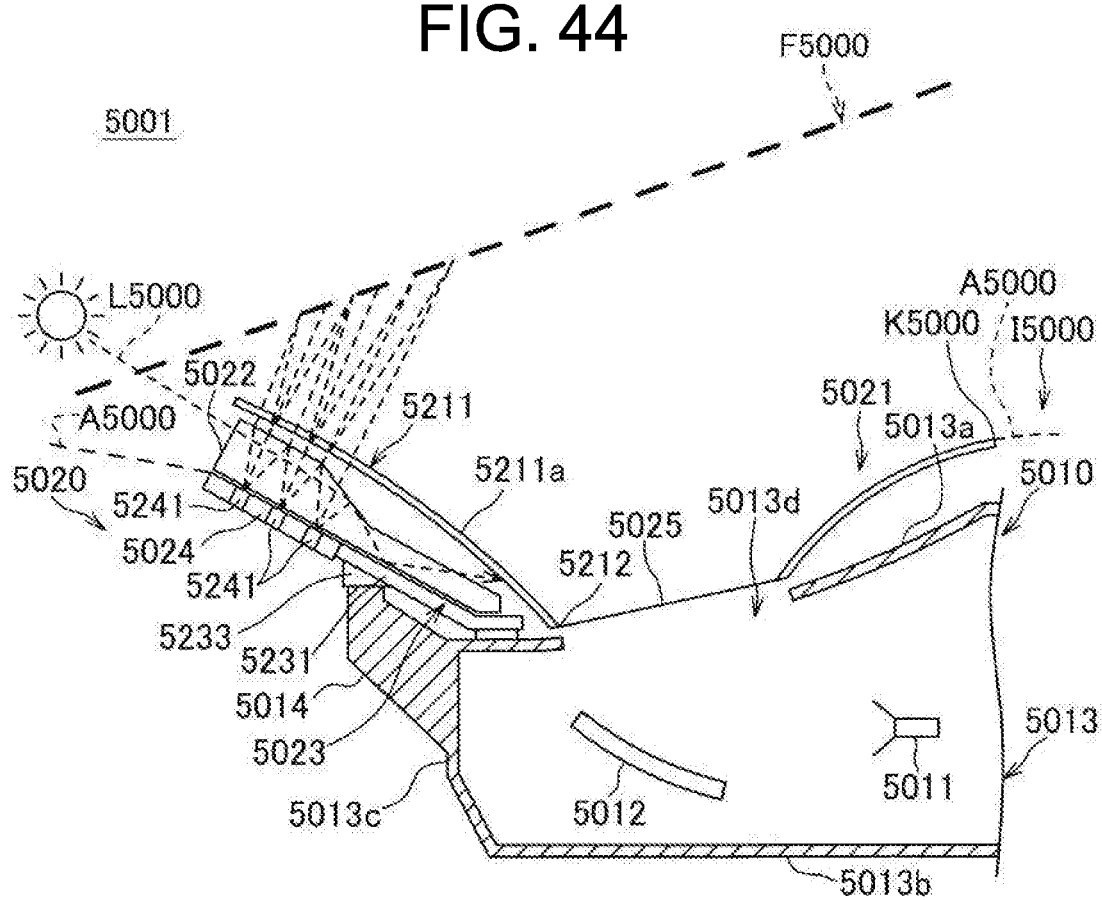
FIG. 44 is a sectional view schematically illustrating a state in which the vehicle display device illustrated in FIG. 42 is mounted on a vehicle.

As illustrated in FIG. 44, the image projector 5010 is provided with a display source 5011, a reflection portion 5012 that reflects an image from the display source 5011, a housing 5013 in which the display source 5011 and the reflection portion 5012 are accommodated, and two leg portions 5014 for fixing the bezel body 5020. The housing 5013 is formed in a box shape, using a synthetic resin, and includes an upper surface wall 5013a, a bottom wall 5013b, a peripheral wall 5013c, and an opening 5013d provided in the upper surface wall 5013a. The opening 5013d is arranged to be layered with an opening 5212 of a bezel member 5021 described below. The two leg portions 5014 are integrally formed with the housing 5013. One ends respectively run forward and upward from both ends in the right and left direction, of a front surface of the housing 5013, and upper ends that have run are bent. The other end sides are fixed to a fixing portion 5233 of a support member 5023 described below. Further, the image projector 5010 reflects the image projected by the display source 5011, on the reflection portion 5012, and projects the image on the windshield F5000 through the opening 5013d. Accordingly, the passenger of the vehicle V5000 recognizes the image displayed on the windshield F5000.

The bezel body 5020 includes the bezel member 5021 fit in the hole K5000 of the instrument panel I5000, a light guide member 5022 that guides the light toward the bezel member 5021, the support member 5023 attached to the bezel member 5021, and which supports the light guide member 5022, alight source unit 5024 that emits the light toward the bezel member 5021 through the light guide member 5022, a cover 5025 attached to the opening 5212 described below provided in the bezel member.

The bezel member 5021 is formed including a front bezel portion 5211 formed in an annular shape in plan view, using a synthetic resin having optical transparency, and arranged at a front side of the vehicle V5000, the opening 5212 for projecting the image on the windshield F5000 by the image projector 5010, and fitting claw portions 5213 for being fit in the support member 5023. That is, an inner peripheral edge of the bezel member 5021 forms the opening 5212. The front bezel portion 5211 includes a descent wall portion 5211a gradually going downward as going from the front side to the rear side of the vehicle V5000 to reach the opening 5212.

Figure 45:
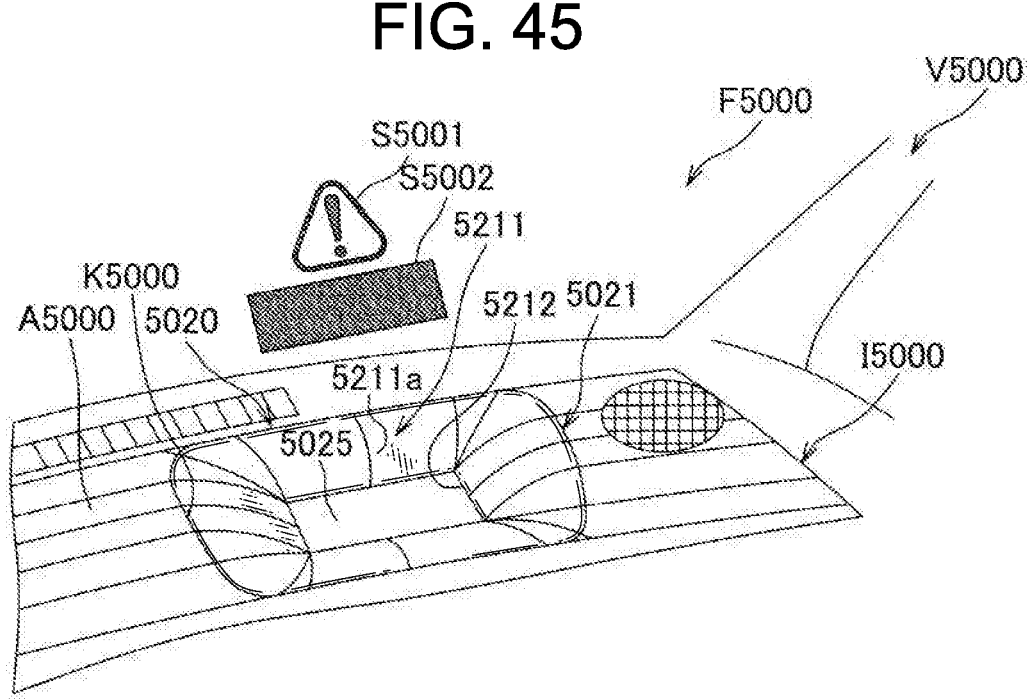
FIG. 45 is a diagram illustrating a state in which light is projected on a windshield using the vehicle display device illustrated in FIG. 42.

As illustrated in FIGS. 44 and 45, when the bezel member 5021 is fit in the hole K5000 provided in the facing wall A5000, a part in an outer peripheral edge of the bezel member 5021 at the front side (that is, an end portion of the front bezel portion 5211 at the front side of the vehicle V5000) is arranged to rise upward from the facing wall A5000, and the other portion other than the part of the outer peripheral edge is arranged such that an outer surface (upper surface) of the bezel member 5021 and an outer surface of the facing wall A5000 smoothly continue. At this time, the opening 5212 of the bezel member 5021 and the opening 5013d of the image projector 5010 are arranged to be layered in the up and down direction. Further, color adjustment to have similar appearance to the facing wall A5000, surface finishing, and the like are performed for the bezel member 5021 so that a difference in glare to the windshield F5000 between the bezel member 5021 and the facing wall A5000 of the instrument panel I5000 is not noticeable.

The light guide member 5022 is formed in a square plate shape in plan view, using a material having a high degree of transparency, such as glass or a resin, and is arranged to be layered in an inner surface (lower side) of the front bezel portion 5211. Further, the light guide member 5022 is formed such that a front side is formed thick, a rear side is formed thin, and a portion between the portion formed thick and a portion formed thin is formed to become gradually thinner as going from the front to the rear, in section view in the front and rear direction. To be specific, as illustrated in FIG. 44, a surface of the light guide member 5022 at a placing portion 5231 side is formed in a plan manner, and an inclined surface gradually descending as going from the front to the rear is formed in an intermediate portion in the front and rear direction, of a surface at the front bezel portion 5211 side.

Further, an end portion of the light guide member 5022 at the front side is provided to be positioned to the inner side (lower side) of the part of the bezel member 5021, the part rising above the facing wall A5000, and an end portion of the light guide member 5022 at the front side is arranged to be exposed to be able to receive the light from outside such as sunlight. As illustrated by the arrow L5000 of FIG. 44, the light guide member 5022 is provided to receive the light from outside, to guide the light to the end portion of the vehicle rear side, and to emit the light toward the descent wall portion 5211a having optical transparency. Accordingly, the vicinity of the opening 5212 of the descent wall portion 5211a can be illuminated. According to such a configuration, the vicinity of the opening 5212 of the descent wall portion 5211a, to which the light from outside is not emitted, can be illuminated and made bright from the inside. The difference in brightness between the cover 5025 and the vicinity of the opening 5212 of the descent wall portion 5211a can be decreased, the glare to the windshield F5000 can be made unnoticeable, and the feeling of unpleasantness to the passenger can be suppressed.

The support member 5023 is formed of a synthetic resin, and is formed to include a placing portion 5231 on which the light guide member 5022 is placed, fitting-receiving portions 5232 to which the fitting claw portions 5213 of the bezel member 5021 are fit, and the fixing portion 5233 to which the leg portions 5014 of the image projector 5010 are fixed. The placing portion 5231 is formed in a plate shape, and is arranged to be inclined along the front bezel portion 5211. As illustrated in FIG. 44, an end portion of the placing portion 5231 at the rear side is bent to follow the upper surface wall 5013a of the housing 5013. In the bezel body 5020, the fitting claw portions 5213 of the bezel member 5021 and the fitting-receiving portions 5232 of the support member 5023 are fit into each other, so that the bezel member 5021, the light guide member 5022, and the support member 5023 can be integrated.

As illustrated in FIG. 44, the light source unit 5024 is arranged to face the front bezel portion 5211 across the light guide member 5022, includes light sources 5241 such as LEDs, and can emit the light toward the front bezel portion 5211 through the light guide member 5022.

Further, for example, as illustrated in FIG. 45, the light source unit 5024 is controlled to emit the light toward the front bezel portion 5211 when an ECU (not illustrated) detects approach of a front vehicle, deviation of a traffic lane, or the like, and the image projector 5010 projects warning display S5001 on the windshield. Accordingly, as illustrated in S5002 of FIG. 45, the light emitted from the light source unit 5024 toward the front bezel portion 5211 is reflected in the windshield F5000, and the projection of the warning display S5001 can be easily recognized by the passenger, and visibility can be improved. Further, for example, the light is emitted toward the front bezel portion 5211 when an ignition switch of the vehicle V5000 is turned ON, so that effects using the light can be provided to the passenger. The light source unit 5024 can be provided with the light sources 5241 by changing the color and arrangement of the light source according to a desired visual effect.

The cover 5025 is formed in a thin plate shape in accordance with the size of the opening 5212 of the bezel member 5021, using a transparent synthetic resin. The cover 5025 is attached to the opening 5212 of the bezel member 5021 to gradually go upward as going from the front side to the rear side of the vehicle, and can prevent dust, water, and the like from entering the opening 5212.

Figure 43:
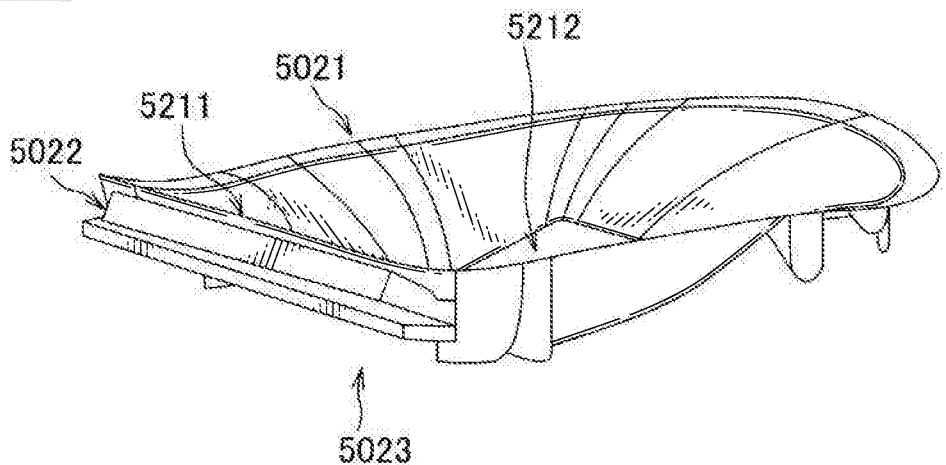
FIG. 43 is a perspective view illustrating a state in which a bezel body illustrated in FIG. 42 is assembled.

Next, an example of a method of attaching the vehicle display device 5001 will be described. First, the bezel body 5020 is assembled and integrated as illustrated in FIG. 43, in advance. Further, the bezel body 5020 integrated in advance and the image projector 5010 are combined, and the vehicle display device 5001 is obtained. The vehicle display device 5001 assembled as described above is fit in the hole K5000 provided in the facing wall A5000 of the instrument panel I5000, so that attachment of the vehicle display device 5001 is completed, as illustrated in FIG. 45.

According to the present embodiment, the bezel body 5020 integrally includes the bezel member 5021, the light guide member 5022, and the support member 5023 attached to the bezel member 5021 and which supports the light guide member. Therefore, the bezel member 5021, the light guide member 5022, and the support member 5023 can be integrally attached to the instrument panel I5000, and workability in attaching the bezel body 5020 and the vehicle display device 5001 can be improved.

Further, the light source unit 5024 arranged to face the front bezel portion 5211 across the light guide member 5022, and which emits the light toward the front bezel portion 5211 through the light guide member 5022 is further included, and the front bezel portion 5211 has optical transparency. Therefore, the light emitted from the light source unit 5024 can be projected on the windshield F5000 through the light guide member 5022 and the front bezel portion 5211, and various visual effects such as improvement of the visibility of the image projected by the image projector 5010, can be produced using the light emitted from the light source unit 5024, in addition to the image projected on the windshield F5000 by the image projector 5010.

Note that the present invention is not limited to the embodiment, and includes other configurations and the like that can achieve the objective of the present invention and also includes modifications and the like as described below.

For example, in the embodiment, the image projector 5010 and the bezel body 5020 are combined, and are attached to the vehicle V5000 as the vehicle display device 5001. However, the image projector 5010 and the bezel body 5020 may be separated bodies, and may be separately attached to the vehicle V5000.

Further, in the embodiment, the bezel member 5021 and the support member 5023 are fit with the fitting claw portions 5213 and the fitting-receiving portions 5232. However, it is sufficient as long as the bezel member 5021 and the support member 5023 are integrally provided. For example, the bezel member 5021 and the support member 5023 may be fixed by another fixing method, such as being fixed using bolts, for example.

Further, in the embodiment, the bezel member 5021 is formed in an annular shape in plan view, and forms all of the peripheral edge of the opening 5212. However, the bezel member 5021 may be formed to have a portion (that is, the front bezel portion 5211) that forms a part of the peripheral edge of the opening 5212, and a portion that forms the other part of the peripheral edge of the opening 5212 may be integrally formed with the instrument panel I5000.

Further, in the embodiment, the bezel member 5021 has optical transparency. However, it is sufficient as long as at least the facing position facing the light source unit 5024 has optical transparency. Further, in a bezel body not including the light source unit 5024, at least the descent wall portion 5211a may just have optical transparency.

In addition, the most favorable configurations, methods, and the like for implementing the present invention have been disclosed in the above description. However, the present invention is not limited thereto. That is, although the present invention has been especially illustrated and described regarding a specific embodiment, various modifications can be applied to the above-described embodiment in shapes, materials, quantities, and other detailed configurations by a person skilled in the art without departing from the technical idea and the objective scope of the present invention.

Therefore, the shapes, materials, and the like disclosed in the above description are exemplarily described for facilitating the understanding of the present invention, and do not limit the present invention. Therefore, description of a member with a name, from which a part or all of the limitations of the shapes, materials, and the like are removed, is included in the present invention.

The present invention provides a bezel body that can make glare to a windshield unnoticeable and can improve workability in attachment, and a vehicle display device including the bezel body. A bezel body (5020) of a vehicle display device (5001) integrally includes a bezel member (5021), a light guide member (5022), and a support member (5023) of the light guide member (5022), and a light source unit (5024) that emits light toward the bezel member (5021) through the light guide member (5022). The bezel member (5021) includes a front bezel portion (5211) having optical transparency and including a descent wall portion (5211a) gradually going downward as going from a front side to a rear side, an opening (5212) for projecting an image by an image projector (5010), and fitting claw portions (5213) for being fit in the support member (5023), and the support member (5023) includes fitting-receiving portions (5232) to which the fitting claw portions (5213) are fit.

Sixth Invention

Next, a sixth invention will be described.

The sixth invention is a bezel body, an instrument panel, and a vehicle display device having the following characteristics.

(1)

A bezel body including a bezel member fit in a facing wall in an instrument panel of a vehicle, the facing wall facing a windshield, and forming a peripheral edge of an opening for projecting an image on the windshield by an image projector arranged in the instrument panel, wherein the bezel member is integrally provided with a transparent cover that blocks the opening.

(2)

The bezel body according to (1), wherein the bezel member and the transparent cover are integrally formed by two-color molding or are integrally attached by welding or gluing.

(3)

An instrument panel in which an image projector is arranged therein, and an opening for projecting an image on a windshield by the image projector is provided in a facing wall facing the windshield, wherein the facing wall is integrally provided with a transparent cover that blocks the opening.

(4)

The instrument panel according to (3), wherein the facing wall and the transparent cover are integrally formed by two-color molding or are integrally attached by welding or gluing.

(5)

A vehicle display device including:

an image projector arranged in an instrument panel of a vehicle; and a bezel body including a bezel member arranged in a facing wall in the instrument panel, the facing wall facing a windshield, and forming a peripheral edge of an opening for projecting an image on the windshield by the image projector, wherein the bezel body is configured from the bezel body according to (1) or (2).

Hereinafter, the sixth invention will be described in detail.

TECHNICAL FIELD

The present invention relates to a bezel body disposed in an instrument panel of a vehicle, an instrument panel, and a vehicle display device including a bezel body.

BACKGROUND ART

Figure 56:
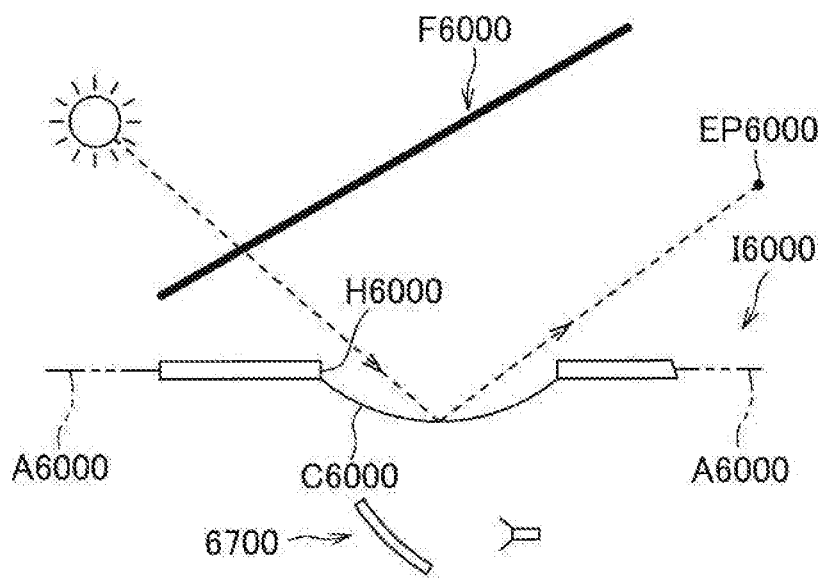
FIG. 56 is a sectional view schematically illustrating a conventional vehicle display device.

Conventionally, a vehicle display device as a head-up display device that projects an image on a windshield of a vehicle is provided in an instrument panel (for example, see Patent Literature 61). A vehicle display device 6700 described in Patent Literature 61 is attached in an instrument panel I6000 provided with an opening H6000 in a facing wall A6000 facing a windshield F6000, as illustrated in FIG. 56, and which projects an image on the windshield F6000 through the opening H6000. Then, a projection slot for image is provided in a case (not illustrated) to be layered with the opening H6000 in the vehicle display device 6700.

In such a vehicle display device 6700, for example, a transparent cover C6000 that blocks the projection slot is provided to prevent dust, water, and the like from entering the case through the projection slot for image. However, light from outside such as sunlight may be reflected on the cover C6000 and directly proceed to an eye point EP6000 of a passenger, and provide a feeling of unpleasantness.

Figure 57:
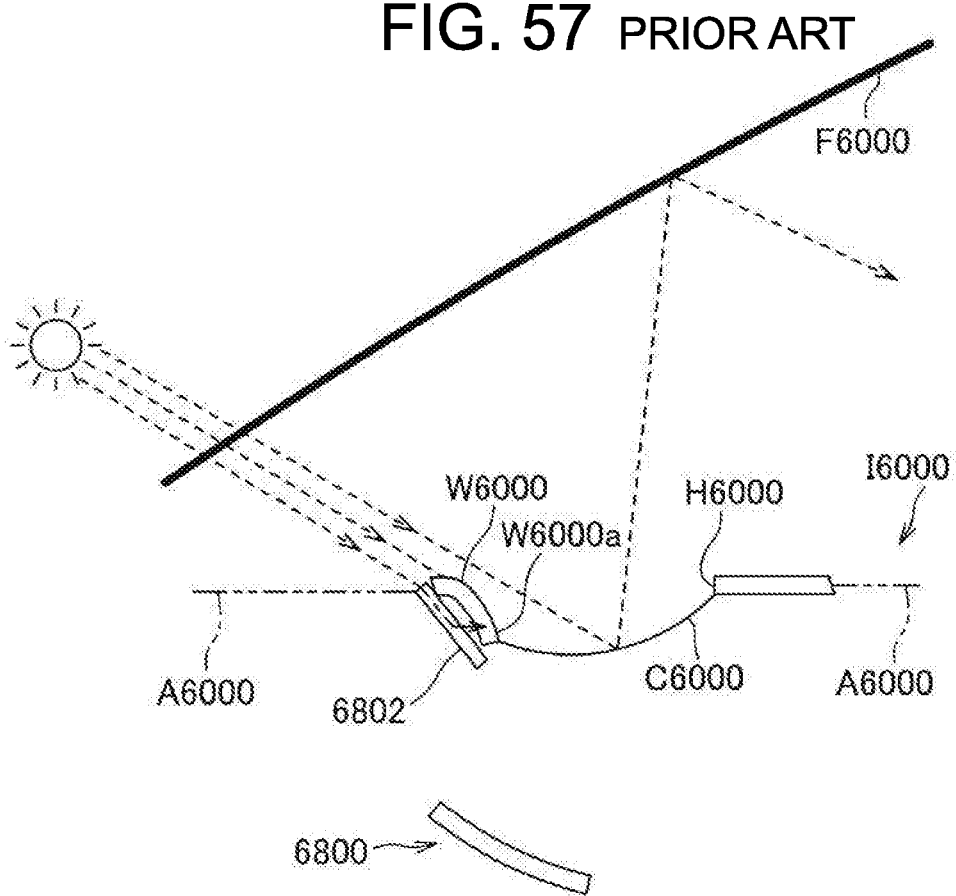
FIG. 57 is a sectional view schematically illustrating another conventional vehicle display device.

Therefore, as a configuration to avoid proceeding of the light from outside to the eye point EP6000 of the passenger, a vehicle display device 6800 illustrated in FIG. 57 can be considered. This vehicle display device 6800 is provided in the instrument panel I6000. The instrument panel I6000 is provided with a descent wall portion W6000 gradually going downward as going from a front side to a rear side (from the left to the right in FIG. 57) of the vehicle, and the opening H6000 adjacent to a lower end of the descent wall portion W6000, in the facing wall A6000 facing the windshield F6000. The projection slot of the vehicle display device 6800 is provided to be layered with the opening H6000. Then, the cover C6000 gradually going upward as going from the front side to the rear side of the vehicle is provided on the projection slot, and the vehicle display device 6800 projects an image on the windshield F6000 through the projection slot and the opening H6000. In such a configuration, the descent wall portion W6000 is provided, and the vehicle front side of the cover C6000 is positioned lower than the rear side. Therefore, the light from outside can be caused to less easily reach the cover C6000, and direct proceeding of the light from outside reflected on the cover C6000 to the eye point EP6000 of the passenger can be suppressed.

CITATION LIST

Patent Literature

Patent Literature 61: JP 2007-148092 A

SUMMARY OF INVENTION

Technical Problem

In the above-described configuration, the light from outside does not illuminate a position W6000a near the opening H6000 in the descent wall portion W6000 in the instrument panel I6000. Therefore, the position W6000a becomes dark, and a difference in brightness between the position W6000a and the cover C6000 becomes large. Accordingly, glare to the windshield F6000 may become noticeable. Therefore, a configuration to configure the descent wall portion W6000 from an optically transparent material, to arrange a plate light guide member 6802 to face an inner surface of the descent wall portion W6000, to guide the light from outside by the light guide member 6802 to the position W6000a near the opening H6000 of the descent wall portion W6000, and to illuminate the descent wall portion W6000 from the inner surface side can be considered. According to this configuration, the descent wall portion W6000 is made bright so that the difference in brightness becomes small. Therefore, the glare to the windshield F6000 can be made unnoticeable, and the feeling of unpleasantness provided to the passenger can be suppressed.

However, in the vehicle display device 6800 exemplarily illustrated in FIG. 57, because members such as the light guide member 6802 are arranged in the inner surface side of the descent wall portion W6000, a gap is more likely to be caused between the descent wall portion W6000 and the cover C6000 at the vehicle display device 6800 side. If such a gap is caused, a shadow on the cover C6000 made by the lower end of the descent wall portion W6000 becomes especially darker than a periphery, and emission of light by the light guide member 6802 is difficult to reduce the difference in brightness between the shadow and the periphery.

Figure 58:
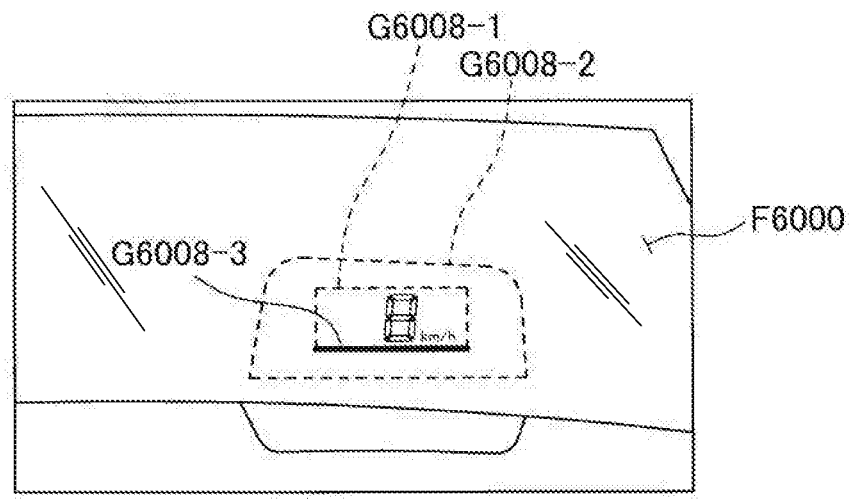
FIG. 58 is a schematic view illustrating a projected image projected on a windshield by the vehicle display device of FIG. 57.

FIG. 58 illustrates a state in which a glare image G6008-2 surrounds a periphery of a projected image G6008-1, the glare image G6008-2 being a peripheral edge portion of the opening H6000 in the instrument panel I6000, which is reflected in the windshield F6000 in a pale and unnoticeable manner. Here, in the vehicle display device 6800 exemplarily illustrated in FIG. 57, the dark shadow may be reflected in the windshield F6000 in a dark manner and may be made noticeable, as illustrated in FIG. 58. In FIG. 58, the shadow is reflected in a lower edge of the projected image G6008-1 as a streak dark image G6008-3. Such a streak dark image G6008-3 is especially noticeable, and thus often annoys the passenger.

Therefore, an objective of the present invention is to provide a bezel body, an instrument panel, and a vehicle display device that enable image projection while suppressing annoyance felt by a passenger.

Solution to Problem

To solve the above objective, the invention according to (1) is a bezel body including a bezel member fit in a facing wall in an instrument panel of a vehicle, the facing wall facing a windshield, and forming a peripheral edge of an opening for projecting an image on the windshield by an image projector arranged in the instrument panel, wherein the bezel member is integrally provided with a transparent cover that blocks the opening.

The invention described in (2) is that, in the invention according to (1), the bezel member and the transparent cover are integrally formed by two-color molding or are integrally attached by welding or gluing.

To solve the above objective, the invention according to (3) is an instrument panel in which an image projector is arranged therein, and an opening for projecting an image on a windshield by the image projector is provided in a facing wall facing the windshield, wherein the facing wall is integrally provided with a transparent cover that blocks the opening.

The invention described in (4) is that, in the invention according to (3), the facing wall and the transparent cover are integrally formed by two-color molding or are integrally attached by welding or gluing.

To solve the above objective, the invention according to (5) is a vehicle display device including: an image projector arranged in an instrument panel of a vehicle; and a bezel body including a bezel member arranged in a facing wall in the instrument panel, the facing wall facing a windshield, and forming a peripheral edge of an opening for projecting an image on the windshield by the image projector, wherein the bezel body is configured from the bezel body according to (1) or (2).

Advantageous Effects of Invention

According to the invention described in (1), (3), and (5), the transparent cover that blocks the opening is integrally provided in the bezel member and the facing wall in the instrument panel, and no gap is caused therebetween. Therefore, the edge of the opening does not make a shadow on the transparent cover, and occurrence of a position darker than a periphery, such as the above-described streak dark glare, can be suppressed. As a result, annoyance to the passenger by the streak dark glare can be suppressed. That is, according to the invention according to (1), (3), and (5), image projection can be performed while suppressing the annoyance felt by the passenger.

According to the invention described in (2) and (4), the bezel member, the facing wall in the instrument panel, and the transparent cover are integrally formed by two-color molding, or are integrally attached by welding or gluing. Therefore, integrity between the bezel member and the transparent cover, and integrity between the facing wall and the transparent cover can be enhanced, and the appearance can be improved.

Description of Embodiments

A bezel body and a vehicle display device according to a first embodiment of the present invention will be described with reference to FIGS. 48 to 52.

Figure 48:
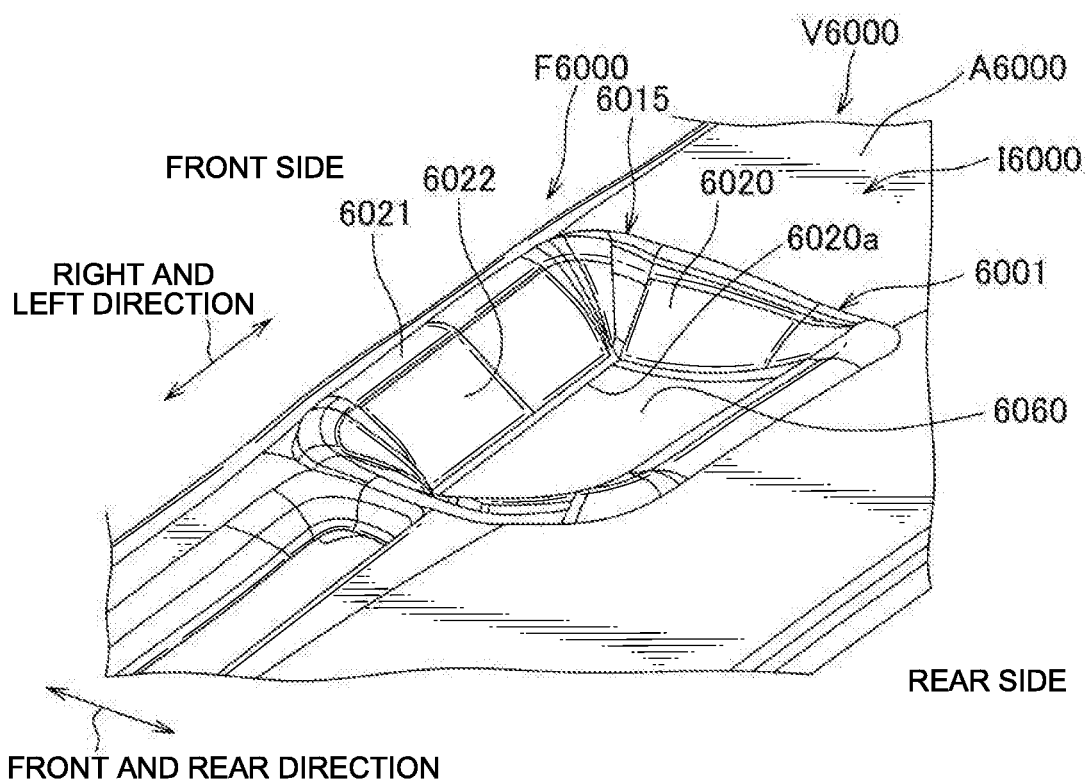
FIG. 48 is a perspective view illustrating a state in which a vehicle display device according to a first embodiment of the present invention is assembled in an instrument panel.
Figure 49:
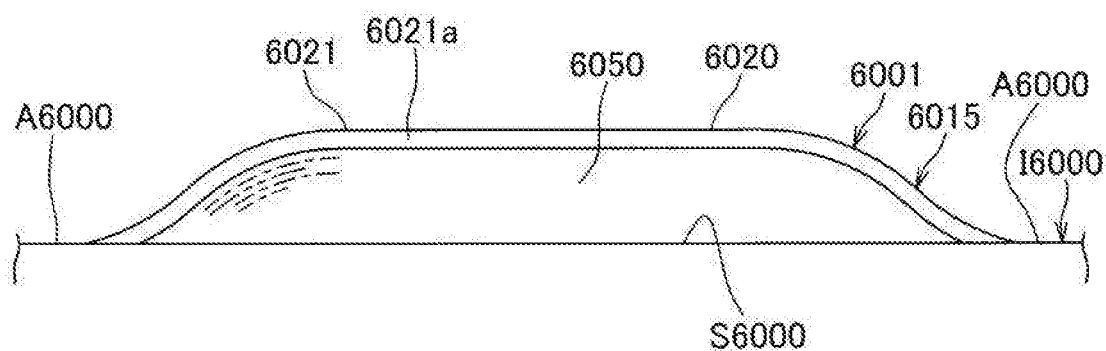
FIG. 49 is a diagram of the vehicle display device of FIG. 48 viewed from a front direction of a vehicle.
Figure 50:
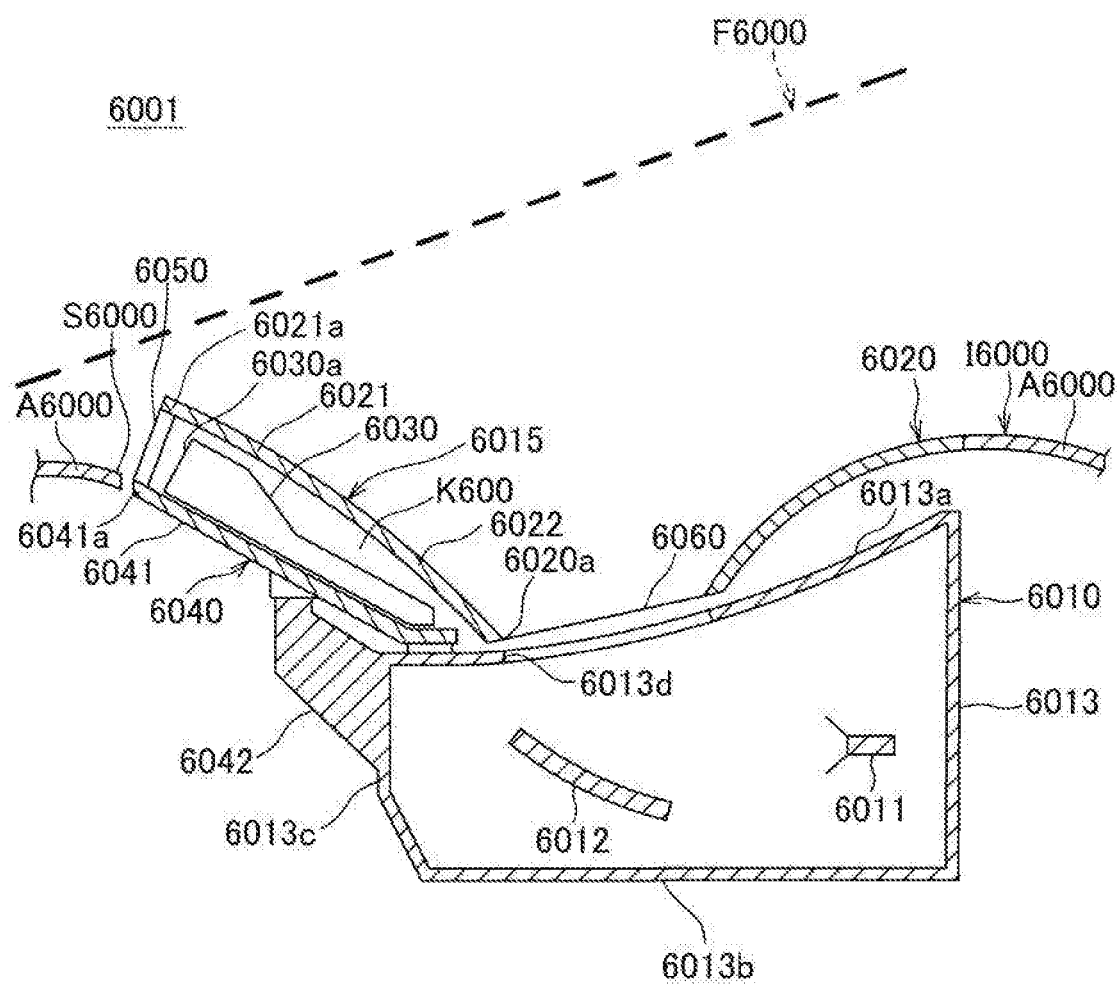
FIG. 50 is a sectional view of the vehicle display device of FIG. 48.
Figure 51:
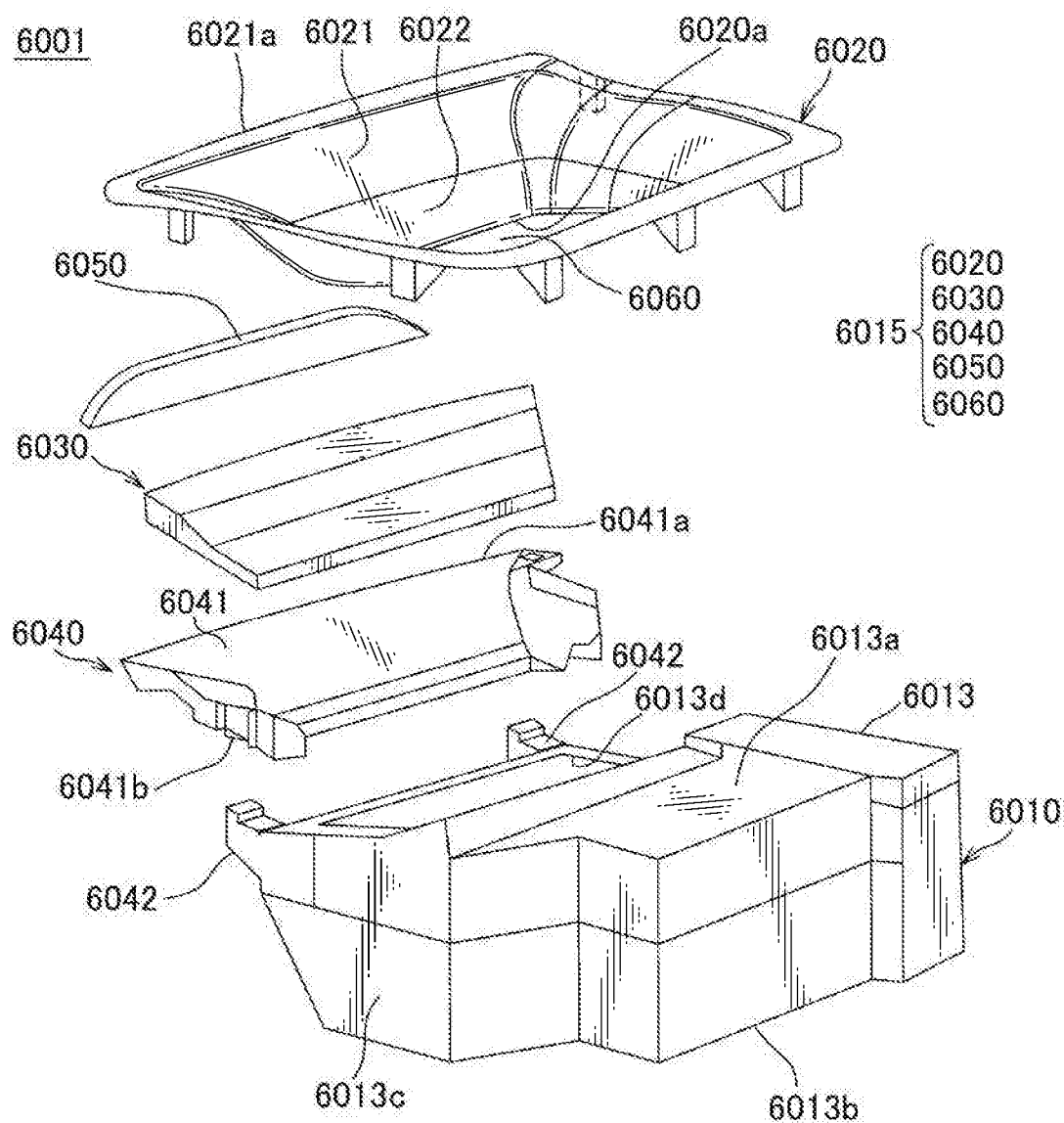
FIG. 51 is an exploded perspective view of the vehicle display device of FIG. 48.
Figure 52:
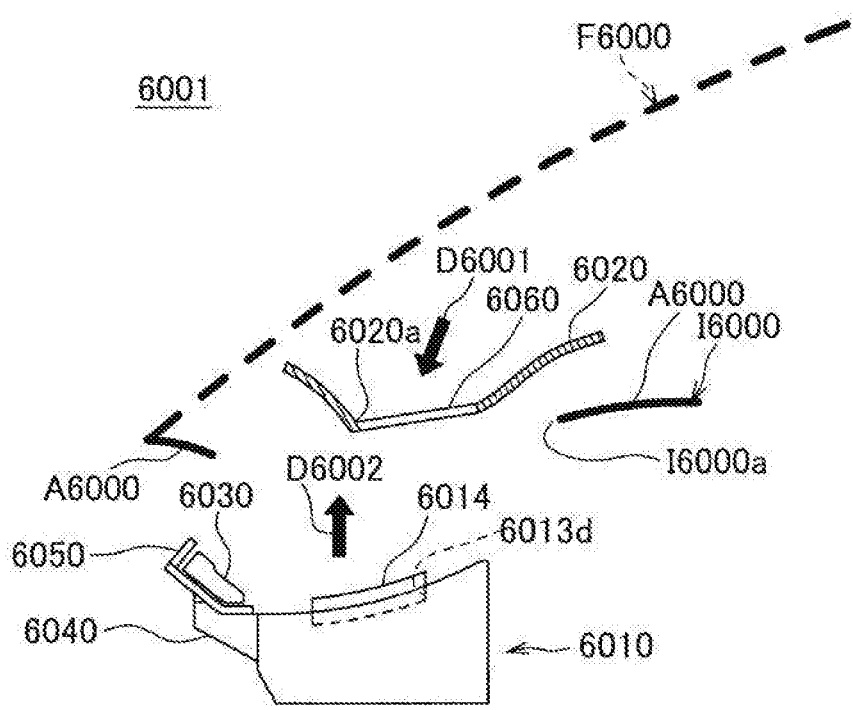
FIG. 52 is a diagram for describing assembly to a facing wall in the instrument panel of the vehicle display device of FIG. 48, the facing wall facing a windshield.

FIG. 48 is a perspective view illustrating a state in which a vehicle display device according to the first embodiment of the present invention is assembled in an instrument panel. FIG. 49 is a diagram of the vehicle display device of FIG. 48 viewed from a front direction of a vehicle. FIG. 50 is a sectional view of the vehicle display device of FIG. 48. FIG. 51 is an exploded perspective view of the vehicle display device of FIG. 48. FIG. 52 is a diagram for describing assembly to a facing wall in the instrument panel of the vehicle display device of FIG. 48, the facing wall facing a windshield. In the description below, "front, rear, up, down, right, and left" correspond to front, rear, up, down, right, and left of a vehicle V6000.

A vehicle display device 6001 of the present embodiment is used as a head-up display device attached to an instrument panel I6000 of the vehicle V6000, and which performs projection of an image on a windshield F6000, as illustrated in FIGS. 48 and 49.

The vehicle display device 6001 includes an image projector 6010 and a bezel body 6015, as illustrated in FIGS. 50 and 51.

The image projector 6010 includes a display source 6011 for projecting an image, a reflection portion 6012 that reflects the image from the display source 6011, and a housing 6013 made of a synthetic resin, which accommodates the display source 6011 and the reflection portion 6012. The housing 6013 includes an upper wall portion 6013a, a lower wall portion 6013b arranged to face the upper wall portion 6013a, and a peripheral wall portion 6013c linked with peripheral edges of the upper wall portion 6013a and the lower wall portion 6013b. The upper wall portion 6013a is provided with a projection slot 6013d arranged to be layered with an opening 6020a of a bezel member 6020 described below. The image projector 6010 reflects an image projected by the display source 6011, on the reflection portion 6012, and projects the image on the windshield F6000 through the projection slot 6013d. Accordingly, a passenger of the vehicle V6000 visually recognizes the image displayed on the windshield F6000.

The bezel body 6015 includes the bezel member 6020, a light guide member 6030, a support member 6040, a lighting window member 6050, and a transparent cover 6060.

The bezel member 6020 is made of a synthetic resin having a semi-transmitting property (optical transparency), and has an annular shape in plan view including the opening 6020a in the center and has a shape gradually going downward as going from an outer peripheral edge to an inner peripheral edge. In other words, the bezel member 6020 is formed into a shape of a hollow and approximately truncated square pyramid, which is flipped upside down, with an upper end surface and a lower end surface open. The bezel member 6020 is arranged to be fit in a hole provided in a facing wall A6000 in the instrument panel I6000, the facing wall A6000 facing the windshield F6000. That is, the bezel member 6020 is fit in the facing wall A6000 and forms all of a peripheral edge of the opening 6020a for projecting the image on the windshield F6000 by the image projector 6010 arranged in the instrument panel I6000.

The bezel member 6020 includes a front bezel portion 6021 arranged at a front side of the vehicle V6000 when fit in the facing wall A6000. An end portion 6021a of the front bezel portion 6021 at the front side of the vehicle V6000 is arranged to rise upward from the facing wall A6000 with a gap S6000 between the end portion 6021a and the facing wall A6000 (arranged above the facing wall A6000). Further, the front bezel portion 6021 includes a descent wall portion 6022 gradually going downward as going from the front side to the rear side of the vehicle V6000 to reach the opening 6020a.

When fit in the facing wall A6000, a part in an outer peripheral edge of the bezel member 6020 at the front side (that is, an end portion 6021a of the front bezel portion 6021 at the front side of the vehicle V6000) is arranged to rise upward from the facing wall A6000 (FIG. 49), and the other part except the part of the outer peripheral edge is arranged to smoothly continue into an outer surface (upper surface) of the bezel member 6020 and an outer surface of the facing wall A6000 (FIG. 48). Further, at this time, the opening 6020a of the bezel member 6020 and the projection slot 6013d of the image projector 6010 are arranged to be layered in the up and down direction. Further, color adjustment to have similar appearance to the facing wall A6000, surface finishing, and the like are performed for the bezel member 6020 so that a difference in glare to the windshield F6000 between the bezel member 6020 and the facing wall A6000 of the instrument panel I6000 is not noticeable.

The light guide member 6030 is formed in an approximately square plate shape in plan view (FIG. 51), using a material having a high degree of transparency such as glass, acrylic, or a synthetic resin like polycarbonate, and is arranged to be layered on an inner surface of the front bezel portion 6021 with a slight gap. The light guide member 6030 is formed such that a front side is formed thick, a rear side is formed thin, and a portion between the portion formed thick and the portion formed thin gradually becomes thinner as going from the front to the rear, in section view in the front and rear direction (FIG. 50). To be specific, a surface facing downward in the light guide member 6030 is formed in a plan manner, and an inclined surface gradually descending as going from the front to the rear is formed in an intermediate portion in the front and rear direction, of a surface facing upward at the descent wall portion 6022 side.

The light guide member 6030 is formed to guide light entering a light incident surface 6030a that is an end surface at the front side of the vehicle V6000 to an end portion at the rear side, and to emit the light from a surface at the descent wall portion 6022 side. That is, the light guide member 6030 guides the light in a light guiding direction going from the end portion at the front side, where the light incident surface 6030a exists, to the opposite end portion at the rear side. Accordingly, the light can be guided toward the descent wall portion 6022 having optical transparency, and can illuminate a position near the opening 6020a in the descent wall portion 6022.

The support member 6040 includes a placing portion 6041 made of a synthetic resin and a pair of leg portions 6042.

The placing portion 6041 is a portion on which the light guide member 6030 is placed, and is formed in an approximately plate shape in plan view that is slightly larger than the shape in plan view of the light guide member 6030. The placing portion 6041 is arranged with a gap from the inner surface of the front bezel portion 6021, and an end portion 6041a at the front side of the vehicle V6000 is arranged side by side with an end portion 6021a of the front bezel portion 6021 with a gap roughly in the up and down direction, and both end portions facing in the right and left direction are arranged to be in contact with an inner surface of the bezel member 6020. Accordingly, the placing portion 6041 forms an accommodation space K6000 that accommodates the light guide member 6030 between the placing portion 6041 and the front bezel portion 6021. The accommodation space K6000 opens toward the gap S6000. In the accommodation space K6000, the light guide member 6030 is arranged such that the light incident surface 6030a faces the gap S6000 through the opening of the accommodation space K6000.

The pair of leg portions 6042 is a member that connects the placing portion 6041 and the housing 6013 of the image projector 6010, and respectively run forward and upward from both ends in the right and left direction, of a front surface of the peripheral wall portion 6013c of the housing 6013 (FIG. 51). Base ends of the leg portions 6042 are integrally fixed to the housing 6013, and fixing portions 6041b provided in a lower surface of the placing portion 6041 are fixed to tip ends of the leg portions 6042.

The lighting window member 6050 is formed of a material having a high degree of transparency such as glass, acrylic, or a synthetic resin like polycarbonate. The lighting window member 6050 is provided to seal the opening of the accommodation space K6000, and to take the light through the gap S6000 into the accommodation space K6000.

The transparent cover 6060 is formed in a thin plate shape, using a material having a high degree of transparency such as glass, acrylic, or a synthetic resin like polycarbonate, and blocks the opening 6020a of the bezel member 6020. The transparent cover 6060 is arranged to go gradually upward as going from the front side to the rear side of the vehicle V6000 (FIG. 50). Accordingly, direct proceeding of the light illuminated on the transparent cover 6060 to the eye point of the passenger can be suppressed.

Here, in the present embodiment, the bezel member 6020 and the transparent cover 6060 are integrally provided. Then, the bezel member 6020 and the transparent cover 6060 are integrally formed by two-color molding in which two types of resins are poured into one mold and molding is performed, by welding in which joints of two members molded with different resins are melted by heating or the like, and are integrated, or by gluing. Which of the three types of techniques is used is not identified here. However, any of the techniques can be employed for the integral formation of the bezel member 6020 and the transparent cover 6060.

In the present embodiment, assembly to the facing wall A6000 in the instrument panel I6000 of the vehicle display device 6001, the facing wall A6000 facing the windshield F6000, is performed as illustrated in FIG. 52. That is, an opening I6000a for allowing the bezel member 6020 to be fit in is formed in the facing wall A6000 of the instrument panel I6000, and first, the bezel member 6020 integrally provided with the transparent cover 6060 is fit into the opening I6000*a* from above, as illustrated by the arrow D6001.

Then, a structure of the light guide member 6030, the support member 6040, the lighting window member 6050, and the image projector 6010 is assembled to the facing wall A6000 of after the bezel member 6020 is fit, from below as illustrated by the arrow D6002. Here, in the present embodiment, a buffer material 6014 is provided in the entire edge of the projection slot 6013*d* (FIG. 51) in the image projector 6010. Then, assembly of the structure to the facing wall A6000 is performed such that the buffer material 6014 is pressed against the edge of the opening 6020*a* of the bezel member 6020, and the opening 6020*a* of the bezel member 6020 and the projection slot 6013*d* of the image projector 6010 are layered in the up and down direction. By the pressing through the buffer material 6014, the projection slot 6013*d* of the image projector 6010 is blocked and sealed by the bezel member 6020 with the opening 20 blocked with the transparent cover 6060.

Next, an example of a function of the vehicle display device 6001 of the present embodiment will be described with reference to FIG. 53.

Figure 53:
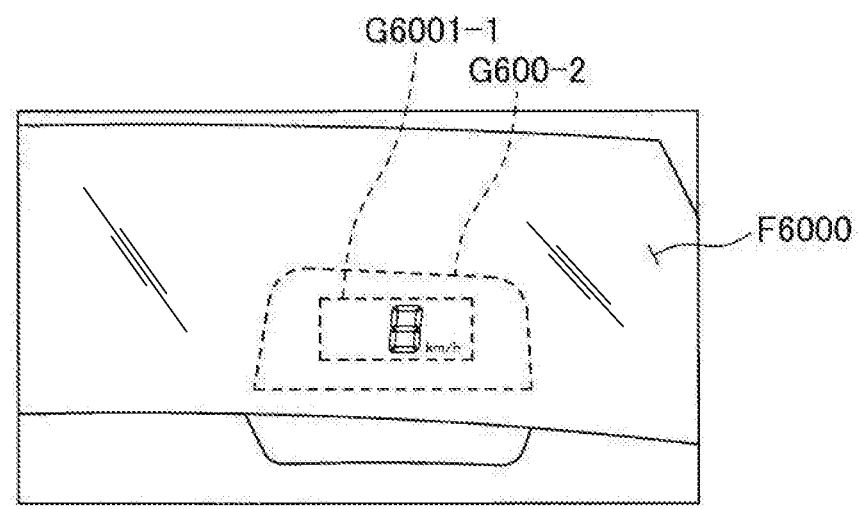
FIG. 53 is a schematic view illustrating a projected image projected on a windshield by the vehicle display device of FIG. 48.

FIG. 53 schematically illustrates a projected image projected on the windshield F6000 by the vehicle display device 6001 of the present embodiment. In this vehicle display device 6001, the bezel member 6020 and the transparent cover 6060 are integrally provided, and no gap is caused therebetween. Therefore, the edge of the opening 6020*a* of the bezel member 6020 does not make a shadow on the transparent cover 6060, and occurrence of a position darker than the periphery, which may cause the above-described streak dark glare, can be suppressed. As a result, the streak dark glare can be suppressed in the periphery of the projected image G6001-1. A glare image G6001-2 such as a boundary line between the bezel member 6020 and the instrument panel I6000, in which the difference in brightness is reduced by emission of the light guide member 6030, does not exist or is merely reflected in a pale and unnoticeable manner, in the periphery of the projected image G6001-1.

As described above, according to the vehicle display device 6001 of the present embodiment, the annoyance to the passenger by the streak dark glare is suppressed. That is, according to the vehicle display device 6001, the image projection can be performed while suppressing the annoyance felt by the passenger.

Further, according to the vehicle display device 6001 of the present embodiment, the bezel member 6020 and the transparent cover 6060 are integrally formed by two-color molding, or are integrally attached by welding or gluing. Therefore, the integrity between the bezel member 6020 and the transparent cover 6060 is enhanced, and the appearance can be improved.

Next, a second embodiment of the present invention will be described. Note that the second embodiment is an embodiment of an instrument panel, and is equivalent to the first embodiment except for a point in which the instrument panel also plays a role of the bezel member 6020 described above. Therefore, hereinafter, in the second embodiment, description will be given with reference to FIG. 54, focusing on the different point from the first embodiment.

Figure 54:
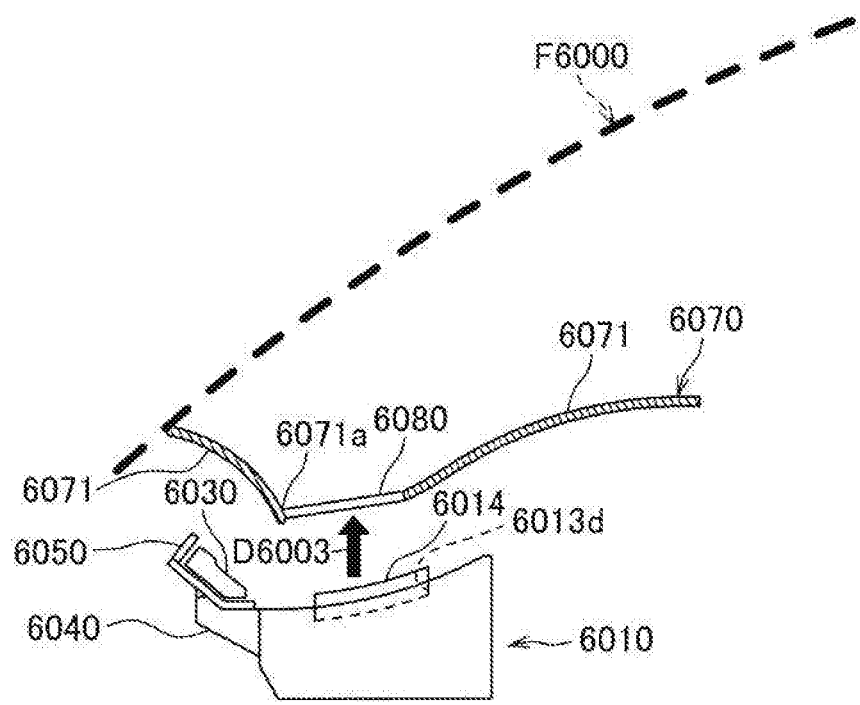
FIG. 54 is a schematic view illustrating an instrument panel according to a second embodiment of the present invention.

FIG. 54 schematically illustrates an instrument panel according to the second embodiment of the present invention. Note that, in FIG. 54, configuration elements equivalent to the configuration elements according to the first embodiment illustrated in FIG. 53 are denoted with the same reference signs as those in FIG. 53, and hereinafter, overlapping description about the equivalent configuration elements is omitted.

As described above, an instrument panel 6070 of the present embodiment also functions as the bezel member 6020 in the first embodiment, and an opening 6071*a* for projecting an image on a windshield F6000 by an image projector 6010 is provided in a facing wall 6071 facing the windshield F6000. Then, a transparent cover 6080 that blocks the opening is integrally provided in the facing wall 6071 of the instrument panel 6070. The facing wall 6071 and the transparent cover 6080 are integrally formed by two-color molding, or are integrally attached by welding or gluing, described above. Although not identified, any of the techniques can be employed for the integral formation of the facing wall 6071 and the transparent cover 6080.

In the present embodiment, a structure of a light guide member 6030, a support member 6040, a lighting window member 6050, and an image projector 6010 is assembled to the facing wall 6071 of the instrument panel 6070 from below, as illustrated by the arrow D6003. This assembly is performed such that a buffer material 6014 is pressed against an edge of the opening 6071*a* of the facing wall 6071, and the opening 6071*a* and a projection slot 6013*d* of the image projector 6010 are layered in an up and down direction. By the pressing through the buffer material 6014, the projection slot 6013*d* of the image projector 6010 is blocked and sealed by the instrument panel 6070 with the opening 6071*a* blocked with the transparent cover 6080.

Next, an example of a function of the instrument panel 6070 of the present embodiment will be described with reference to FIG. 54.

Figure 55:
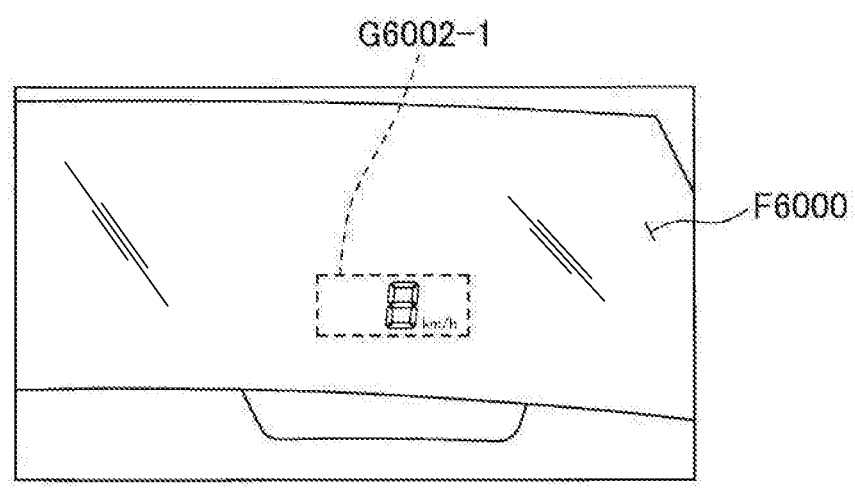
FIG. 55 is a schematic view illustrating a projected image projected on a windshield through an opening of the instrument panel of FIG. 54.

FIG. 55 schematically illustrates a projected image projected on the windshield F6000 through the opening 6071*a* of the instrument panel 6070 of the present embodiment. In this instrument panel 6070, the facing wall 6071 and the transparent cover 6080 are integrally provided, and no gap is caused therebetween. Therefore, the edge of the opening 6071*a* of the facing wall 6071 does not make a shadow on the transparent cover 6080, and occurrence of a position darker than a periphery, such as the above-described streak dark glare, is suppressed. As a result, the streak dark glare is suppressed in the periphery of the projected image G6002-1. Further, the instrument panel 6070 also functions as the bezel member 6020 in the first embodiment. Therefore, there is no glare of the boundary line between the bezel member 6020 and the instrument panel 6070, and the visibility of the projected image G6002-1 is further improved.

As described above, according to the instrument panel 6070 of the present embodiment, the annoyance to the passenger with the streak dark glare is suppressed, and the image projection can be performed while suppressing the annoyance felt by the passenger.

Further, according to the present embodiment, the facing wall 6071 of the instrument panel 6070 and the transparent cover 6060 are integrally formed by two-color molding, or are integrally attached by welding or gluing. Therefore, the integrity between the facing wall 6071 and the transparent cover 6060 is enhanced, and the appearance can be improved.

The favorable embodiment has been described regarding the present invention. However, the bezel member, the bezel body, and the vehicle display device of the present invention are not limited to the configurations of the embodiment.

The above-describe embodiment has the configuration in which the light guide member 6030 is supported by the support member 6040 integrally formed with the image projector 6010, and the light guide member 6030 is assembled to the instrument panel and the bezel member, together with the image projector 6010. However, an embodiment is not limited thereto. For example, a member that supports the light guide member 6030 may be provided in an instrument panel or a bezel member, and the image projector 6010 may be assembled to the instrument panel or the bezel member assembled with the light guide member 6030.

Note that the above-described embodiments merely describe representative forms of the present invention, and the present invention is not limited to the embodiments. That is, various modifications can be implemented without departing from the gist of the present invention. Configurations by the modifications are obviously included in the scope of the present invention as long as the configurations are furnished with the configurations of the bezel member, the bezel body, and the vehicle display device of the present invention.

Image projection is performed while suppressing annoyance felt by a passenger. A bezel body (6015) has a bezel member (6020) fit in a facing wall (A6000) in an instrument panel (I6000) of a vehicle (V6000), the facing wall (A6000) facing a windshield (F6000), and forming a peripheral edge of an opening (6020a) for projecting an image on the windshield (F6000) by an image projector (6010) arranged in the instrument panel (I6000). A transparent cover (6060) that blocks the opening (6020a) is integrally provided in the bezel member (6020).

Seventh Invention

Next, a seventh invention will be described.

The seventh invention is an image projector, a vehicle display device, and an assembling method having the following characteristics.

(1)

An image projector that projects an image on a windshield through an opening provided in a facing wall in an instrument panel of a vehicle, the facing wall facing the windshield, and blocked with a transparent cover, or an opening provided in a bezel member fit in the facing wall and blocked with a transparent cover, the image projector including:

a box-shaped case in which a projection slot arranged to be layered on the opening is formed; and a pre-assembling protective sheet arranged in the case to block the projection slot from an inside, wherein a pull-out slot, into which a part of the pre-assembling protective sheet is extended, is formed in the case, and the pre-assembling protective sheet is provided able to be pulled out through the pull-out slot by pulling the extended part extended through the pull-out slot.

(2)

The image projector according to (1), wherein the pull-out slot is provided with a dustproof member that suppresses intrusion of a foreign substance through the pull-out slot after the pre-assembling protective sheet is pulled out.

(3)

The image projector according to (2), wherein the pull-out slot is formed in a slit shape extending in a width direction of the pre-assembling protective sheet, and the dustproof member is made of a brush implanted in the pull-out slot to sandwich the pre-assembling protective sheet in a thickness direction throughout the entire width direction.

(4)

The image projector according to (2), wherein the pull-out slot is formed in a slit shape extending in a width direction of the pre-assembling protective sheet, and the dustproof member is made of a pair of protrusion lips provided to protrude and mutually face the pull-out slot to sandwich the pre-assembling protective sheet in a thickness direction throughout the entire width direction, and having flexibility.

(5)

The image projector according to (2), wherein the pull-out slot is open toward a horizontal direction, and the dustproof member is made of a dustproof sheet formed of a flexible sheet material, having one end edge fixed to an upper edge or a vicinity of the upper edge of the pull-out slot and the other end edge be a free end, and having a length from the one end edge to the other end edge be longer than at least a width of the pull-out slot in an up and down direction.

(6)

A vehicle display device including:

an image projector arranged in an instrument panel of a vehicle, wherein the image projector is the image projector according to any one of (1) to (5).

(7)

An assembling method of assembling an image projector into a bezel member, the image projector being adapted to project an image on the windshield through an opening provided in a bezel member fit in a facing wall in an instrument panel of a vehicle, the facing wall facing a windshield, and blocked with a transparent cover, the image projector being the image projector according to any one of (1) to (5), and the assembling method including:

an arrangement process of arranging the image projector in the instrument panel such that the projection slot is blocked with the bezel member with the opening blocked with the transparent cover, and the projection slot is layered on the opening; and a pull-out process of pulling out the pre-assembling protective sheet through the pull-out slot by pulling the extended portion after the arrangement process.

(8)

An assembling method of assembling an image projector into an instrument panel, the image projector being adapted to project an image on the windshield through an opening provided in a facing wall in the instrument panel of a vehicle, the facing wall facing a windshield, and blocked with a transparent cover, the image projector being the image projector according to any one of (1) to (5), and the assembling method including:

an arrangement process of arranging the image projector in the instrument panel such that the projection slot is blocked with the instrument panel with the opening blocked with the transparent cover, and the projection slot is layered on the opening; and a pull-out process of pulling out the pre-assembling protective sheet through the pull-out slot by pulling the extended portion after the arrangement process.

Hereinafter, the seventh invention will be described in detail.

TECHNICAL FIELD

The present invention relates to an image projector that performs projection of a windshield of a vehicle, a vehicle display device including an image projector, and a method of assembling an image projector.

BACKGROUND ART

Figure 72:
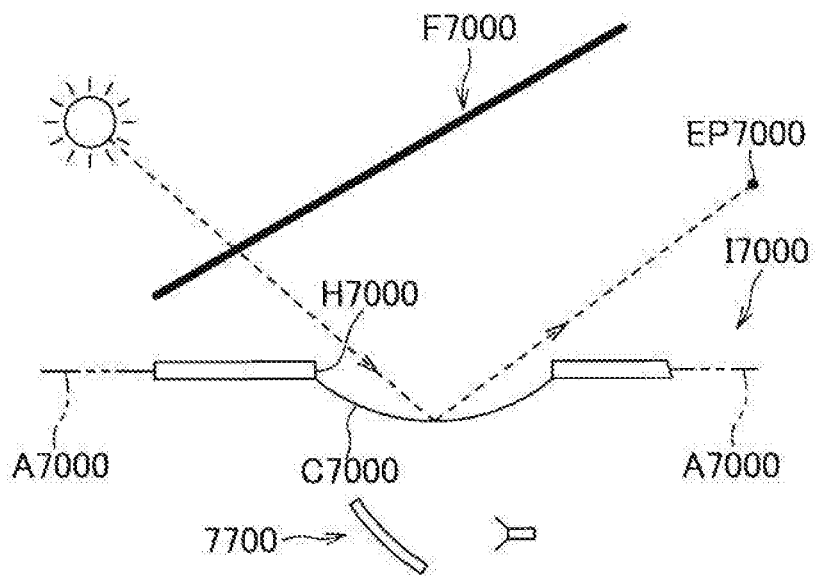
FIG. 72 is a sectional view schematically illustrating a conventional vehicle display device.

Conventionally, a vehicle display device as a head-up display device that projects an image on a windshield of a vehicle is provided in an instrument panel (for example, see Patent Literature 71). A vehicle display device 7700 described in Patent Literature 71 is attached in an instrument panel I7000 provided with an opening H7000 in a facing wall A7000 facing a windshield F7000, as illustrated in FIG. 72, and projects an image on the windshield F7000 through the opening H7000. Then, the vehicle display device 7700 is provided with a projection slot for image to be layered with the opening H7000, in a case (not illustrated). In such a vehicle display device 7700, a transparent cover C7000 that blocks the projection slot to prevent dust, water, and the like from entering the case through the projection slot for image is provided. However, light from outside such as sunlight may be reflected on the cover C7000 and directly proceed to an eye point EP7000 of a passenger, and may provide a feeling of unpleasantness.

Figure 73:
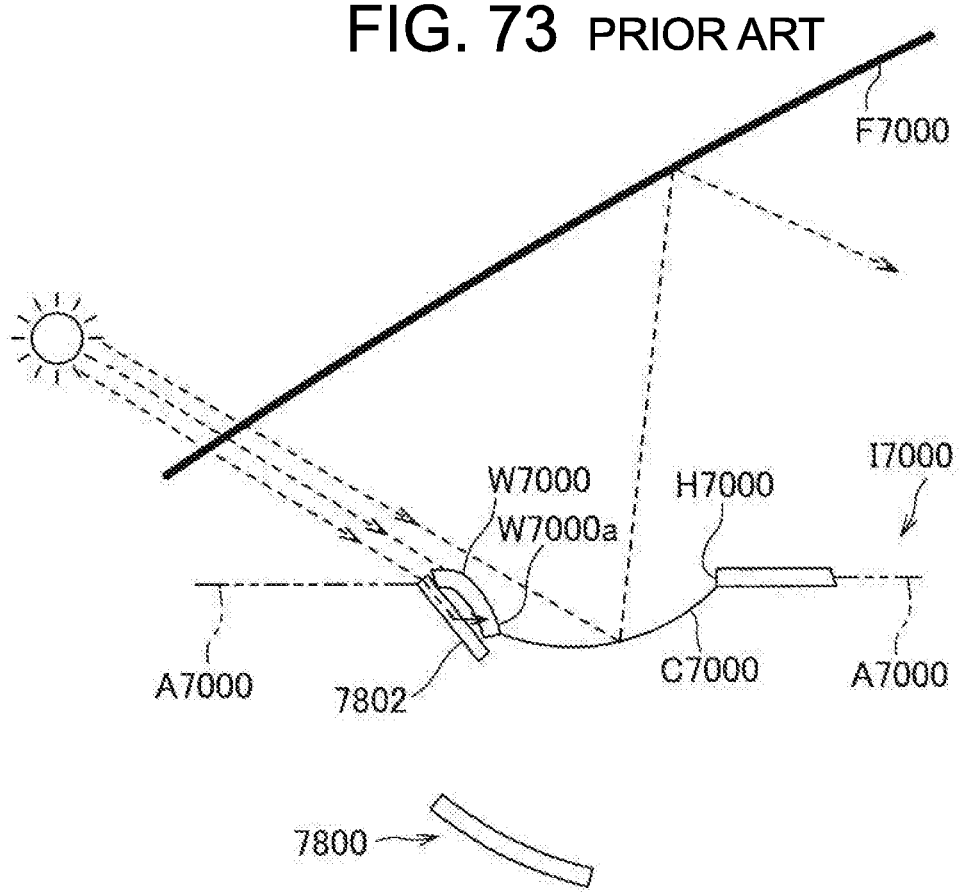
FIG. 73 is a sectional view schematically illustrating another conventional vehicle display device.

Therefore, as a configuration to avoid proceeding of the light from outside to the eye point EP7000 of the passenger, a vehicle display device 7800 illustrated in FIG. 73 can be considered. The vehicle display device 7800 is provided in the instrument panel I7000. The instrument panel I7000 is provided with a descent wall portion W7000 gradually going downward as going from a front side to a rear side of a vehicle (from the left to the right in FIG. 73), and the opening H7000 adjacent to a lower end of the descent wall portion W7000, in the facing wall A7000 facing the windshield F7000. The projection slot of the vehicle display device 7700 is provided to be layered with the opening H7000. Then, the cover C7000 gradually going upward as going from the front side to the rear side of the vehicle is provided on the projection slot, and the vehicle display device 7800 projects an image on the windshield F7000 through the projection slot and the opening H7000. In such a configuration, the descent wall portion W7000 is provided, and the vehicle front side of the cover C7000 is positioned lower than the rear side. Therefore, the light from outside can be caused to less easily reach the cover C7000, and direct proceeding of the light from outside reflected on the cover C7000 to the eye point EP7000 of the passenger can be suppressed.

CITATION LIST

Patent Literature

Patent Literature 71: JP 2007-148092 A

SUMMARY OF INVENTION

Technical Problem

In the above-described configuration, because the light from outside does not illuminate a position W7000a near the opening H7000 of the descent wall portion W7000 in the instrument panel I7000, the position W7000a becomes dark, and a difference in brightness between the position W7000a and the cover C7000 becomes large. Accordingly, glare to the windshield F7000 may become noticeable. Therefore, a configuration to configure the descent wall portion W7000 from an optically transparent material, to arrange a plate light guide member 7802 to face an inner surface of the descent wall portion W7000, to guide the light from outside to the position W7000a near the opening H7000 of the descent wall portion W7000 by the light guide member 7802, and to illuminate the descent wall portion W7000 from the inner surface side can be considered. According to this configuration, the descent wall portion W7000 is made bright so that the difference in brightness becomes small. Therefore, the glare to the windshield F7000 can be made unnoticeable, and the feeling of unpleasantness provided to the passenger can be suppressed.

By the way, attaching the cover C7000 to the opening H7000 at the instrument panel I7000 side, instead of to the projection slot of the vehicle display device 7800, and achieving improvement of the appearance of the instrument panel I7000 side can be considered. In this case, the projection slot of the vehicle display device 7800 is also arranged to be layered with the opening H7000 blocked with the cover C7000. Therefore, even if the cover C7000 is not provided on the projection slot, when the projection slot is assembled to the instrument panel I7000, the dust-proofness of the vehicle display device 7800 is secured. Considering transparency of projection light of an image, it is more favorable that the projection slot of the vehicle display device 7800 is not provided with the cover or the like. Meanwhile, if the projection slot is not blocked in pre-assembling, the dust-proofness of the vehicle display device 7800 cannot be obtained.

Therefore, an objective of the present invention is to provide an image projector that secures dust-proofness in pre-assembling, a vehicle display device having the image projector, and a method of assembling the image projector.

Solution to Problem

To solve the above objective, the invention according to (1) is an image projector that projects an image on a windshield through an opening provided in a facing wall in an instrument panel of a vehicle, the facing wall facing the windshield, and blocked with a transparent cover, or an opening provided in a bezel member fit in the facing wall and blocked with a transparent cover, the image projector including: a box-shaped case in which a projection slot arranged to be layered on the opening is formed; and a pre-assembling protective sheet arranged in the case to block the projection slot from an inside, wherein a pull-out slot, into which a part of the pre-assembling protective sheet is extended, is formed in the case, and the pre-assembling protective sheet is provided able to be pulled out through the pull-out slot by pulling the extended part extended through the pull-out slot.

The invention described in (2) is that, in the invention according to (1), the pull-out slot is provided with a dust-proof member that suppresses intrusion of a foreign substance through the pull-out slot after the pre-assembling protective sheet is pulled out.

The invention described in (3) is that, in the invention according to (2), the pull-out slot is formed in a slit shape extending in a width direction of the pre-assembling protective sheet, and the dustproof member is made of a brush implanted in the pull-out slot to sandwich the pre-assembling protective sheet in a thickness direction throughout the entire width direction.

The invention described in (4) is that, in the invention according to (2), the pull-out slot is formed in a slit shape extending in a width direction of the pre-assembling protective sheet, and the dustproof member is made of a pair of protrusion lips provided to protrude and mutually face the pull-out slot to sandwich the pre-assembling protective sheet in a thickness direction throughout the entire width direction, and having flexibility.

The invention described in (5) is that, in the invention according to (2), the pull-out slot is open toward a horizontal direction, and the dustproof member is made of a dustproof sheet formed of a flexible sheet material, having one end edge fixed to an upper edge or a vicinity of the upper edge of the pull-out slot and the other end edge be a free end.

To solve the above objective, the invention according to (6) is a vehicle display device including: an image projector arranged in an instrument panel of a vehicle, wherein the image projector is the image projector according to any one of (1) to (5).

To solve the above objective, the invention according to (7) is an assembling method of assembling an image projector into a bezel member, the image projector being adapted to project an image on the windshield through an opening provided in a bezel member fit in a facing wall in an instrument panel of a vehicle, the facing wall facing a windshield, and blocked with a transparent cover, the image projector being the image projector according to any one of (1) to (5), and the assembling method including: an arrangement process of arranging the image projector in the instrument panel such that the projection slot is blocked with the bezel member with the opening blocked with the transparent cover, and the projection slot is layered on the opening; and a pull-out process of pulling out the pre-assembling protective sheet through the pull-out slot by pulling the extended portion after the arrangement process.

To solve the above objective, the invention according to (8) is an assembling method of assembling an image projector into an instrument panel, the image projector being adapted to project an image on the windshield through an opening provided in a facing wall in the instrument panel of a vehicle, the facing wall facing a windshield, and blocked with a transparent cover, the image projector being the image projector according to any one of (1) to (5), and the assembling method including: an arrangement process of arranging the image projector in the instrument panel such that the projection slot is blocked with the instrument panel with the opening blocked with the transparent cover, and the projection slot is layered on the opening; and a pull-out process of pulling out the pre-assembling protective sheet through the pull-out slot by pulling the extended portion after the arrangement process.

Advantageous Effects of Invention

According to the invention described in (1), and (6) to (8), the pre-assembling protective sheet that blocks the projection slot for image from an inside is built in. Therefore, dust-proofness of the image projector can be secured in pre-assembling. Further, the pre-assembling protective sheet can be pulled out through the pull-out slot by pulling out the extended portion thereof. Therefore, transparency of projection light in the pre-assembling is not decreased by pulling out the pre-assembling protective sheet after assembly. Accordingly, the dust-proofness of the image projector can be secured in the pre-assembling.

According to the invention described in (2), the dustproof member that suppresses intrusion of a foreign substance through the pull-out slot after the pre-assembling protective sheet is pulled out is provided in the pull-out slot. Therefore, the dust-proofness can be secured in this pull-out slot.

According to the invention described in (3), the slit-shaped pull-out slot is blocked with the brush and the dust-proofness is secured after the pre-assembling protective sheet is pulled out. Further, the brush has flexibility, and thus the pull-out of the pre-assembling protective sheet is not hindered. That is, with this brush, both of a pull-out property and the dust-proofness of the pre-assembling protective sheet can be achieved.

According to the invention described in (4), the slit-shaped pull-out slot is blocked with the protrusion lip and the dust-proofness is secured after the pre-assembling protective sheet is pulled out. Further, the protrusion lip has flexibility, and thus the pull-out of the pre-assembling protective sheet is not hindered. That is, with the protrusion lip, both of the pull-out property and the dust-proofness of the pre-assembling protective sheet can be achieved.

According to the invention described in (5), the pull-out slot is blocked as the free end of the dustproof sheet hangs and the dust-proofness is secured after the pre-assembling protective sheet is pulled out. Further, the dust-proof sheet formed of a flexible sheet material with one end edge being the free end has flexibility, and thus the pull-out of the pre-assembling protective sheet is not hindered. That is, with the dustproof sheet, both is the pull-out property and the dust-proofness of the pre-assembling protective sheet can be achieved.

Description of Embodiments

An image projector, a vehicle display device, and a method of assembling an image projector according to a first embodiment of the present invention will be described with reference to FIGS. 59 to 69A and 69B.

Figure 59:
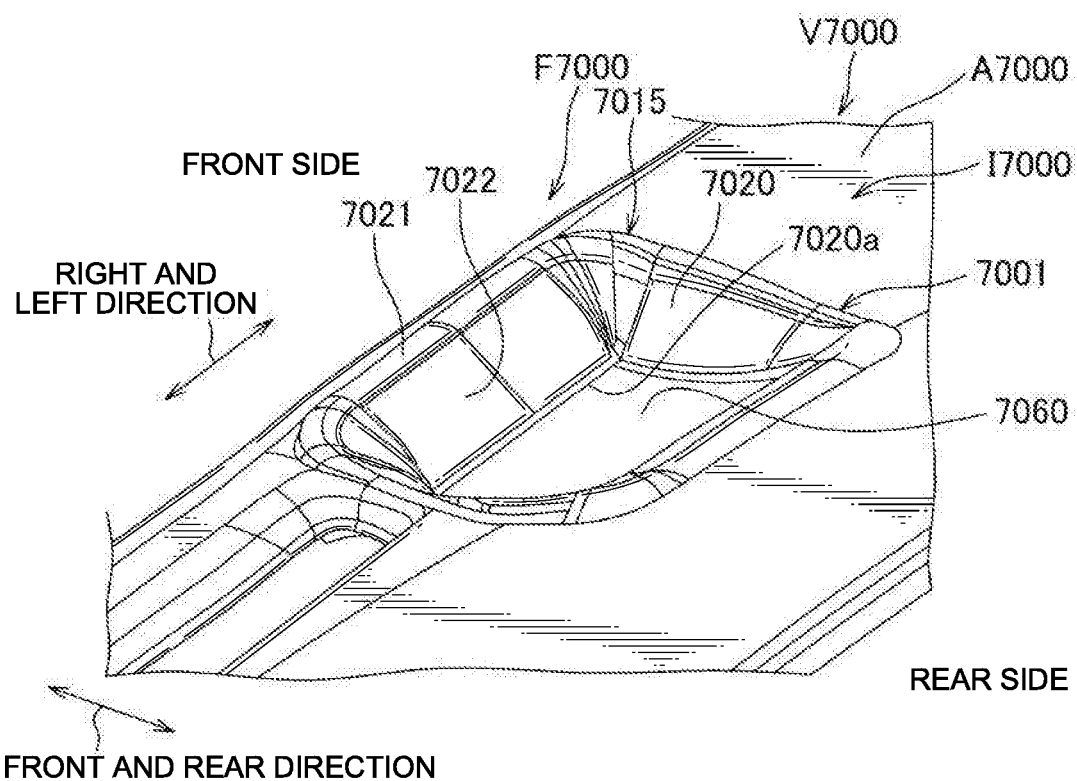
FIG. 59 is a perspective view illustrating a state in which a vehicle display device according to a first embodiment of the present invention is assembled in an instrument panel.
Figure 60:
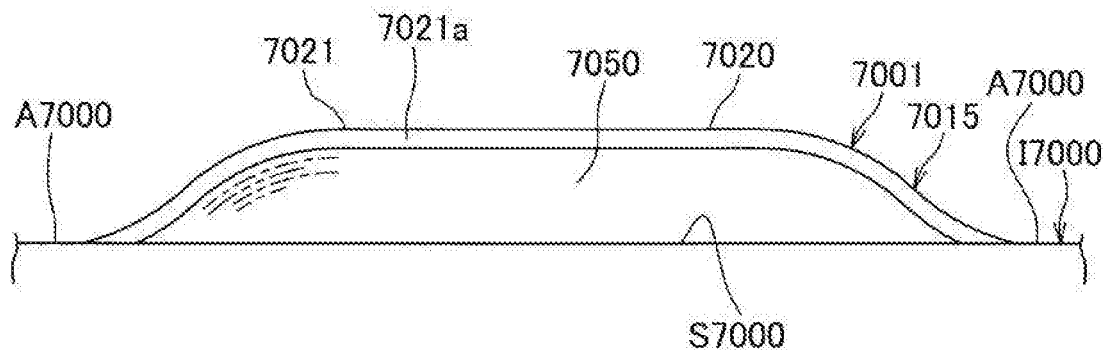
FIG. 60 is a diagram of the vehicle display device of FIG. 59 viewed from a front direction of a vehicle.
Figure 61:
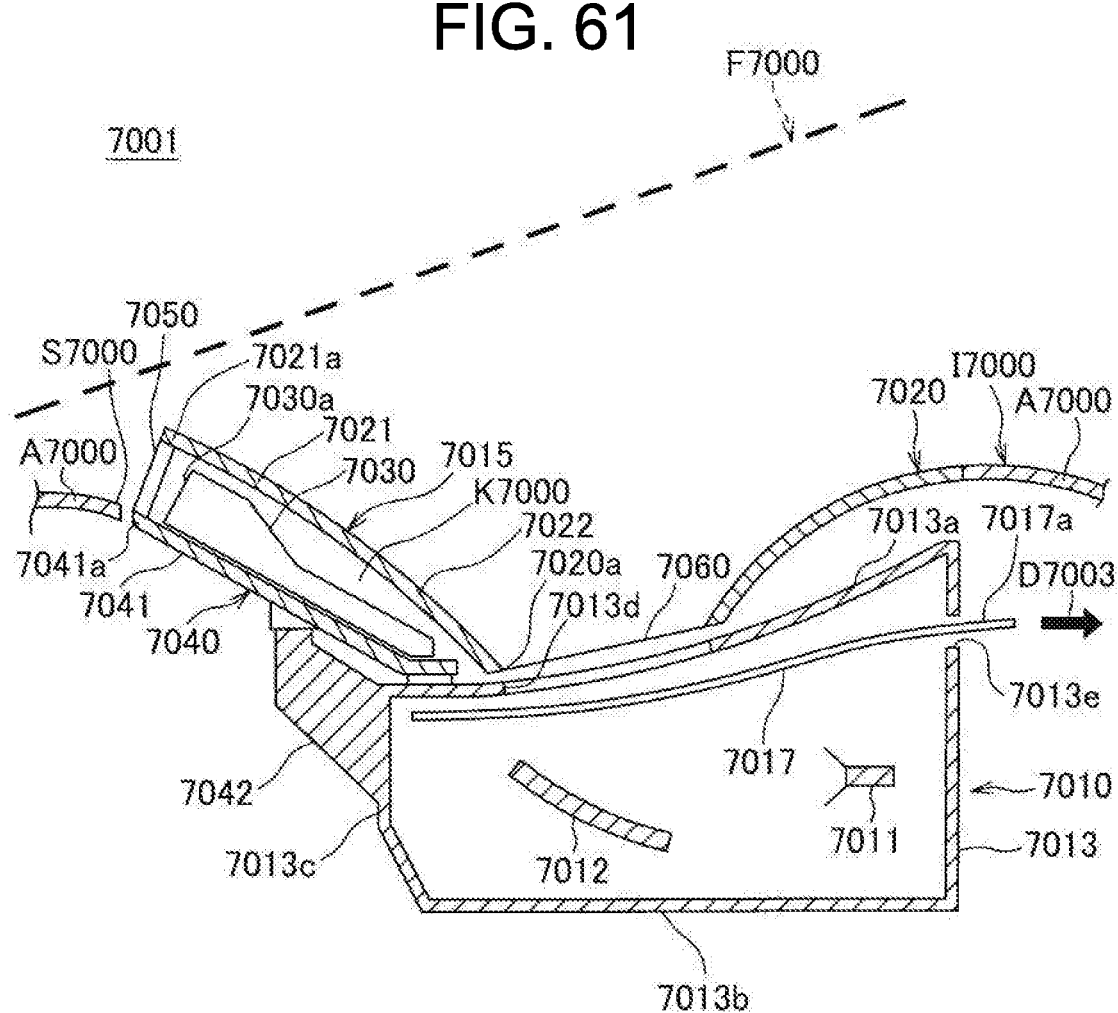
FIG. 61 is a sectional view of the vehicle display device of FIG. 59.
Figure 62:
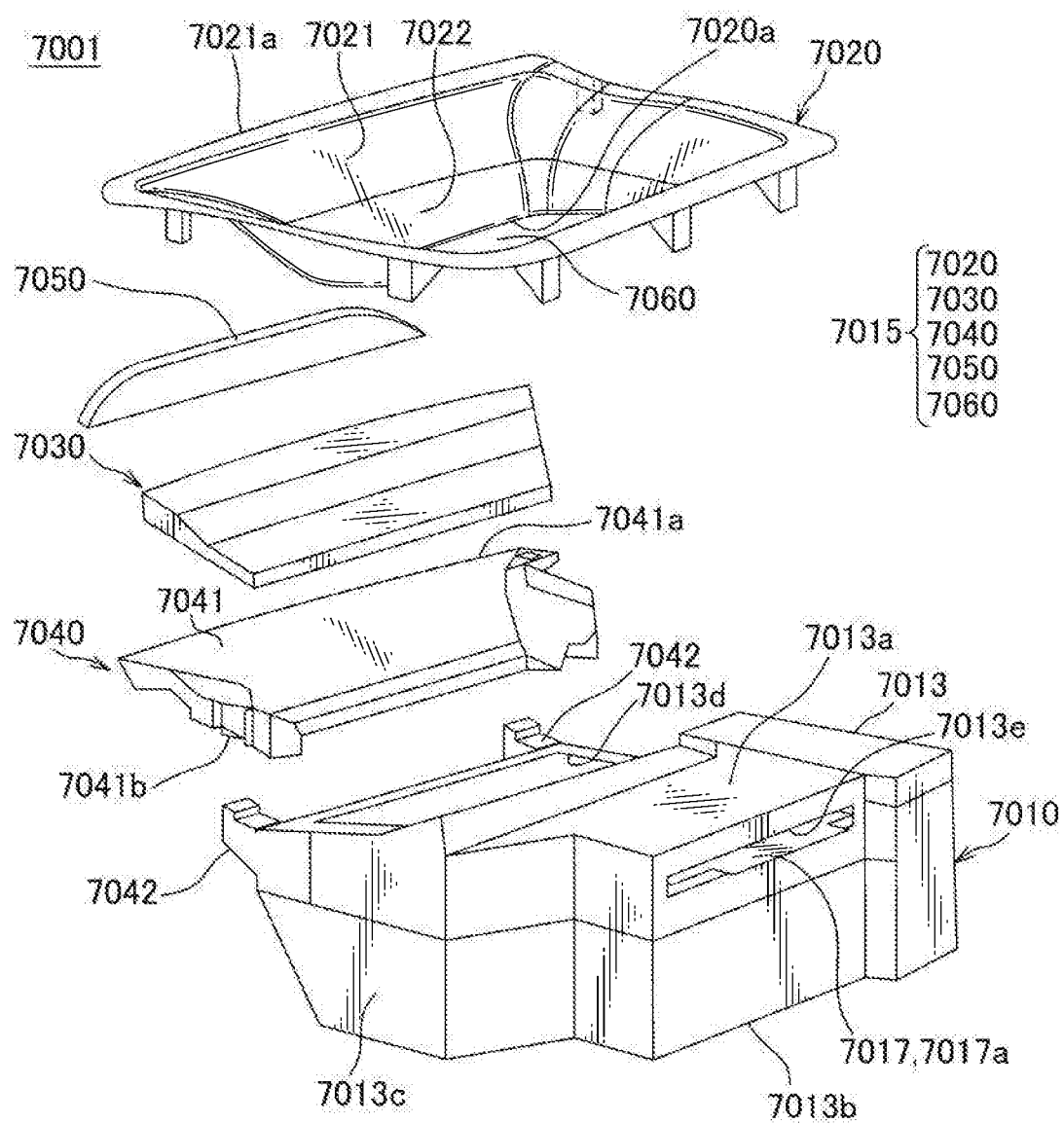
FIG. 62 is an exploded perspective view of the vehicle display device of FIG. 59.
Figure 63:
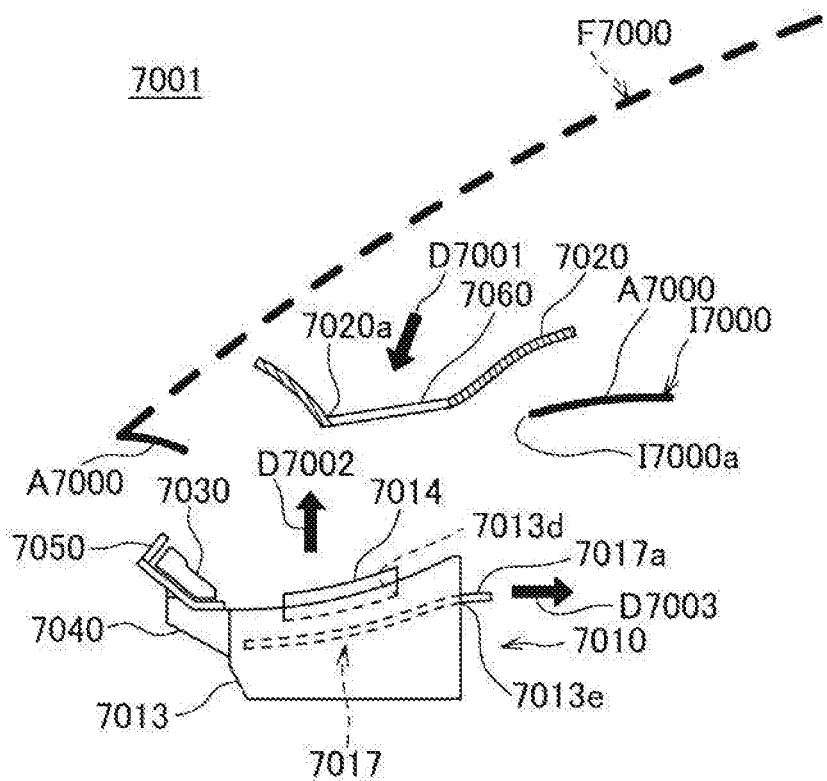
FIG. 63 is a diagram for describing assembly to a facing wall in the instrument panel of the vehicle display device of FIG. 59, the facing wall facing a windshield.
Figure 64:
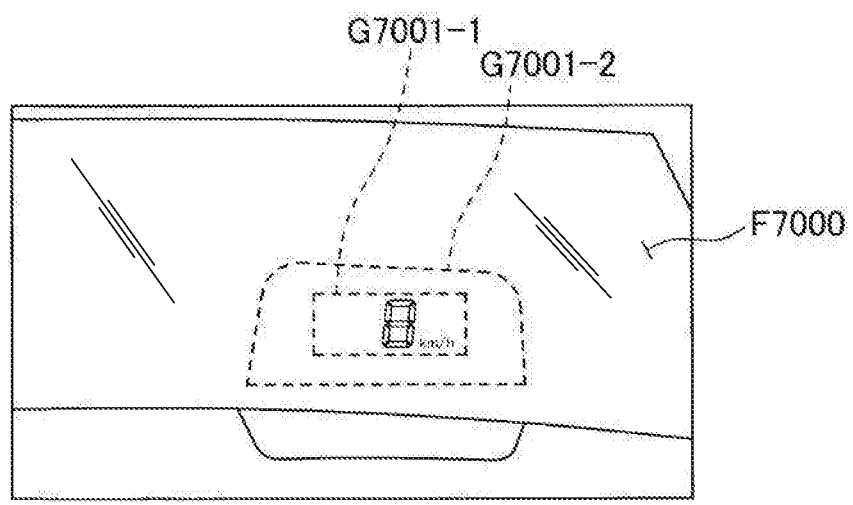
FIG. 64 is a diagram illustrating an image projected on a windshield by the vehicle display device of FIG. 59.
Figure 65:
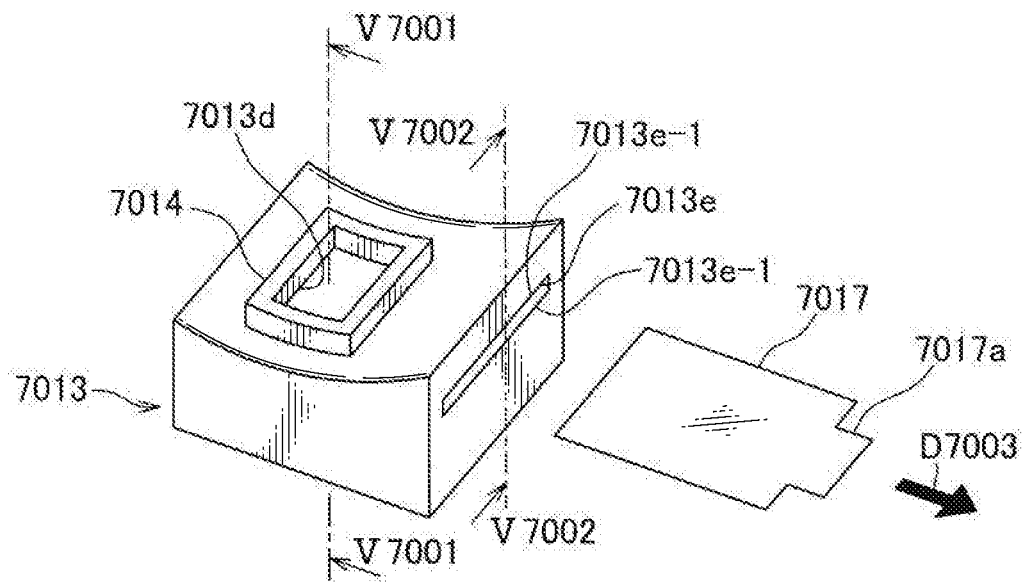
FIG. 65 is a diagram illustrating a pull-out slot of a pre-assembling protective sheet in the vehicle display device of FIG. 59.
Figure 66:
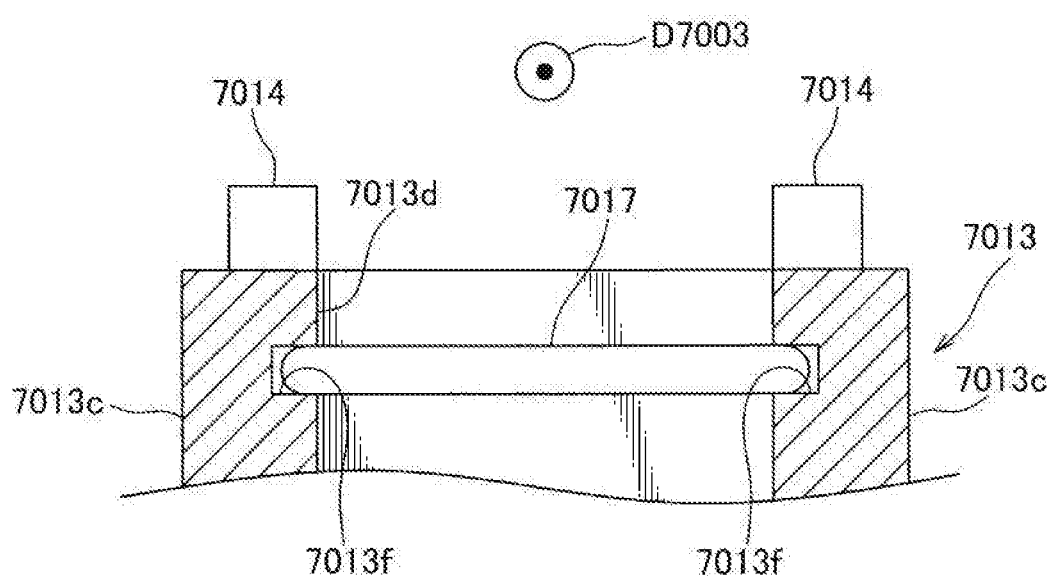
FIG. 66 is a diagram illustrating a holding structure of the pre-assembling protective sheet in the vehicle display device of FIG. 59.
Figure 67A:
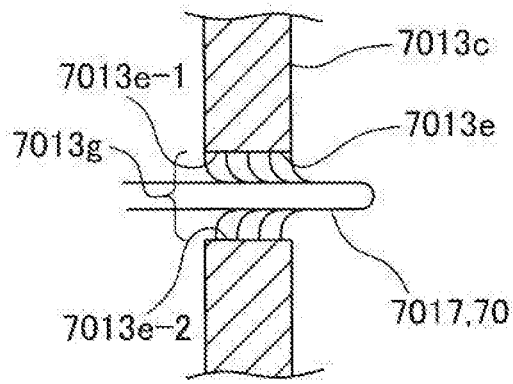
FIGS. 67A and 67B are diagrams illustrating examples of a dustproof member that blocks the pull-out slot of the pre-assembling protective sheet in the vehicle display device of FIG. 59.
Figure 67B:
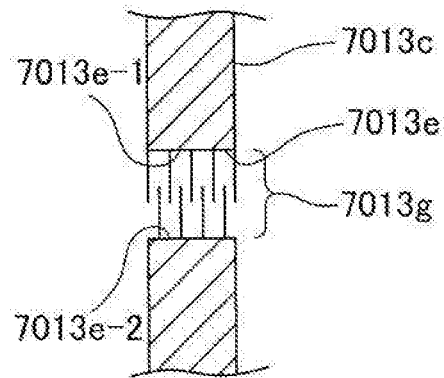
Figure 68A:
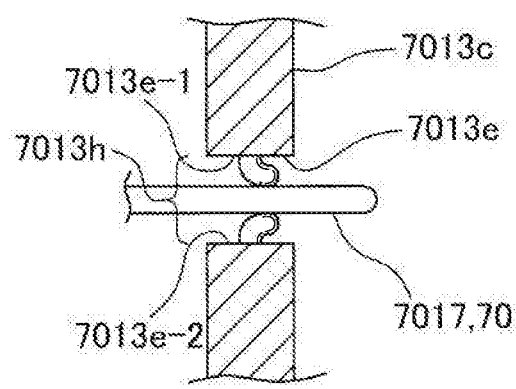
FIGS. 68A and 68B are diagrams illustrating other examples of the dustproof member that blocks the pull-out slot of the pre-assembling protective sheet in the vehicle display device of FIG. 59.
Figure 68B:
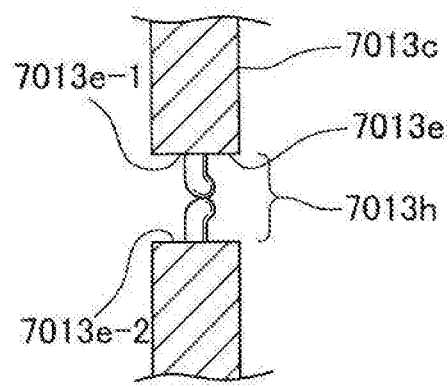
Figure 69A:
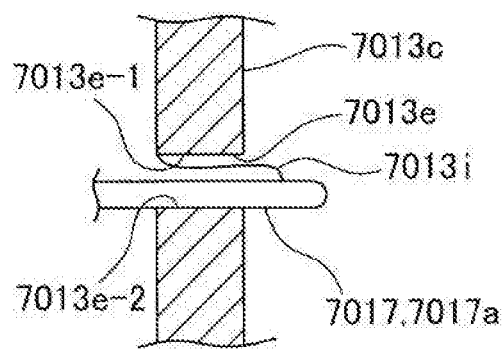
FIGS. 69A and 69B are diagrams illustrating still other examples of the dustproof member that blocks the pull-out slot of the pre-assembling protective sheet in the vehicle display device of FIG. 59.
Figure 69B:
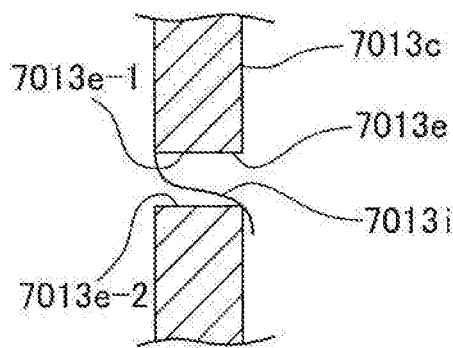

FIG. 59 is a perspective view illustrating a state in which a vehicle display device according to the first embodiment of the present invention is assembled in an instrument panel. FIG. 60 is a diagram of the vehicle display device of FIG. 59 viewed from a front direction of a vehicle. FIG. 61 is a sectional view of the vehicle display device of FIG. 59. FIG. 62 is an exploded perspective view of the vehicle display device of FIG. 59. FIG. 63 is a diagram for describing assembly to a facing wall in the instrument panel of the vehicle display device of FIG. 59, the facing wall facing a windshield. FIG. 64 is a diagram illustrating an image projected on the windshield by the vehicle display device of FIG. 59. FIG. 65 is a diagram illustrating a pull-out slot of a pre-assembling protective sheet in the vehicle display device of FIG. 59. FIG. 66 is a diagram illustrating a holding structure of the pre-assembling protective sheet in the vehicle display device of FIG. 59. FIGS. 67A and 67B are diagrams illustrating an example of a dustproof member that blocks the pull-out slot of the pre-assembling protective sheet in the vehicle display device of FIG. 59. FIGS. 68A and 68B are diagrams illustrating other examples of the dustproof member that blocks the pull-out slot of the pre-assembling protective sheet in the vehicle display device of FIG. 59. FIGS. 69A and 69B are diagrams illustrating still other examples of the dustproof member that blocks the pull-out slot of the pre-assembling protective sheet in the vehicle display device of FIG. 59. In the description below, "front, rear, up, down, right, and left" correspond to "front, rear, up, down, right, and left" of a vehicle V7000.

A vehicle display device 7001 of the present embodiment is used as a head-up display device attached to an instrument panel I7000 of the vehicle V7000, as illustrated in FIGS. 59 and 60, and which projects an image on a windshield F7000.

As illustrated in FIGS. 61 and 62, the vehicle display device 7001 includes an image projector 7010 and a bezel body 7015.

The image projector 7010 includes a display source 7011 for projecting an image, a reflection portion 7012 that reflects the image from the display source 7011, and a housing 7013 as a case made of a synthetic resin, which accommodates the display source 7011 and the reflection portion 7012. The housing 7013 includes an upper wall portion 7013a, a lower wall portion 7013b arranged to face the upper wall portion 7013a, and a peripheral wall portion 7013c linked with peripheral edges of the upper wall portion 7013a and the lower wall portion 7013b. The upper wall portion 7013a is provided with a projection slot 7013d arranged to be layered with an opening 7020a of a bezel member 7020 described below. The image projector 7010 reflects the image projected by the display source 7011, on the reflection portion 7012, and projects the image on the windshield F7000 through the projection slot 7013d. Accordingly, a passenger of the vehicle V7000 visually recognizes the image displayed on the windshield F7000.

The bezel body 7015 includes the bezel member 7020, alight guide member 7030, a support member 7040, a lighting window member 7050, and a transparent cover 7060.

The bezel member 7020 is made of a synthetic resin having a semi-transmitting property (optical transparency), and has an annular shape in plan view including the opening 7020a in the center and has a shape gradually going downward as going from an outer peripheral edge to an inner peripheral edge. In other words, the bezel member 7020 is formed into a shape of a hollow and approximately truncated square pyramid, which is flipped upside down, with an upper end surface and a lower end surface open. The bezel member 7020 is arranged to be fit in a hole provided in a facing wall A7000 in the instrument panel I7000, the facing wall A7000 facing the windshield F7000. That is, the bezel member 7020 is fit in the facing wall A7000 and forms all of a peripheral edge of the opening 7020a for projecting the image on the windshield F7000 by the image projector 7010 arranged in the instrument panel I7000.

The bezel member 7020 includes a front bezel portion 7021 arranged at a front side of the vehicle V7000 when fit in the facing wall A7000. An end portion 7021a of the front bezel portion 7021 at the front side of the vehicle V7000 is arranged to rise upward from the facing wall A7000 with a gap S7000 between the end portion 7021a and the facing wall A7000 (arranged above the facing wall A7000). Further, the front bezel portion 7021 includes a descent wall portion 7022 gradually going downward as going from the front side to the rear side of the vehicle V7000 to reach the opening 7020a.

When fit in the facing wall A7000, a part in an outer peripheral edge of the bezel member 7020 at the front side (that is, an end portion 7021a of the front bezel portion 7021 at the front side of the vehicle V7000) is arranged to rise upward from the facing wall A7000 (FIG. 60), and the other part except the part of the outer peripheral edge is arranged to smoothly continue into an outer surface (upper surface) of the bezel member 7020 and an outer surface of the facing wall A7000 (FIG. 59). Further, at this time, the opening 7020a of the bezel member 7020 and the projection slot 7013d of the image projector 7010 are arranged to be layered in the up and down direction. Further, color adjustment to have similar appearance to the facing wall A7000, surface finishing, and the like are performed for the bezel member 7020 so that a difference in glare to the windshield F7000 between the bezel member 7020 and the facing wall A7000 of the instrument panel I7000 is not noticeable.

The light guide member 7030 is formed in an approximately square plate shape in plan view (FIG. 62), using a material having a high degree of transparency such as glass, acrylic, or a synthetic resin like polycarbonate, and is arranged to be layered on an inner surface of the front bezel portion 7021 with a slight gap. The light guide member 7030 is formed such that a front side is formed thick, a rear side is formed thin, and a portion between the portion formed thick and the portion formed thin gradually becomes thinner as going from the front to the rear, in section view in the front and rear direction (FIG. 61). To be specific, a surface facing downward in the light guide member 7030 is formed in a plan manner, and an inclined surface gradually descending as going from the front to the rear is formed in an intermediate portion in the front and rear direction, of a surface facing upward at the descent wall portion 7022 side.

The light guide member 7030 is formed to guide light entering a light incident surface 7030a that is an end surface at the front side of the vehicle V7000 to an end portion at the rear side, and to emit the light from a surface at the descent wall portion 7022 side. That is, the light guide member 7030 guides the light in a light guiding direction going from the end portion at the front side, where the light incident surface 7030a exists, to the opposite end portion at the rear side. Accordingly, the light can be guided toward the descent wall portion 7022 having optical transparency, and can illuminate a position near the opening 7020a in the descent wall portion 7022.

The support member 7040 includes a placing portion 7041 made of a synthetic resin and a pair of leg portions 7042.

The placing portion 7041 is a portion on which the light guide member 7030 is placed, and is formed in an approximately plate shape in plan view that is slightly larger than the shape in plan view of the light guide member 7030. The placing portion 7041 is arranged with a gap from the inner surface of the front bezel portion 7021, and an end portion 7041a at the front side of the vehicle V7000 is arranged side by side with an end portion 7021a of the front bezel portion 7021 with a gap roughly in the up and down direction, and both end portions facing in the right and left direction are arranged to be in contact with an inner surface of the bezel member 7020. Accordingly, the placing portion 7041 forms an accommodation space K7000 that accommodates the light guide member 7030 between the placing portion 7041 and the front bezel portion 7021. The accommodation space K7000 opens toward the gap S7000. In the accommodation space K7000, the light guide member 7030 is arranged such that the light incident surface 7030a faces the gap S7000 through the opening of the accommodation space K7000.

The pair of leg portions 7042 is a member that connects the placing portion 7041 and the housing 7013 of the image projector 7010, and respectively runs forward and upward from both ends in the right and left direction, of a front surface of the peripheral wall portion 7013c of the housing 7013 (FIG. 62). Base ends of the leg portions 7042 are integrally fixed to the housing 7013, and fixing portions 7041b provided in a lower surface of the placing portion 7041 are fixed to tip ends of the leg portions 7042.

The lighting window member 7050 is formed of a material having a high degree of transparency such as glass, acrylic, or a synthetic resin like polycarbonate. The lighting window member 7050 is provided to seal the opening of the accommodation space K7000, and to take the light through the gap S7000 into the accommodation space K7000.

The transparent cover 7060 is formed in a thin plate shape, using a material having a high degree of transparency such as glass, acrylic, or a synthetic resin like polycarbonate, and blocks the opening 7020a of the bezel member 7020. The transparent cover 7060 is arranged to go gradually upward as going from the front side to the rear side of the vehicle V7000 (FIG. 61). Accordingly, direct proceeding of the light illuminated on the transparent cover 7060 to the eye point of the passenger can be suppressed.

Here, in the present embodiment, the bezel member 7020 and the transparent cover 7060 are integrally provided. Then, the bezel member 7020 and the transparent cover 7060 are integrally formed by two-color molding in which two types of resins are poured into one mold and molding is performed, or by welding in which joints of two members molded with different resins are melted by heating or the like and are integrated. Which of the two types of techniques is used is not identified here. However, either technique can be employed for the integral formation of the bezel member 7020 and the transparent cover 7060.

In the present embodiment, assembly to the facing wall A7000 in the instrument panel I7000 of the vehicle display device 7001, the facing wall A7000 facing the windshield F7000, is performed as illustrated in FIG. 63. That is, an opening I7000a for allowing the bezel member 7020 to be fit in is formed in the facing wall A7000 of the instrument panel I7000, and first, the bezel member 7020 integrally provided with the transparent cover 7060 is fit into the opening I7000a from above, as illustrated by the arrow D7001.

Then, a structure of the light guide member 7030, the support member 7040, the lighting window member 7050, and the image projector 7010 is assembled to the facing wall A7000 of after the bezel member 7020 is fit, from below as illustrated by the arrow D7002. Here, in the present embodiment, a buffer material 7014 is provided in the entire edge of the projection slot 7013d (FIG. 62) in the image projector 7010. Then, assembly of the structure to the facing wall A7000 is performed such that the buffer material 7014 is pressed against the edge of the opening 7020a of the bezel member 7020, and the opening 7020a of the bezel member 7020 and the projection slot 7013d of the image projector 7010 are layered in the up and down direction. By the pressing through the buffer material 7014, the projection slot 7013d of the image projector 7010 is blocked and sealed by the bezel member 7020 with the opening 7020a blocked with the transparent cover 7060.

FIG. 64 schematically illustrates a projected image projected on the windshield F7000 by the vehicle display device 7001 of the present embodiment. In this vehicle display device 7001, the bezel member 7020 and the transparent cover 7060 are integrally provided, and no gap is caused therebetween. Therefore, the edge of the opening 7020a of the bezel member 7020 does not make a shadow on the transparent cover 7060, and occurrence of a position darker than a periphery, which may cause the above-described streak dark glare, can be suppressed. As a result, the streak dark glare can be suppressed in the periphery of a projected image G7001-1. A glare image G7001-2 such as a boundary line between the bezel member 7020 and the instrument panel I7000, in which the difference in brightness is reduced by emission of the light guide member 7030, does not exist or is merely reflected in a pale and unnoticeable manner, in the periphery of the projected image G7001-1.

Here, in the vehicle display device 7001 of the present embodiment, a pre-assembling protective sheet 7017 is arranged in the housing 7013 to block the projection slot 7013d from an inside until the projection slot 7013d of the image projector 7010 is arranged to be layered with the opening 7020a of the bezel member 7020. A pull-out slot 7013e of the pre-assembling protective sheet 7017 is formed in the housing 7013. The pull-out slot 7013e is a slot extending slightly longer than the width of the pre-assembling protective sheet 7017.

As illustrated in FIG. 65, the pre-assembling protective sheet 7017 is made of a flexible sheet having a roughly rectangular shape, and is provided with a holding portion 7017a held by a worker at the time of pulling out, in an end edge at the front side in a pulling-out direction D7003 through the pull-out slot 7013e. The pre-assembling protective sheet 7017 is arranged in the housing 7013 in a state where the holding portion 7017a is extended through the pull-out slot 7013e as an extended portion. Then, the pre-assembling protective sheet 7017 is provided able to be pulled out in the pulling-out direction D7003 through the pull-out slot 7013e by pulling out the holding portion 7017a.

Note that, in the present embodiment, as an example of the pre-assembling protective sheet referred in the present invention, the pre-assembling protective sheet 7017 made of a flexible sheet is exemplarily described. However, the pre-assembling protective sheet referred in the present invention is not limited thereto, and the pre-assembling protective sheet made of a plate having a certain thickness may be employed as long as the sheet can block the projection slot 7013d from an inside.

FIG. 66 illustrates a holding structure of the pre-assembling protective sheet 7017 in the vehicle display device 7001 in a V7001-V7001 section view in FIG. 65. As illustrated in FIG. 66, grooves 7013f extending along the pulling-out direction D7003 are formed in inner surfaces of a pair of facing peripheral wall portions 7013c extending in the pulling-out direction D7003, of the peripheral wall portion 7013c that surrounds four peripheries of the housing 7013. Both end edges along the pulling-out direction D7003 of the pre-assembling protective sheet 7017 is fit in the grooves 7013f, so that the projection slot 7013d provided with the buffer material 7014 in the edge is blocked and held from the inside in the housing 7013.

Further, as illustrated in FIG. 63, an arrangement process to arrange the image projector 7010 in the instrument panel I7000 such that the projection slot 7013d is blocked with the bezel member 7020 with the opening 7020a blocked with the transparent cover 7060, and the projection slot 7013d is layered with the opening 7020a is performed. After that, a pull-out process to pull out the pre-assembling protective sheet 7017 through the pull-out slot 7013e in the pulling-out direction D7003 by pulling out the holding portion 7017a through the pull-out slot 7013e is performed.

Here, a dustproof member as follows that does not hinder the pull-out of the pre-assembling protective sheet 7017 and blocks the pull-out slot 7013e after the pull-out of the pre-assembling protective sheet 7017 to suppress intrusion of a foreign substance through the pull-out slot 7013e is provided in the pull-out slot 7013e of the housing 7013. FIGS. 67A and 67B illustrate a brush 7013g as an example of the dustproof member. FIG. 67A illustrates the brush 7013g before the pull-out of the pre-assembling protective sheet 7017, and FIG. 67B illustrates the brush 7013g after the pull-out.

The pull-out slot 7013e is open toward a horizontal direction (including an approximately horizontal direction), and is formed in a slit shape extending slightly longer than the width of the rectangular pre-assembling protective sheet 7017 in a width direction. Then, the brush 7013g is implanted in the pull-out slot 7013*e*. To be specific, the brush 7013*g* is implanted in upper and lower edge portions 7013*e*-1 and 7013*e*-2 of the pull-out slot 7013*e* in the entire length of the pull-out slot 7013*e* to sandwich the pre-assembling protective sheet 7017 in the thickness direction throughout the entire width direction. As illustrated in FIG. 67A, before the pull-out of the pre-assembling protective sheet 7017, tip end portions of the brush 7013*g* implanted in the edge portions 7013*e*-1 and 7013*e*-2 are pressed against front and back surfaces of the pre-assembling protective sheet 7017 in a bent state. Then, when the pre-assembling protective sheet 7017 is pulled out, the bent brush 7013*g* extends such that the tip ends are layered to each other as viewed from an outside of the pull-out slot 7013*e* to block the pull-out slot 7013*e*, as illustrated in FIG. 67B.

Note that the dustproof member provided in the pull-out slot 7013*e* is not limited to the brush 7013*g*, and may be another example as follows. FIGS. 68A and 68B illustrate a protrusion lip 7013*h* as another example of the dustproof member. FIG. 68A illustrates the protrusion lip 7013*h* before pull-out of the pre-assembling protective sheet 7017, and FIG. 68B illustrates the protrusion lip 7013*h* after pull-out.

The protrusion lip 7013*h* is formed of an elastic member such as rubber, and a pair of the protrusion lips 7013*h* is provided to face each other in the pull-out slot 7013*e* to sandwich the pre-assembling protective sheet 7017 in the thickness direction throughout the entire width direction. The pair of protrusion lips 7013*h* is provided to face each other in the upper and lower edge portions 7013*e*-1 and 7013*e*-2 of the pull-out slot 7013*e*. The protrusion lips 7013*h* extends throughout the entire length of the pull-out slot 7013*e*. As illustrated in FIG. 68A, the tip end portions of the protrusion lips 7013*h* are pressed against the front and back surfaces of the pre-assembling protective sheet 7017 in a bent and crushed state before the pull-out of the pre-assembling protective sheet 7017. Then, when the pre-assembling protective sheet 7017 is pulled out, the bent and crushed protrusion lips 7013*h* extend and tip ends adhere to each other, and block the pull-out slot 7013*e*, as illustrated in FIG. 68B.

Further, FIGS. 69A and 69B illustrate a dustproof sheet 7013*i* as still other examples of the dustproof member. FIG. 69A illustrates the dustproof sheet 7013*i* before pull-out of the pre-assembling protective sheet 7017, and FIG. 69B illustrates the dustproof sheet 7013*i* after pull-out.

The dustproof sheet 7013*i* is formed of a flexible sheet material. Then, one end edge is fixed to the upper-side edge portion 7013*e*-1 or a vicinity of the edge portion 7013*e*-1 of the pull-out slot 7013*e*. To be specific, one end edge is fixed to the upper-side edge portion 7013*e*-1 of the pull-out slot 7013*e*, inside the housing 7013. The other end edge of the dustproof sheet 7013*i* is a free end. Further, the length between both end edge of the dustproof sheet 7013*i* is longer than the length from the position of the upper-side edge portion 7013*e*-1 of the pull-out slot 7013*e*, inside the housing 7013, to the position of the lower-side edge portion 7013*e*-2, outside the housing 7013. As illustrated in FIG. 69A, before the pull-out of the pre-assembling protective sheet 7017, the free end of the dustproof sheet 7013*i* is pulled out to an outside of the pull-out slot 7013*e* in a state of being in contact with the upper surface of the pre-assembling protective sheet 7017. Then, as illustrated in FIG. 69B, when the pre-assembling protective sheet 7017 is pulled out, the free end of the dustproof sheet 7013*i* hangs to a lower side of the pull-out slot 7013*e* to block the pull-out slot 7013*e*.

Next, an example of a function of the vehicle display device 7001 of the present embodiment will be described.

As described with reference to FIG. 63, the pre-assembling protective sheet 7017 that blocks the projection slot 7013*d* from an inside is built in the image projector 7010 until the image projector 7010 is assembled to the bezel member 7020 such that the projection slot 7013*d* is layered with the opening 7020*a* of the bezel member 7020, the opening 7020*a* being blocked with the transparent cover 7060. Then, after this arrangement, the pre-assembling protective sheet 7017 is pulled out through the pull-out slot 7013*e* by pulling out the holding portion 7017*a*. With this pre-assembling protective sheet 7017, the dust-proofness of the image projector 7010 is secured in the pre-assembling. Further, the pre-assembling protective sheet 7017 is pulled out after the assembly. Therefore, the pre-assembling protective sheet 7017 does not decrease the transparency of the projection light in the projection slot 7013*d*. According to the present embodiment, the dust-proofness of the image projector 7010 can be secured in the pre-assembling.

Further, according to the present embodiment, the dustproof member that does not hinder the pull-out of the pre-assembling protective sheet 7017, and suppresses intrusion of a foreign substance trough the pull-out slot 7013*e* after the pre-assembling protective sheet 7017 is pulled out is provided in the pull-out slot 7013*e*. Therefore, the dust-proofness of the pull-out slot 7013*e* can be secured. Further, not identified here, as the dustproof member, any of the brush 7013*g*, the protrusion lip 7013*h*, and the dustproof sheet 7013*i* described above is employable.

The brush 7013*g* employable as the dustproof member has flexibility, and thus the pull-out of the pre-assembling protective sheet 7017 is not hindered. That is, according to the brush 7013*g*, both of the pull-out property and the dust-proofness of the pre-assembling protective sheet 7017 can be achieved.

Further, the protrusion lips 7013*h* employable as the dustproof member also have flexibility, and thus the pull-out of the pre-assembling protective sheet 7017 is not hindered. That is, with the protrusion lips 7013*h*, both of the pull-out property and the dust-proofness of the pre-assembling protective sheet 7017 can be achieved.

Further, the dustproof sheet 7013*i* employable as the dustproof member has one end edge be the free end and has flexibility, and thus the pull-out of the pre-assembling protective sheet 7017 is not hindered. That is, with the dustproof sheet, both of the pull-out property and the dust-proofness of the pre-assembling protective sheet can be achieved.

Next, a second embodiment of the present invention will be described. Note that, in the second embodiment, an instrument panel I7000 also plays a role of the bezel member 7020 described above, and the second embodiment is equivalent to the first embodiment except for a point in which an image projector 7010 is directly assembled in the instrument panel I7000. Therefore, hereinafter, in the second embodiment, description will be given with reference to FIGS. 70 and 71, focusing on the different point from the first embodiment.

Figure 70:
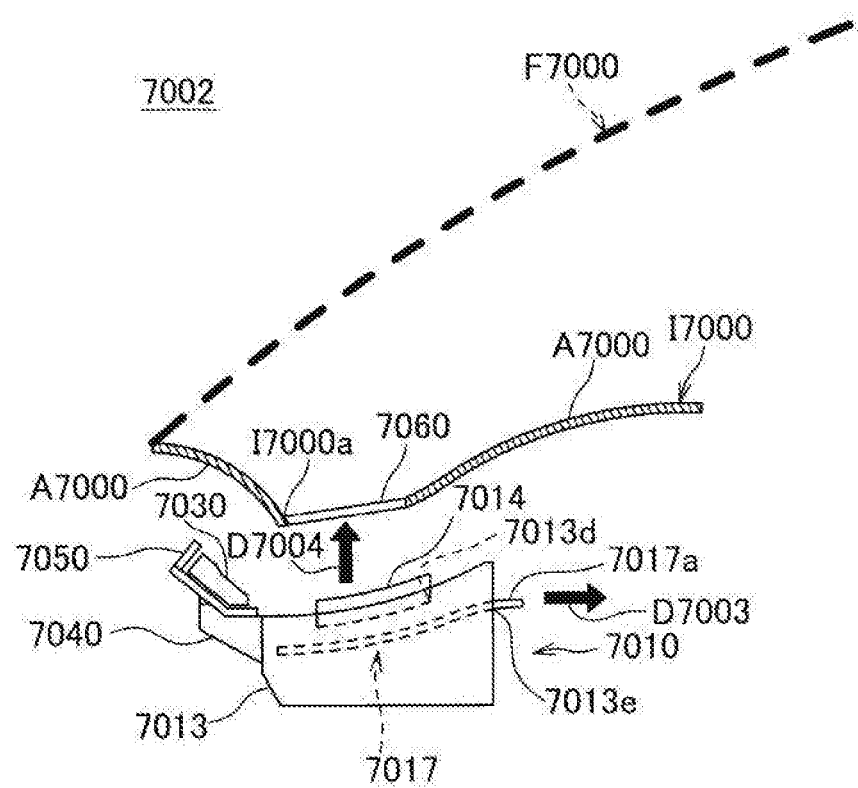
FIG. 70 is a diagram illustrating an instrument panel according to a second embodiment of the present invention.

FIG. 70 schematically illustrates an instrument panel according to a second embodiment of the present invention. Note that, in FIG. 70, configuration elements equivalent to the configuration elements according to the first embodiment illustrated in FIG. 63 are denoted with the same reference signs as those in FIG. 63, and hereinafter, overlapping description about the equivalent configuration elements is omitted.

As described above, the instrument panel I7000 of the present embodiment also functions as the bezel member 7020 in the first embodiment. Then, the vehicle display device 7002 of the present embodiment is the vehicle display device 7001 of the first embodiment from which the bezel member 7020 and the transparent cover 7060 are excluded.

In the present embodiment, the opening I7000a for projecting the image on the windshield F7000 by the image projector 7010 is provided in the facing wall A7000 facing the windshield F7000. Then, the transparent cover 7060 that blocks the opening I7000a is integrally provided in the facing wall A7000 of the instrument panel I7000. The facing wall A7000 and the transparent cover 7060 are integrally formed by the above-described two-color molding, or are integrally attached by welding. Although not identified here, either technique is employable for the integral formation of the facing wall A7000 and the transparent cover 7060.

In the vehicle display device 7002 of the present embodiment, a structure of the light guide member 7030, the support member 7040, the lighting window member 7050, and the image projector 7010 is assembled to the facing wall A7000 of the instrument panel I7000 from below, as illustrated by the arrow D7004. This assembly is performed such that the buffer material 7014 is pressed against the edge of the opening I7000a of the facing wall A7000, and the opening I7000a and the projection slot 7013d of the image projector 7010 are layered in the up and down direction. With the pressing through the buffer material 7014, the projection slot 7013d of the image projector 7010 is blocked and sealed with the instrument panel I7000 with the opening I7000a blocked with the transparent cover 7060. Following that, the pre-assembling protective sheet 7017 is pulled out by pulling out the holding portion 7017a.

As described above, in the vehicle display device 7002 of the present embodiment, first, the arrangement process to arrange the image projector 7010 in the instrument panel I7000 such that the projection slot 7013d of the image projector 7010 is blocked with the instrument panel I7000 with the opening I7000a blocked with the transparent cover 7060, and the projection slot 7013d is layered with the opening I7000a is performed. Then, a pull-out process to pull out the pre-assembling protective sheet 7017 through the pull-out slot 7013e by pulling out the holding portion 7017a is performed.

Figure 71:
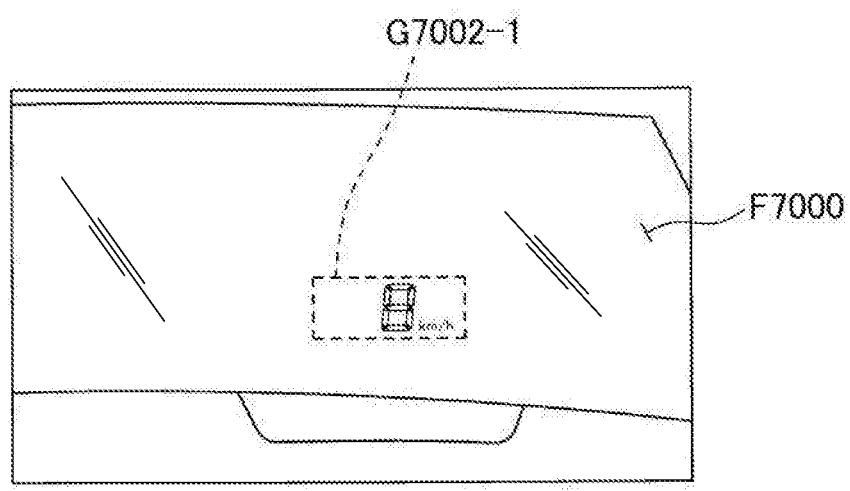
FIG. 71 is a diagram illustrating a projected image projected on a windshield through an opening of the instrument panel of FIG. 70.

FIG. 71 schematically illustrates a projected image projected on the windshield F7000 through the opening I7000a of the instrument panel I7000 of FIG. 70. In this instrument panel I7000, the facing wall A7000 and the transparent cover 7060 are integrally provided, and no gap is cause therebetween. Therefore, the edge of the opening I7000a of the facing wall A7000 does not make a shadow on the transparent cover 7060, and occurrence of a position darker than a periphery, such as the above-described streak dark glare. As a result, such streak dark glare is suppressed in the periphery of a projected image G7002-1. Further, the instrument panel I7000 also functions as the bezel member 7020 in the first embodiment. Therefore, there is no glare of a boundary line between the bezel member 7020 and the instrument panel I7000, and visibility of the projected image G7002-1 is further improved.

It is obvious that the dust-proofness of the image projector 7010 can be secured in the pre-assembling according to the above-described second embodiment, similarly to the first embodiment. Further, in the second embodiment, as the dustproof member of the pull-out slot 7013e of the pre-assembling protective sheet 7017, any of the brush 7013g illustrated in FIGS. 67A and 67B, the protrusion lip 7013h illustrated in FIGS. 68A and 68B, and the dustproof sheet 7013i illustrated in FIGS. 69A and 69B is employable.

The favorable embodiment has been described regarding the present invention. However, the image projector, the vehicle display device, and the method of assembling the image projector of the present invention are not limited to the configurations of the embodiment.

The above-describe embodiment has the configuration in which the light guide member 7030 is supported by the support member 7040 integrally formed with the image projector 7010, and the light guide member 7030 is assembled to the instrument panel and the bezel member, together with the image projector 7010. However, an embodiment is not limited thereto. For example, a member that supports the light guide member 7030 may be provided in an instrument panel or a bezel member, and the image projector 7010 may be assembled to the instrument panel or the bezel member assembled with the light guide member 7030.

Note that the above-described embodiment merely describes a representative form of the present invention, and the present invention is not limited to the embodiment. That is, various modifications can be implemented without departing from the gist of the present invention. Configurations by the modifications are obviously included in the scope of the present invention as long as the configurations are furnished with the configurations of the image projector, the vehicle display device, and the method of assembling the image projector of the present invention.

An objective of the present invention is to secure dust-proofness of an image projector until the image projector is assembled into an instrument panel. A image projector (7010) that projects an image through an opening (7020a) of a bezel member (7020), which is blocked with a transparent cover (7060), includes a housing (7013) (case) in which a projection slot (7013d) arranged to be layered with the opening (7020a) is formed, and a pre-assembling protective sheet (7017) arranged in the housing (7013) (case) to block the projection slot (7013d) from an inside until the protection slot (7013d) is arranged to be layered with the opening (7020a). A pull-out slot (7013e) to which a part of the pre-assembling protective sheet (7017) is extended is formed in the housing (7013) (case), and the pre-assembling protective sheet (7017) is provided able to be pulled out through the pull-out slot (7013e) by pulling out the extended portion extended through the pull-out slot (7013e).

Eighth Invention

Next, an eighth invention will be described.
The eighth invention is an image projector and a vehicle display device having the following characteristics.
(1)
An image projector arranged in an instrument panel of a vehicle and adapted to project an image on a windshield through an opening formed in a facing wall in the instrument panel, the facing wall facing the windshield,
the image projector including:
a portion to be supported by bezel supported by a bezel body fit in the facing wall and forming apart or all of a peripheral edge of the opening, wherein
the portion to be supported by bezel is configured to be attachable/detachable to/from the bezel body by work from a rear side of a vehicle.

(2)

The image projector according to (1), further including:
a portion to be supported by structure supported by a structure of the vehicle, the structure being arranged in the instrument panel, wherein
the portion to be supported by structure is configured to be attachable/detachable to/from the structure by work from a rear side of the vehicle.

(3)

A vehicle display device including:
an image projector arranged in an instrument panel of a vehicle and adapted to project an image on a windshield through an opening formed in a facing wall in the instrument panel, the facing wall facing the windshield; and
a bezel body fit in the facing wall, and forming a part or all of a peripheral edge of the opening, wherein
the image projector is configured from the image projector according to (1) or (2).

(4)

The vehicle display device according to (3), wherein
the bezel body includes a portion to be fixed that is fixed to the facing wall.

Hereinafter, the eighth invention will be described in detail.

TECHNICAL FIELD

The present invention relates to an image projector that projects an image on a windshield through an opening formed in an instrument panel and a vehicle display device including the image projector.

BACKGROUND ART

Figure 79:
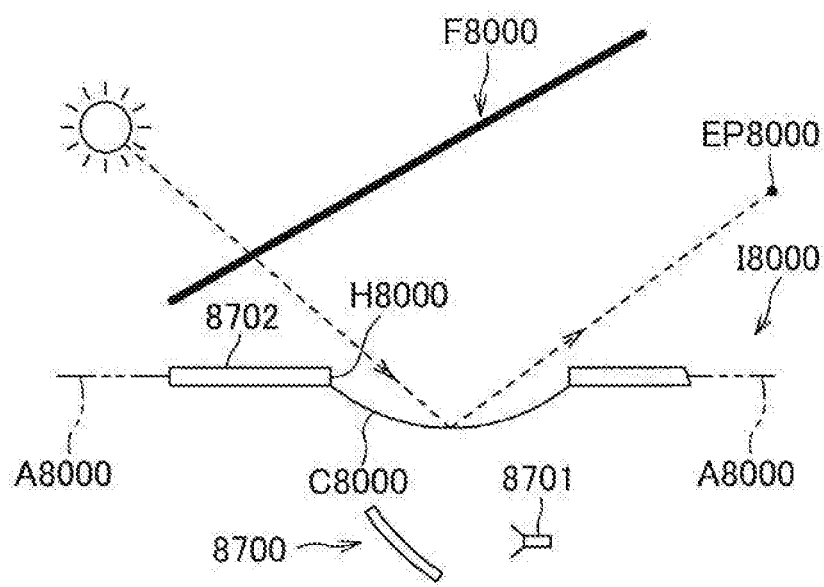
FIG. 79 is a sectional view illustrating a conventional vehicle display device.

Conventionally, a vehicle display device as a head-up display device that projects an image on a windshield of a vehicle is provided in an instrument panel (for example, see Patent Literature 81). In a vehicle display device 8700 described in Patent Literature 81, an image projector 8701 arranged in an instrument panel I8000 projects an image on a windshield F8000 through an opening H8000 formed in a facing wall A8000 of the instrument panel I8000, the facing wall A8000 facing the windshield F8000, as illustrated in FIG. 79.

CITATION LIST

Patent Literature

Patent Literature 81: JP 2007-148092 A

SUMMARY OF INVENTION

Technical Problem

In the above-described conventional vehicle display device 8700, relative relationship (a relative position and a relative angle) between the image projector 8701 and a bezel body 8702 is required to be highly accurately set so that an image to be projected is not shielded by the bezel body 8702 that forms a peripheral edge of the opening H8000, which is a case of an increase in man-hours. Further, while the image projector needs to be taken out at the time of breakdown or maintenance and re-installed after work, the entire instrument panel needs to be taken out of the vehicle at that time and the work becomes extensive, which is inconvenient.

An objective of the present invention is to provide an image projector and a vehicle display device that can be highly accurately installed while decreasing man-hours, and can be easily taken out of an instrument panel and can be re-installed.

Solution to Problem

To solve the problem and achieve the objective, the invention according to (1) is an image projector arranged in an instrument panel of a vehicle and adapted to project an image on a windshield through an opening formed in a facing wall in the instrument panel, the facing wall facing the windshield, the image projector including: a portion to be supported by bezel supported by a bezel body fit in the facing wall and forming a part or all of a peripheral edge of the opening, wherein the portion to be supported by bezel is configured to be attachable/detachable to/from the bezel body by work from a rear side of a vehicle.

The invention described in (2) further includes, in the invention according to (1), a portion to be supported by structure supported by a structure of the vehicle, the structure being arranged in the instrument panel, wherein the portion to be supported by structure is configured to be attachable/detachable to/from the structure by work from a rear side of the vehicle.

The invention described in (3) is a vehicle display device including: an image projector arranged in an instrument panel of a vehicle and adapted to project an image on a windshield through an opening formed in a facing wall in the instrument panel, the facing wall facing the windshield; and a bezel body fit in the facing wall, and forming a part or all of a peripheral edge of the opening, wherein the image projector is configured from the image projector according to (1) or (2).

The invention described in (4) is that, in the invention according to (3), the bezel body includes a portion to be fixed that is fixed to the facing wall.

Advantageous Effects of Invention

According to the invention described in (1), the image projector is supported by the bezel body in the portion to be supported by bezel. Therefore, the bezel body integrated with the image projector by the portion to be supported by bezel is fit in the facing wall, so that the image projector can be accommodated in the instrument panel while easily and highly accurately set relative relationship between the image projector and the bezel body, and a man-hour can be reduced, compared with a configuration to independently attach the image projector and the bezel body to the structure such as the instrument panel or the vehicle, and to highly accurately set the relative position.

Further, the portion to be supported by bezel is configured to be attachable/detachable to/from the bezel body by work from a rear side of the vehicle. Therefore, a panel portion in the instrument panel, the panel portion facing a passenger (for example, a panel provided with a meter such as a speed meter) is removed, and work is performed through the rear opening portion from which the panel is removed and the image projector can be attached/detached to/from the bezel body. At this time, the image projector is configured to have dimensions by which the image projector can pass through the rear opening portion, so that the image projector can be easily taken out of and re-installed in the instrument panel.

According to the invention described in (2), the image projector is supported by the structure of the vehicle in the portion to be supported by structure, so that the image projector can be firmly fixed, and position aberration due to vibration at the time of travel of the vehicle or inertial force at the time of start or stop of the vehicle can be prevented. Further, the portion to be supported by structure is configured to be attachable/detachable to/from the structure by work from the rear side of the vehicle. Therefore, the image projector can be attached/detached to/from the structure by work through the rear opening portion, as described above, so that the image projector can be easily taken out of and re-installed in the instrument panel.

According to the invention described in (3), the image projector is supported by the bezel body in the portion to be supported by bezel, and the portion to be supported by bezel is configured to be attachable/detachable by work from the rear side of the vehicle. Therefore, the relative relationship between the image projector and the bezel body can be highly accurately set while decreasing the man-hour, and the image projector can be easily taken out and re-installed in the instrument panel.

According to the invention described in (4), the bezel body is not only fit in the facing wall, but also is fixed by the portion to be fixed, so that adhesion between the bezel body and the instrument panel can be improved, and installation of the bezel body rising from the instrument panel or occurrence of a gap therebetween can be suppressed, and design can be improved.

Description of Embodiments

Figure 74:
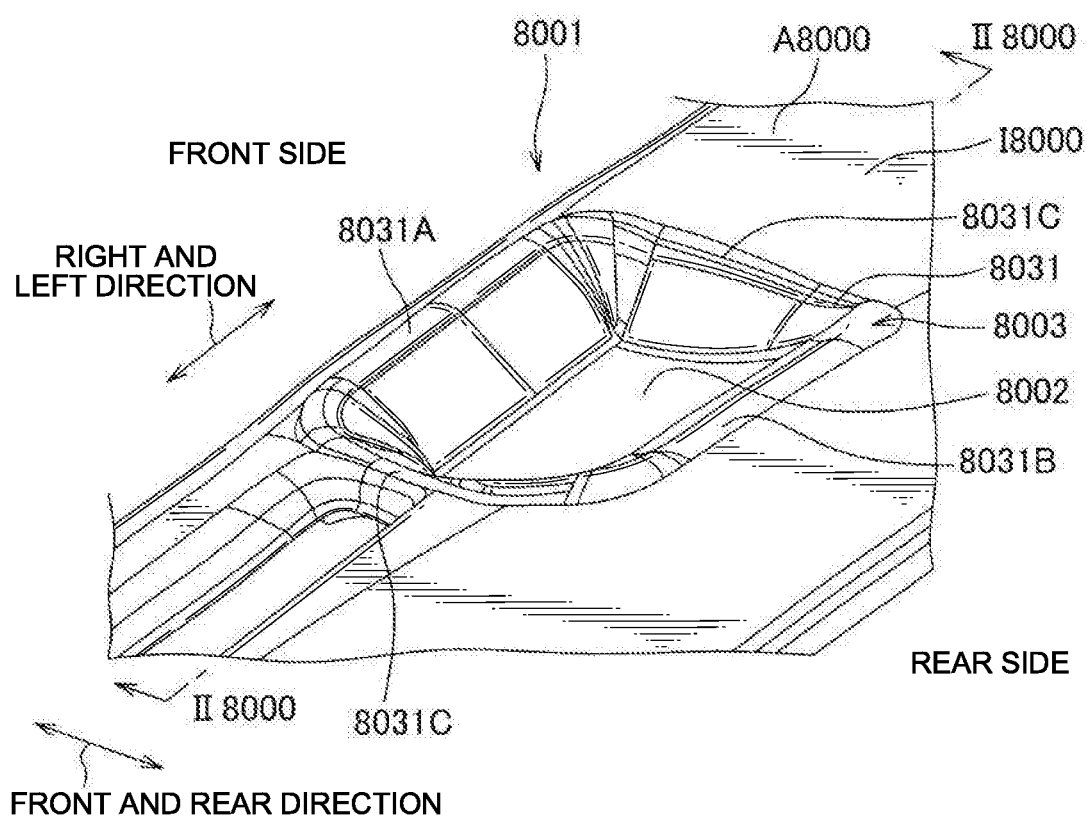
FIG. 74 is a perspective view illustrating a vehicle display device according to an embodiment of the present invention.
Figure 75:
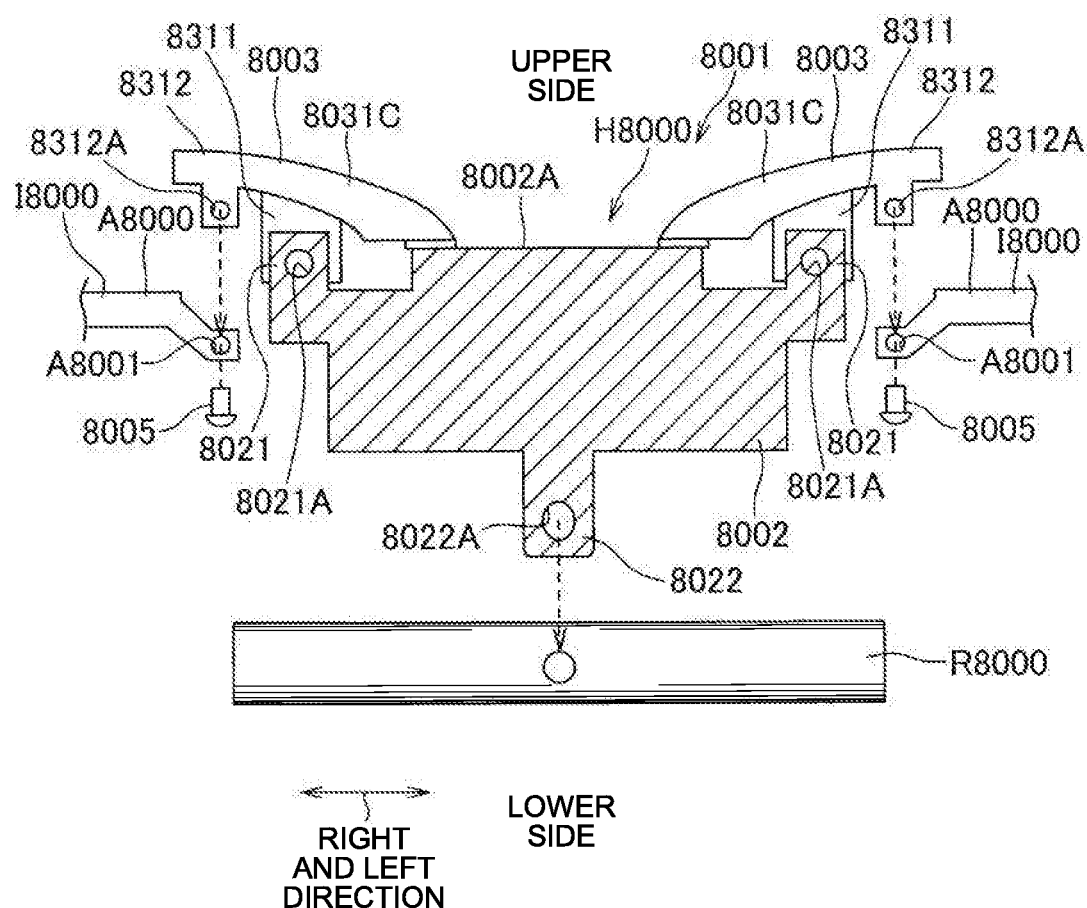
FIG. 75 is a sectional view along the II8000-II8000 line of FIG. 74.

Hereinafter, an embodiment of the present invention will be described on the basis of the drawings. A vehicle display device 8001 of the present embodiment is a device including an image projector 8002 arranged in an instrument panel I8000 of a vehicle, and a bezel body 8003 provided in a periphery of an opening H8000 formed in a facing wall A8000 in the instrument panel I8000, the facing wall facing a windshield F8000, as illustrated in FIGS. 74 to 76A and 76B, and which projects a traveling state of the vehicle such as a speed or a road state on a windshield F8000 as an image. Note that a front side and a rear side, and an upper side and a lower side in a front and rear direction, a right and left direction, and a front and rear direction of a vehicle in the present embodiment are as illustrated in FIGS. 74 and 75.

The image projector 8002 includes portions to be supported by bezel 8021 supported by right and left bezel portions 8031C described below of the bezel body 8003, a portion to be supported by structure 8022 supported by a reinforcement R8000 as a structure of the vehicle arranged in the instrument panel I8000, and a front fixing portion 8023 fixed to a support member 8033 described below, and projects an image on the windshield F8000 from an upper surface 8002A exposed to the opening H8000. At this time, the image projector 8002 is configured to form the image in a distant place from a passenger so that the passenger can naturally recognize the image even if the passenger focuses on the distant place at the time of driving. Further, the image projector 8002 has dimensions by which the image projector 8002 can pass through a rear opening portion PH8000 where a meter panel P8000 described below is removed from the instrument panel I8000.

Figure 76A:
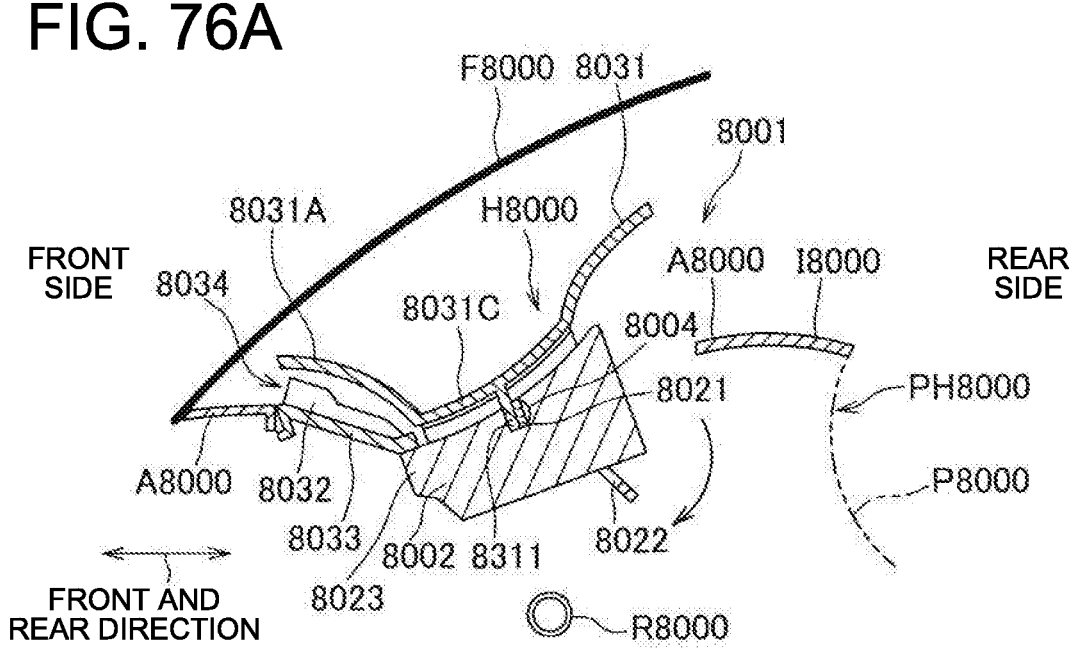
FIGS. 76A and 76B are sectional views illustrating a state in which a vehicle display device of FIG. 74 is attached to an instrument panel.
Figure 76B:
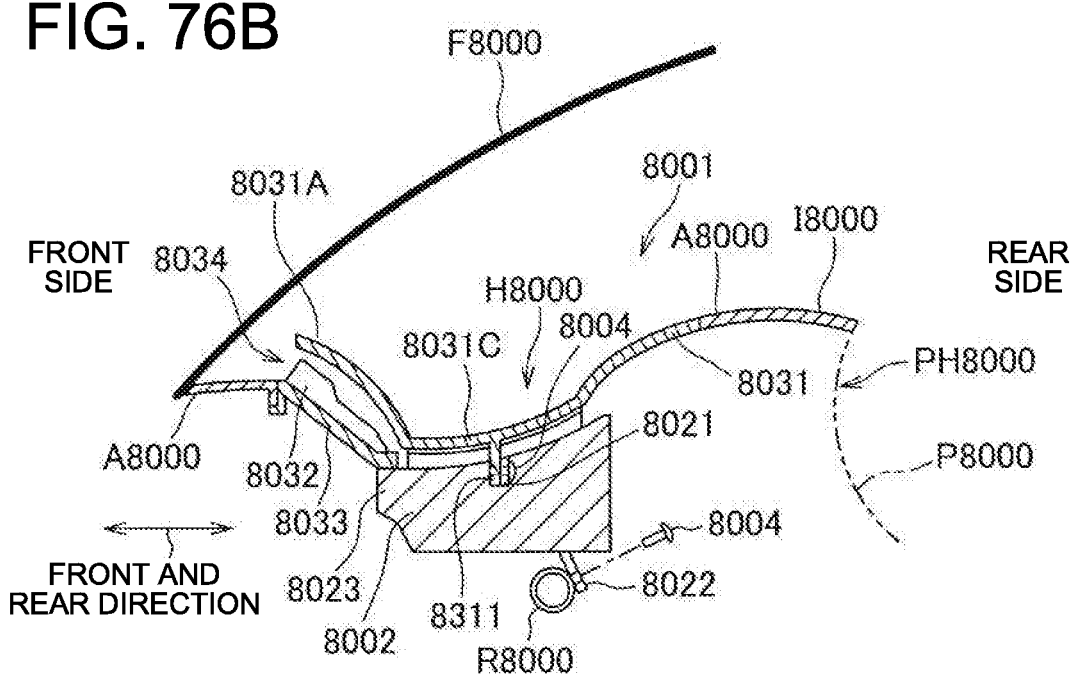

The portions to be supported by bezel 8021 are provided in both ends of the image projector 8002 in the right and left direction, and are formed to have through holes 8021A into which fixing members 8004 such as screws illustrated in FIGS. 76A and 76B can be inserted in the front and rear direction.

The portion to be supported by structure 8022 is provided in a lower end of the image projector 8002, and is formed to have a through hole 8022A into which the fixing member 8004 can be inserted in the front and rear direction.

The front fixing portion 8023 is formed to protrude from a front surface to the rear of the image projector 8002, and to follow a lower side of the support member 8033, as illustrated in FIGS. 76A and 76B, thereby to be fixable by the support member 8033.

The bezel body 8003 includes a bezel member 8031 that configures a peripheral edge of the opening H8000, a light guide member 8032 provided below a front bezel portion 8031A described below, and the support member 8033 that supports the light guide member 8032 from below.

The bezel member 8031 is configured from a resin having approximately the same color as the facing wall A8000, for example, includes a front bezel portion 8031A at the front side, a rear bezel portion 8031B at the rear side, right and left bezel portion 8031C provided between the front bezel portion 8031A and the rear bezel portion 8031B in both ends in the right and left direction, and is fit in the facing wall A8000. The bezel portions 8031A, 8031B, and 8031C may be separately formed or integrally formed.

The front bezel portion 8031A is arranged to rise from the facing wall A8000 with a gap between an end portion at the front side and the facing wall A8000 to form a lighting portion 8034 illustrated in FIGS. 76A and 76B between the front bezel portion 8031A and the facing wall A8000, and is configured to be able to transmit light from below to upward.

The light guide member 8032 is configured from a transparent member having a high refractive index, such as glass or a resin, is formed in a plate shape extending in the front and rear direction between the front bezel portion 8031A and the support member 8033, and is configured to guide light from outside taken in through the lighting portion 8034 to the rear side.

The support member 8033 is formed such that an upper surface can reflect the light and is fixed to the facing wall A8000 to support the light guide member 8032 on the upper surface.

In the bezel body 8003 as described above, the light from outside having passed through the windshield F8000 is taken in through the lighting portion 8034, goes upward while being guided to the rear side by the light guide member 8032, passes through the front bezel portion 8031A, and goes to the windshield F8000. Therefore, even if the light from outside is less easily illuminated on the upper surface of the front bezel portion 8031A, reflecting in the windshield F8000 and being made noticeable can be suppressed.

The right and left bezel portions 8031C include support portions 8311 extending to a lower side and fixed with the portions to be supported by bezel 8021 to support the image projector 8002, and portions to be fixed 8312 fixed to the facing wall A8000 by fixing members 8005, as illustrated in FIG. 75.

Fixation holes (not illustrated) for fixing the fixing members 8004 (screwing the fixing member in a case where the fixing member has a screw shape, or press-fitting the fixing member in a case where the fixing member is a press-fit pin) are formed in the support portions 8311. Further, a fixation hole approximately similar to the support portion 8311 is formed in the reinforcement R8000.

The portions to be fixed 8312 are provided at a lower side of the bezel body 8003 to be fixable in the instrument panel I8000, and are formed to have through holes 8312A into which the fixing members 8005 can be inserted in the front and rear direction. Further, fixation holes A8001 for fixing the fixing members 8005 are formed in the facing wall A8000, and can fix the portions to be fixed 8312 to the facing wall A8000 by work from the rear side. Because the bezel body 8003 includes the portions to be fixed 8312, the adhesion between the bezel body 8003 and the instrument panel I8000 can be improved, compared with a configuration to simply fit the bezel body into the facing wall, and installation of the bezel body 8003 rising from the instrument panel I8000 and occurrence of a gap therebetween are suppressed, and design can be improved. Further, the portions to be fixed 8312 are fixed in the instrument panel I8000, and are provided not to be seen from the passenger. Therefore, a decrease in the design can be suppressed.

Next, a method of attaching the vehicle display device 8001 to the instrument panel I8000 will be described. First, as illustrated in FIGS. 76A and 76B, the meter panel P8000 facing the passenger and provided with a speed meter and the like is not attached to the instrument panel I8000, and the rear opening portion PH8000 is formed. Next, the fixing members 8004 are inserted into the through holes 8021A of the portions to be supported by bezel 8021 and are fixed in the fixation holes of the support portions 8311, so that the bezel member 8031 and the image projector 8002 are fixed. The support member 8033 that supports the light guide member 8032 and the front fixing portion 8023 are fixed, so that the light guide member 8032, the support member 8033, and the image projector 8002 are integrated, and the entire bezel body 8003 and the image projector 8002 are integrated.

Next, as illustrated in FIG. 76A, an end portion of the support member 8033 at the front side is positioned to the facing wall A8000, and the integrated image projector 8002 and bezel body 8003 are rotated in a clockwise manner in FIG. 76A around the end portion at the front side, and as illustrated in FIG. 76B, the bezel body 8003 is fit in the facing wall A8000, and the image projector 8002 is accommodated in the instrument panel I8000. At this time, the portion to be supported by structure 8022 comes in contact with the reinforcement R8000 from the rear side. Subsequent work is performed through the rear opening portion PH8000.

The portions to be fixed 8312 of the right and left bezel portions 8031C are fixed to the facing wall A8000 with the fixing members 8005. Further, the fixing member 8004 is inserted into the through hole 8022A of the portion to be supported by structure 8022 from the rear side, and is fixed in the fixation hole of the reinforcement R8000. As described above, after the integrated bezel body 8003 and image projector 8002 are fixed to the instrument panel I8000 and the reinforcement R8000, the meter panel P8000 is attached to the rear opening portion PH8000, so that the attachment of the instrument panel I8000 to the vehicle display device 8001 is completed.

Figure 77A:
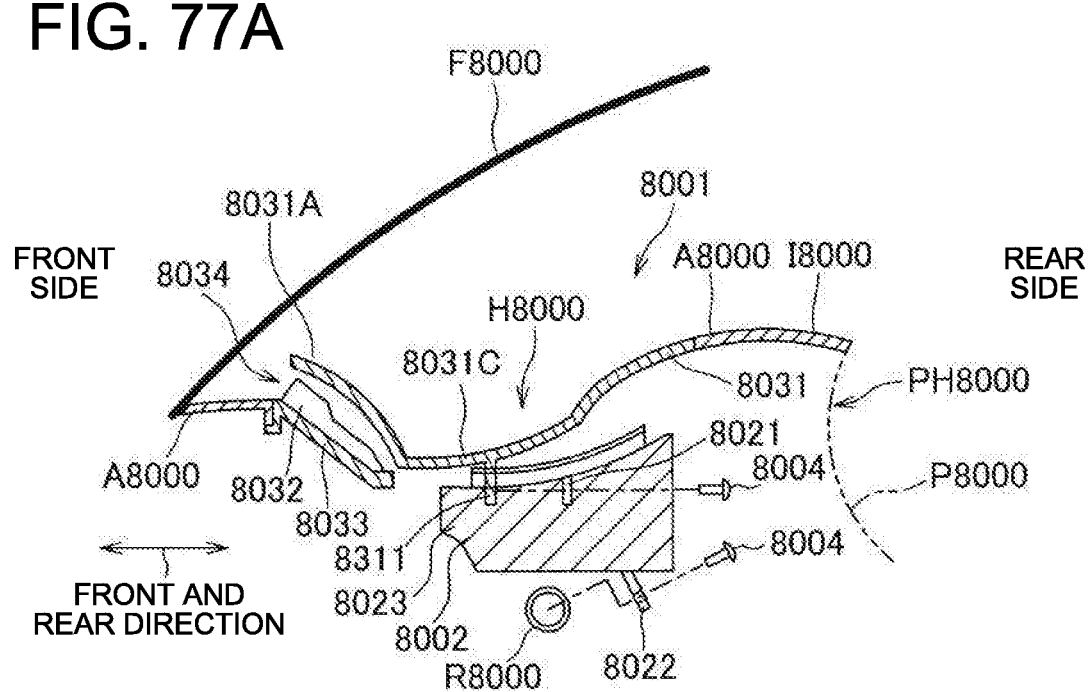
FIGS. 77A and 77B are sectional views illustrating a state in which an image projector of the vehicle display device of FIG. 74 is taken out of the instrument panel.
Figure 77B:
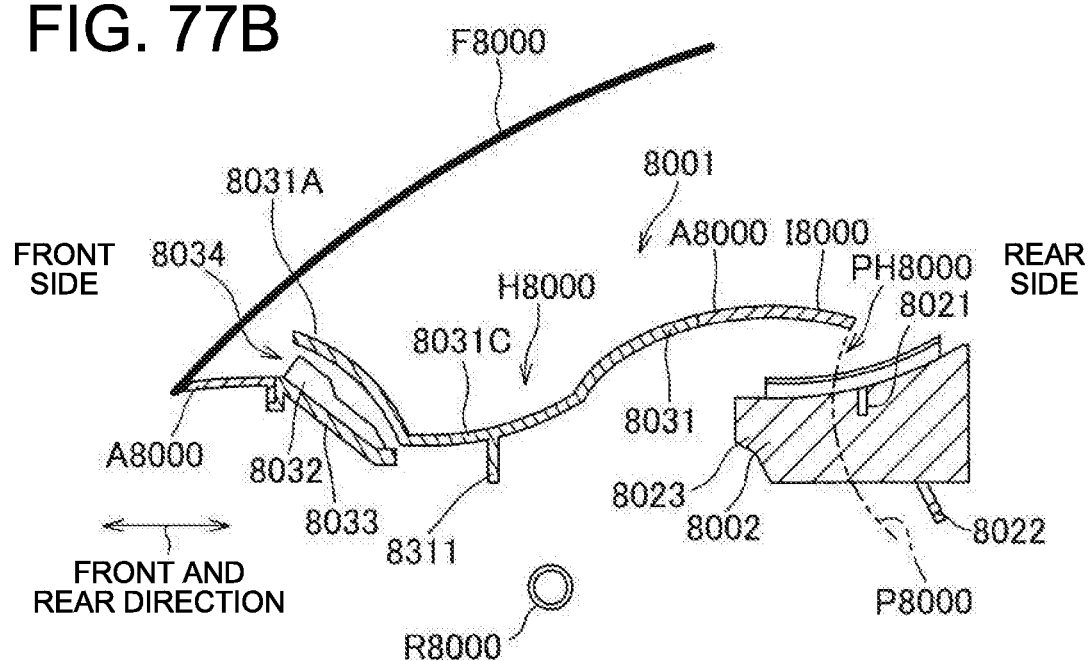

Next, a method of taking out the image projector 8002 of the instrument panel I8000 when the image projector 8002 is broken down or in performing periodic maintenance will be described. First, the meter panel P8000 is taken out of the instrument panel I8000 to form the rear opening portion PH8000 andwork is performed through the rear opening portion PH8000, so that the fixing members 8004 are removed, as illustrated in FIG. 77A, and the fixation between the portions to be supported by bezel 8021 of the image projector 8002 and the support portions 8311 of the right and left bezel portions 8031C and the fixation between the portion to be supported by structure 8022 and the reinforcement R8000 are canceled, and the fixation between the front fixing portion 8023 and the support member 8033 is canceled. Next, as illustrated in FIG. 77B, the image projector 8002 from which the fixation has been canceled is brought to pass through the rear opening portion PH8000, and is taken out of the instrument panel I8000. After work such as repair or maintenance is performed for the taken-out image projector 8002, the image projector 8002 is brought to pass through the rear opening portion PH8000 again and accommodated in the instrument panel I8000, and is fixed to the bezel member 8031 and the reinforcement R8000 by the fixing members 8004. Further, the front fixing portion 8023 and the support members 8033 are fixed. Following that, the meter panel P8000 is attached to the instrument panel I8000, so that the re-installation of the image projector 8002 is completed.

According to the present embodiment, there are effects as follows. That is, the bezel body 8003 integrated with the image projector 8002 is fit in the facing wall A8000, so that the image projector 8002 can be accommodated in the instrument panel I8000 while easily and highly-accurately setting the relative relationship between the image projector 8002 and the bezel body 8003, and the man-hour can be reduced, compared with the configuration to independently attach the image projector and the bezel body to the instrument panel or the structure of the vehicle, and to highly accurately set the relative relationship.

Further, the portions to be supported by bezel 8021 are attached/detached to/from the right and left bezel portions 8031C by work through the rear opening portion PH8000 formed in the instrument panel I8000 at the rear side, and the portion to be supported by structure 8022 is attached/detached to/from the reinforcement R8000. Further, the image projector 8002 has the dimensions by which the image projector 8002 can pass through the rear opening portion PH8000. Therefore, the image projector 8002 can be easily taken out of the instrument panel I8000 and can be re-installed, and it is not necessary to take the instrument panel I8000 out of the vehicle.

Further, the image projector 8002 is supported by the reinforcement R8000 in the portion to be supported by structure 8022. Therefore, the image projector 8002 can be firmly fixed, and the position aberration due to vibration at the time of traveling of the vehicle and inertial force at the time of start or stop of the vehicle can be prevented.

Note that the present invention is not limited to the embodiment, and includes other configurations and the like that can achieve the objective of the present invention and also includes modifications and the like as described below.

For example, in the embodiment, the image projector 8002 is fixed to the reinforcement R8000 by the portion to be supported by structure 8022. However, the image projector may include a portion to be supported by structure fixable to the structure of the vehicle, other than the reinforcement, or may have a configuration not to include the portion to be supported by structure and not to be fixed to the structure of the vehicle if fixing strength by the portions to be supported by bezel is sufficiently high.

Figure 78:
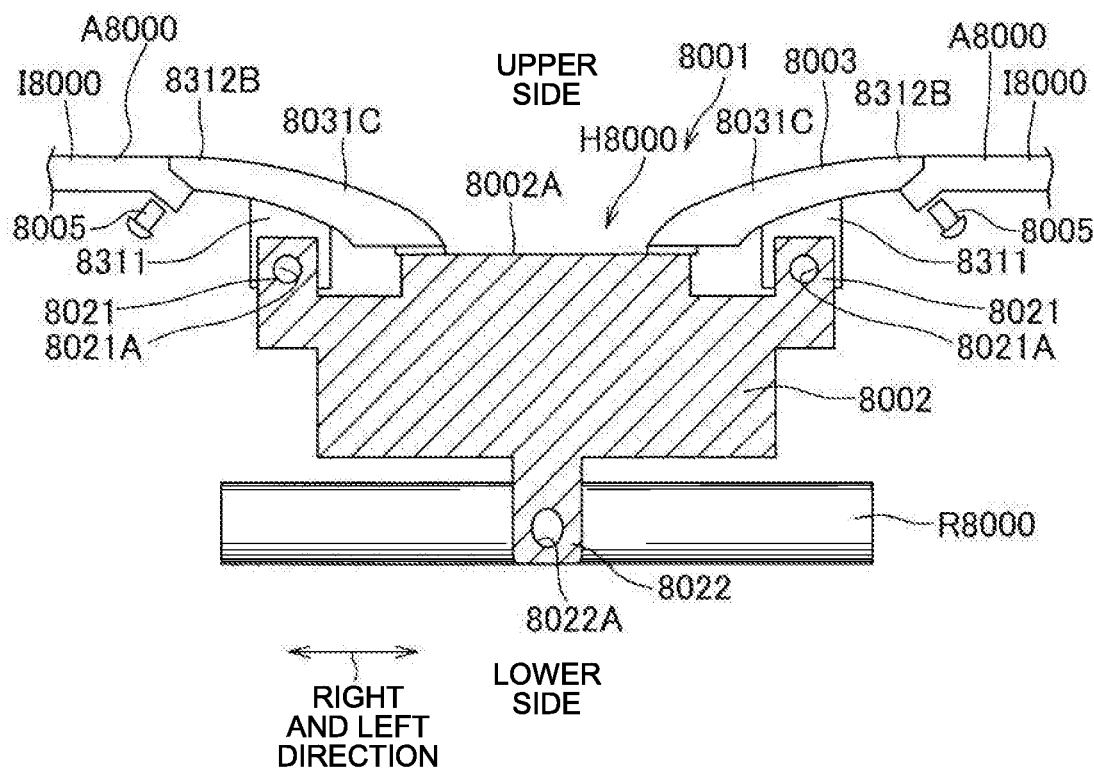
FIG. 78 is a sectional view illustrating a vehicle display device of a modification.

Further, in the above-described embodiment, the bezel member 8031 includes the portions to be fixed 8312 fixed to the facing wall A8000 by work from the rear side. However, the portions to be fixed may not be configured to be fixable by the work from the rear side. For example, as illustrated in FIG. 78, the portions to be fixed may be portions to be fixed 8312B into which the fixing members 8005 are inserted along a direction in which the bezel member 8031 and the facing wall A8000 are layered (in a direction going diagonally upward from the right and left direction). A procedure to fix the bezel body 8003 to the instrument panel I8000 in a case of the portions to be fixed 8312B may just be, for example, fixing the image projector 8002 and the bezel body 8003, which are integrated similarly to the embodiment, to the instrument panel I8000 before being assembled to the vehicle by the portions to be fixed 8312B, and then assembling the instrument panel I8000 to the vehicle.

According to such a configuration, the adhesion between the bezel member 8031 and the facing wall A8000 can be improved, compared with a configuration to insert and fix the fixing members 8005 in the front and rear direction, like the above-described embodiment, and occurrence of rising of the bezel member 8031 and formation of the gap between the bezel member 8031 and the facing wall A8000 can be further suppressed on the upper surface. Further, a configuration not to include the portions to be fixed and to fix the bezel body to the facing wall by being fit may be employed, if the bezel member and the facing wall are sufficiently in contact with each other.

Further, in the above-described embodiment, the portions to be supported by bezel 8021 and the portion to be supported by structure 8022 are fixed with the fixing members 8004. However, a configuration without using the fixing members may be employed. For example, a configuration to form protrusions in the portions to be supported by bezel or the portion to be supported by structure, and to insert and fix the protrusions in the fixation holes formed in the bezel member or the reinforcement, and to be able to cancel the fixation from the rear side may be employed.

Further, in the above-described embodiment, the light from outside having passed through the windshield F8000 is taken in through the lighting portion 8034, is guided by the light guide member 8032, and pass through the front bezel portion 8031A. However, the light guide member and the support member may be omitted and the lighting portion may not be formed, and the light may not be transmitted through the front bezel portion, as long as the glare of the bezel member to the windshield is not noticeable.

Further, in the above-described embodiment, the upper surface 8002A of the image projector 8002 is exposed through the opening H8000. However, a configuration in which a cover or the like is provided on an upper side of the upper surface, and the image projector is protected from water, dust, and the like may be employed.

In addition, the most favorable configurations, methods, and the like for implementing the present invention have been disclosed in the above description. However, the present invention is not limited thereto. That is, although the present invention has been especially illustrated and described regarding a specific embodiment, various modifications can be applied to the above-described embodiment in shapes, materials, quantities, and other detailed configurations by a person skilled in the art without departing from the technical idea and the objective scope of the present invention. Therefore, the shapes, materials, and the like disclosed in the above description are exemplarily described for facilitating the understanding of the present invention, and do not limit the present invention. Therefore, description of a member with a name, from which a part or all of the limitations of the shapes, materials, and the like are removed, is included in the present invention.

Abstract

To provide an image projector and a vehicle display device that can be highly accurately installed while decreasing man-hours, and can be easily taken out of and re-installed in an instrument panel. A bezel body (8003) integrated with an image projector (8002) is fit in a facing wall (A8000), so that the image projector (8002) can be accommodated in an instrument panel (I8000) and the man-hours can be reduced while easily and highly accurately setting relative relationship between the image projector (8002) and the bezel body (8003). Further, portions to be supported by bezel (8021) are attached/detached to/from right and left bezel portions (8031C) by work from a rear opening portion (PH8000), and the image projector (8002) has dimensions by which the image projector can pass through the rear opening portion (PH8000). Therefore, the image projector (8002) can be easily taken out of and re-installed in the instrument panel (I8000).

REFERENCE SIGNS LIST

Reference Signs of First Invention

1 Vehicle display device
2 Image projector
3 Display unit (projection unit)
4 Transparent cover (transmission unit)
4r Reflected image
5 Bezel body (frame unit)
5r Reflected image
6 Light guide member (emission unit)
51 Opening portion
52 Outer edge portion
53 Frame surface portion
F Windshield
G1 Display image
G3 Virtual image
I Instrument panel
Ia Surface
Ir Reflected image Reference Signs of Second Invention 2001 Vehicle display device
2010 Image projector
2020, 2030, and 2040 Bezel body
2021, 2031, and 2041 Bezel member
2022 Light source unit
2023 Cover
2211, 2311, and 2411 Outer edge portion
2212, 2312, and 2412 Inner edge portion
2213, 2313, and 2413 Opening
2414 Light transmitting portion (portion transmitting light emitted from light source unit)
V2000 Vehicle
F2000 Windshield
I2000 Instrument panel
A2000 Facing wall
K2000 Hole Reference Signs of Third Invention 3001 Vehicle display device
3010 Image projector
3015 and 3085 Bezel body
3020 and 3090 Bezel member
3030 Light guide member
3030a Light incident surface
3040 Support member
3050 Lighting window member
3060 Transparent cover 3070 and 3100 LED (example of light source)
3210 Bezel main body
3210a Opening
3211 Front bezel portion
3212 Descent wall portion
3220 and 3910 Rib
3225 Incident portion
A3000 Facing wall
F3000 Windshield
I3000 Instrument panel
K3000 Accommodation space
S3000 Gap
V3000 Vehicle Reference Signs of Fourth Invention 4001 Vehicle display device
4002 Image projector
4003 Light guide member
4004 Support member
4041 Placing portion
4042 Leg portion
4412 and 4421 Notch
V4000 Vehicle
F4000 Windshield
I4000 Instrument panel
A4000 Facing wall
W4000 Descent wall portion
H4000 Opening Reference Signs of Fifth Invention 5001 Vehicle display device
5010 Image projector
5020 Bezel body
5021 Bezel member
5022 Light guide member
5023 Support member
5024 Light source unit
5025 Cover
5211 Front bezel portion
5212 Opening
5211a Descent wall portion
V5000 Vehicle
F5000 Windshield
I5000 Instrument panel
A5000 Facing wall
K5000 Hole Reference Signs of Sixth Invention 6001 Vehicle display device
6010 Image projector
6015 Bezel body
6020 Bezel member
6020a, 6071a, and I6000a Opening
6021 Front bezel portion
6022 Descent wall portion
6030 Light guide member
6030a Light incident surface
6040 Support member
6050 Lighting window member
6060 and 6080 Transparent cover
6070 and I6000 Instrument panel
6071 and A6000 Facing wall
F6000 Windshield
K6000 Accommodation space S6000 Gap
V6000 Vehicle Reference Signs of Seventh Invention 7001 and 7002 Vehicle display device
7010 Image projector
7013 Housing (example of case)
7013d Projection slot
7013e Pull-out slot
7013e-1 Pair of edges
7013g Brush
7013h Protrusion lip
7013i Dustproof sheet
7015 Bezel body
7017 Pre-assembling protective sheet
7017a Holding portion (example of extended portion)
7020 Bezel member
7020a and I7000a Opening
7021 Front bezel portion
7022 Descent wall portion
7030 Light guide member
7030a Light incident surface
7040 Support member
7050 Lighting window member
7060 Cover
I7000 Instrument panel
A7000 Facing wall
F7000 Windshield
K7000 Accommodation space
S7000 Gap
V7000 Vehicle Reference Signs of Eighth Invention 8001 Vehicle display device
8002 Image projector
8003 Bezel body
8021 Portion to be supported by bezel
8022 Portion to be supported by structure
8312 Portion to be fixed
I8000 Instrument panel
A8000 Facing wall
H8000 Opening
F8000 Windshield
R8000 Reinforcement (structure)

The invention claimed is:
1. A vehicle display device provided in an instrument panel, adapted to project a display image on a windshield, and adapted to cause a passenger to visually recognize a virtual image of the display image reflected on the windshield, the vehicle display device comprising:
 a projection unit provided in an inner side of the instrument panel and adapted to project the display image;
 a transmission unit adapted to transmit the display image projected from the projection unit toward the windshield; and
 a frame unit having an opening portion that allows the display image transmitted through the transmission unit to pass through,
 wherein
 the frame unit includes a frame surface portion descending from an outer edge portion on a side of the instrument panel toward an end edge of the opening portion, the frame surface portion is formed in an upward convex curved shape from the outer edge portion to the end edge of the opening in which a slope thereof becomes gradually larger as going from the outer edge portion toward the end edge of the opening portion, and in a shape of mortar surrounding the opening portion, a front frame unit in the frame unit positioned on a front side of the vehicle includes a descending slope from the front side of the vehicle toward the end edge of the opening portion, and the frame unit is formed of a semi-transparent material that transmits light by about 20 percent, and an emission unit that emits light is provided on a back side of the frame unit.

2. The vehicle display device according to claim 1, wherein in the outer edge portion, an angle made by the frame surface portion and a surface of the instrument panel is 30° or less.

3. The vehicle display device according to claim 1, wherein surface treatment that makes degrees of glossiness of mutual surfaces equivalent is provided on at least one of the frame unit and the instrument panel.

4. The vehicle display device according to claim 1, wherein a contrast ratio of the degree of brightness of the brightest reflected image and the degree of brightness of the darkest reflected image, of the reflected images of the instrument panel, the transmission unit, and the frame unit, is 1.3 or less.

5. The vehicle display device according to claim 1, wherein the emission unit is a light guide member.

6. The vehicle display device according to claim 5, wherein the light guide member is a prism that is provided below the front frame unit, and reflects internally and emits light entering through a windshield in the front of the vehicle, toward a back surface of the front frame unit.

* * * * *